United States Patent
Rezk et al.

(10) Patent No.: US 9,618,619 B2
(45) Date of Patent: Apr. 11, 2017

(54) RADAR SYSTEMS WITH DUAL FIBER COUPLED LASERS

(71) Applicants: Nikon Corporation, Tokyo (JP); Nikon Metrology NV, Leuven (BE)

(72) Inventors: Mina A. Rezk, Bristow, VA (US); Anthony R. Slotwinski, Reston, VA (US); Daniel G. Smith, Tucson, AZ (US); Eric Peter Goodwin, Tucson, AZ (US); Alexander Cooper, Belmont, CA (US); Thomas M. Hedges, Haymarket, VA (US)

(73) Assignees: Nikon Corporation, Tokyo (JP); Nikon Metrology NV, Leuven (BE)

( * ) Notice: Subject to any disclaimer, the term of this patent is extended or adjusted under 35 U.S.C. 154(b) by 730 days.

(21) Appl. No.: 13/841,021

(22) Filed: Mar. 15, 2013

(65) Prior Publication Data
US 2015/0268344 A1    Sep. 24, 2015

Related U.S. Application Data

(60) Provisional application No. 61/728,999, filed on Nov. 21, 2012, provisional application No. 61/753,786, filed on Jan. 17, 2013.

(51) Int. Cl.
*G01S 17/32* (2006.01)
*G01S 17/66* (2006.01)
(Continued)

(52) U.S. Cl.
CPC ........ *G01S 17/325* (2013.01); *G01B 9/02007* (2013.01); *G01S 7/4812* (2013.01);
(Continued)

(58) Field of Classification Search
CPC ............... A61B 5/0066; A61B 5/0084; G01M 11/3181; G01N 21/4795; G01B 9/02044;
(Continued)

(56) References Cited

U.S. PATENT DOCUMENTS

| 4,786,176 A | 11/1988 | Froome |
|---|---|---|
| 4,824,251 A | 4/1989 | Slotwinski et al. |

(Continued)

FOREIGN PATENT DOCUMENTS

| CN | 102150007 | 8/2011 |
|---|---|---|
| EP | 0230345 | 7/1987 |

(Continued)

OTHER PUBLICATIONS

International Search Report from International Patent Application No. PCT/JP2013/081827, dated May 16, 2014, 7 pages.

(Continued)

*Primary Examiner* — Luke Ratcliffe
(74) *Attorney, Agent, or Firm* — Klarquist Sparkman, LLP

(57) ABSTRACT

Laser radar systems include a pentaprism configured to scan a measurement beam with respect to a target surface. A focusing optical assembly includes a corner cube that is used to adjust measurement beam focus. Target distance is estimated based on heterodyne frequencies between a return beam and a local oscillator beam. The local oscillator beam is configured to propagate to and from the focusing optical assembly before mixing with the return beam. In some examples, heterodyne frequencies are calibrated with respect to target distance using a Fabry-Perot interferometer having mirrors fixed to a lithium aluminosilicate glass-ceramic tube.

23 Claims, 52 Drawing Sheets

(51) Int. Cl.
  *G01S 17/42* (2006.01)
  *G01S 7/481* (2006.01)
  *G01S 7/497* (2006.01)
  *G01S 7/491* (2006.01)
  *G01B 9/02* (2006.01)

(52) U.S. Cl.
  CPC .......... *G01S 7/4817* (2013.01); *G01S 7/4818* (2013.01); *G01S 7/497* (2013.01); *G01S 7/4917* (2013.01); *G01S 17/42* (2013.01); *G01S 17/66* (2013.01)

(58) Field of Classification Search
  CPC .............. G01B 9/02091; G01B 9/0201; G01B 2290/40; G01B 2290/70
  See application file for complete search history.

(56) References Cited

U.S. PATENT DOCUMENTS

| | | | |
|---|---|---|---|
| 4,830,486 A | 5/1989 | Goodwin | |
| 5,114,226 A | 5/1992 | Goodwin et al. | |
| 5,268,738 A | 12/1993 | Baney et al. | |
| 5,612,781 A | 3/1997 | Ohtomo et al. | |
| 6,246,468 B1* | 6/2001 | Dimsdale | G01B 11/002 356/4.02 |
| 7,139,446 B2 | 11/2006 | Slotwinski | |
| 7,800,758 B1 | 9/2010 | Bridges et al. | |
| 7,925,134 B2 | 4/2011 | Slotwinski et al. | |
| 8,687,173 B2 | 4/2014 | Rezk et al. | |
| 2001/0013929 A1 | 8/2001 | Torsten | |
| 2005/0213103 A1* | 9/2005 | Everett | A61B 5/0066 356/479 |
| 2006/0182383 A1 | 8/2006 | Slotwinski | |
| 2011/0205523 A1 | 8/2011 | Rezk et al. | |
| 2012/0002188 A1 | 1/2012 | Holzapfel et al. | |
| 2012/0188557 A1 | 7/2012 | Goodwin et al. | |
| 2014/0204363 A1 | 7/2014 | Slotwinski et al. | |
| 2015/0177379 A1 | 6/2015 | Smith et al. | |
| 2015/0355327 A1 | 12/2015 | Goodwin et al. | |

FOREIGN PATENT DOCUMENTS

| | | |
|---|---|---|
| EP | 1480009 | 11/2004 |
| JP | S60-233581 | 11/1985 |
| JP | S62-228185 | 10/1987 |
| JP | H06-066517 | 3/1994 |
| WO | WO2012/061163 | 5/2012 |

OTHER PUBLICATIONS

International Search Report and Written Opinion from International Patent Application No. PCT/US2013/070914, dated Mar. 10, 2014, 9 pp.

Herriott and Schulte, "Folded Optical Delay Lines," Applied Optics, 4(8):883-889, (Aug. 1965).

Preston, "Homepage—Welcome to My Website," available at http://www.phys.ufl.edu/~preston/homepage.html#Materials, 4 pages (2008).

International Preliminary Report on Patentability from International Patent Application No. PCT/US2013/070914, dated May 26, 2015, 7 pages.

Notice of Reasons for Rejection from Japanese Patent Application No. 2015-543129, dated Aug. 30, 2016, 7 pages (with English translation).

First Office Action from Chinese Patent Application No. 201380070783.4, dated Dec. 15, 2016, 21 pages (with English translation).

\* cited by examiner

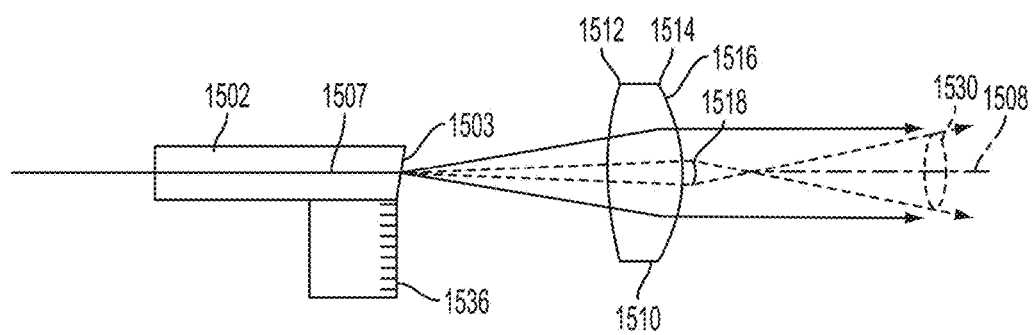
FIG. 15
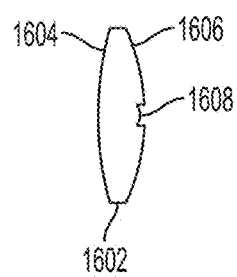 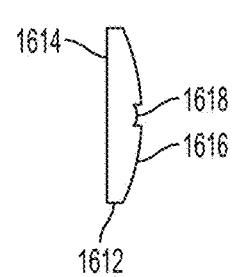 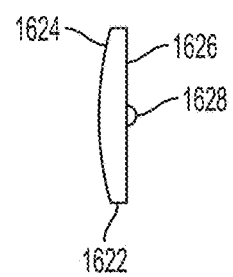
FIG. 16A     FIG. 16B     FIG. 16C FIG. 21A ——— LASER LO FREQUENCY
- - - - - LASER SIGNAL FREQUENCY
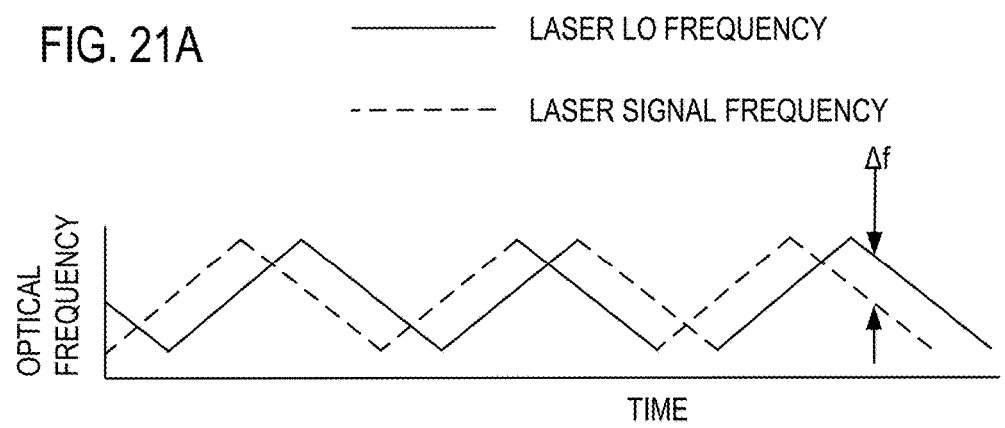
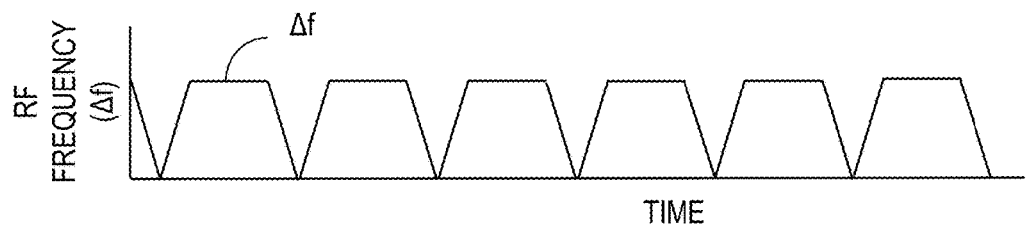
FIG. 21B

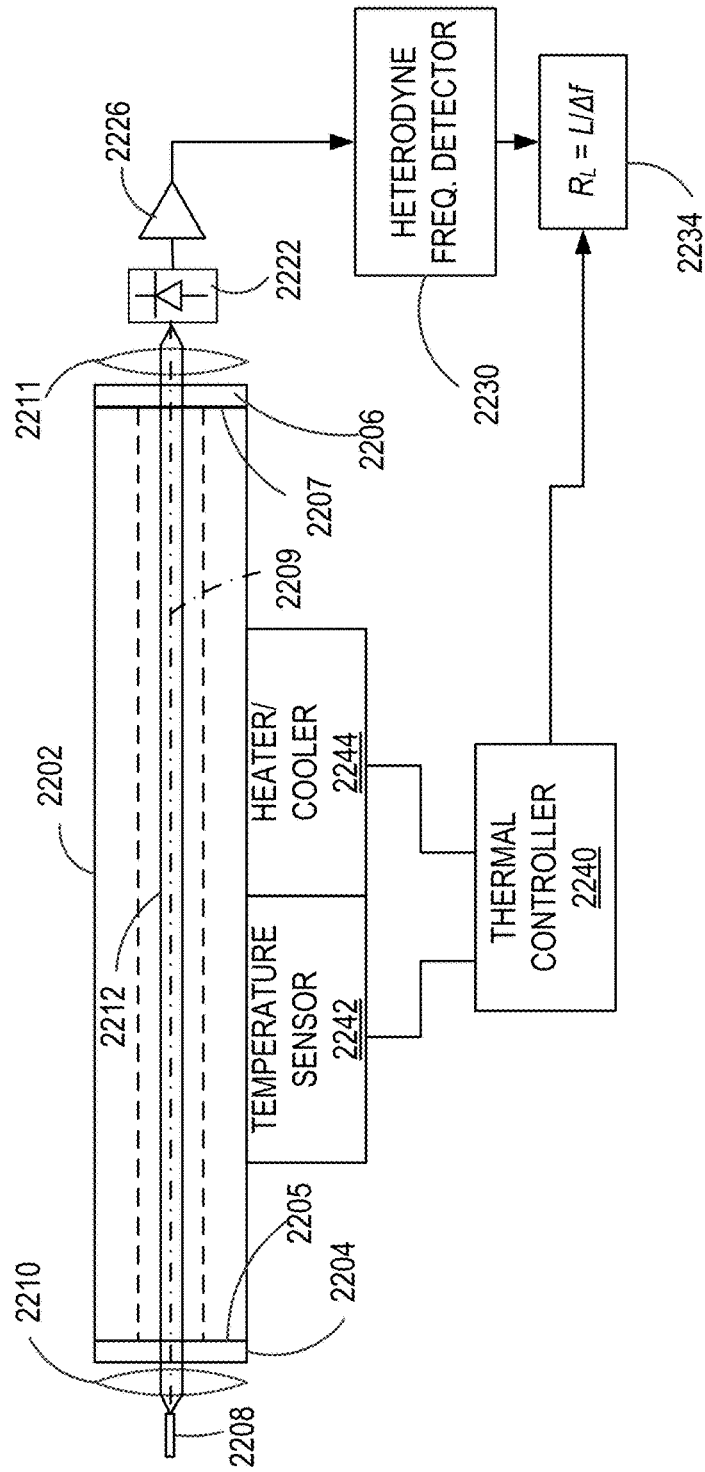

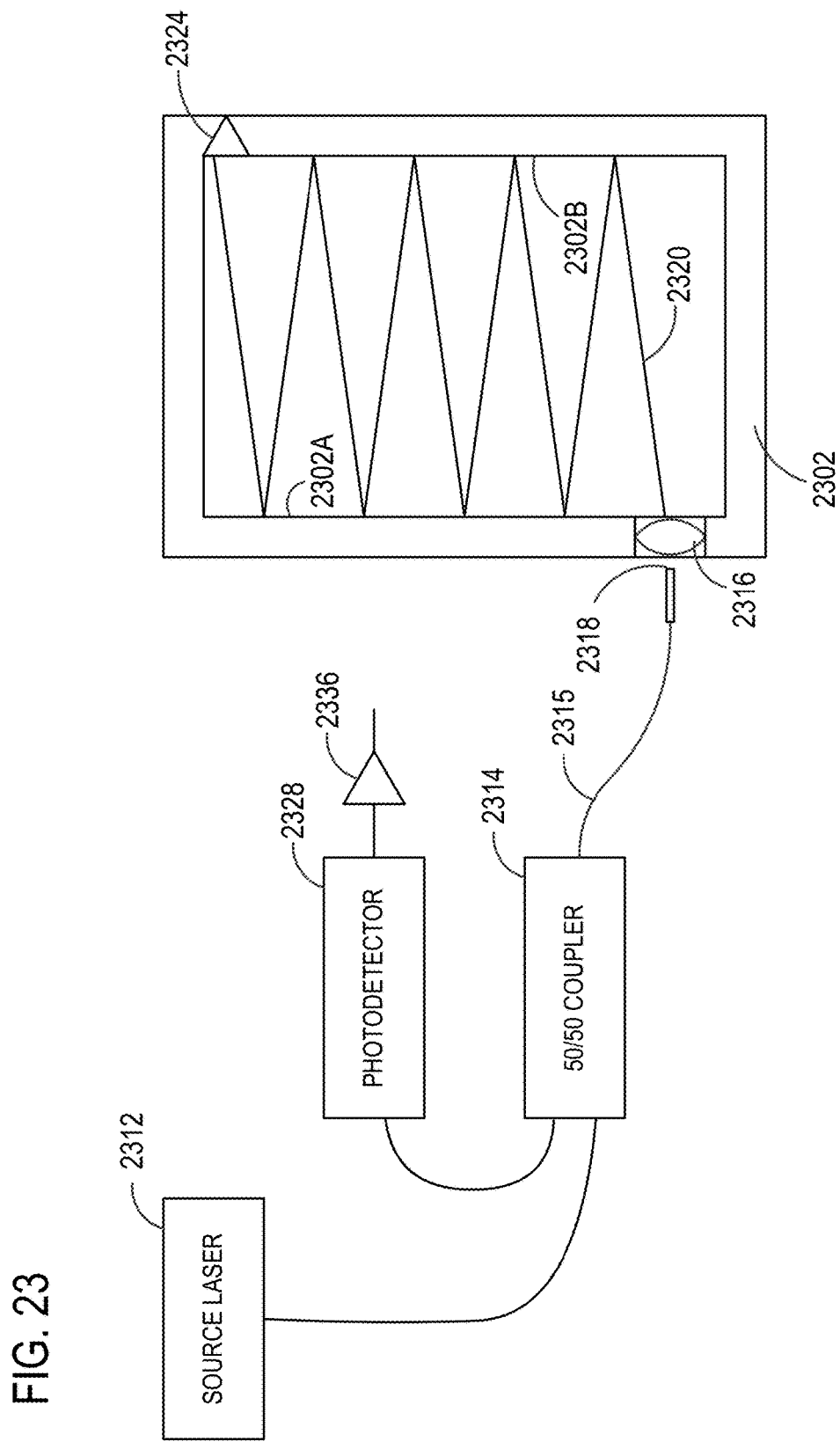

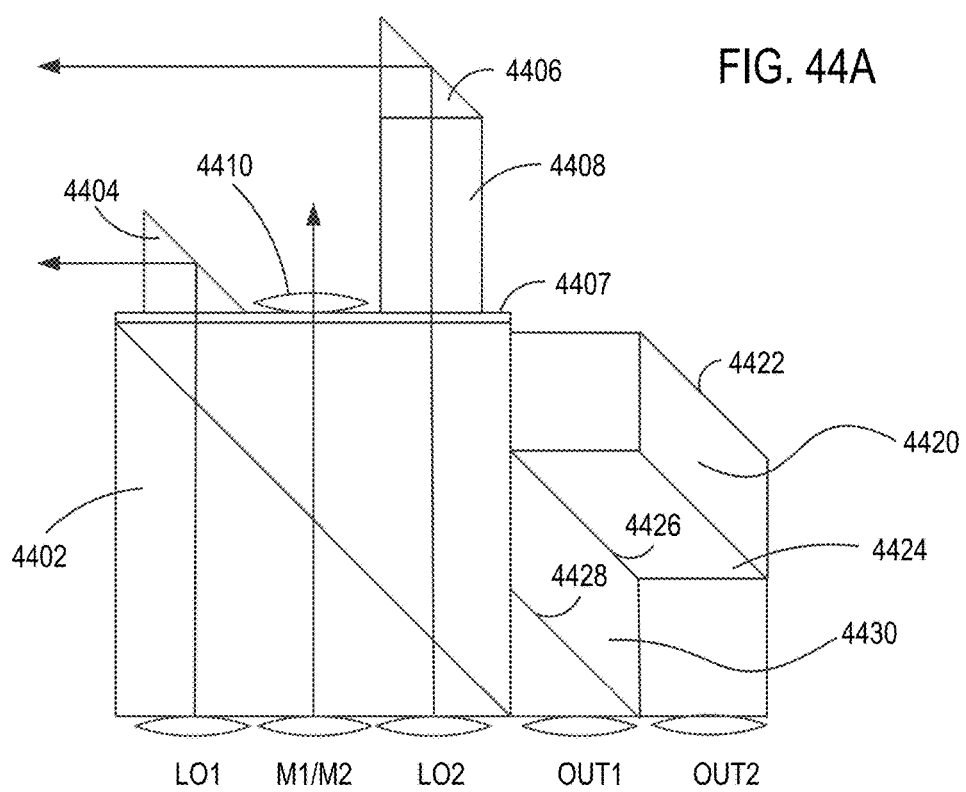

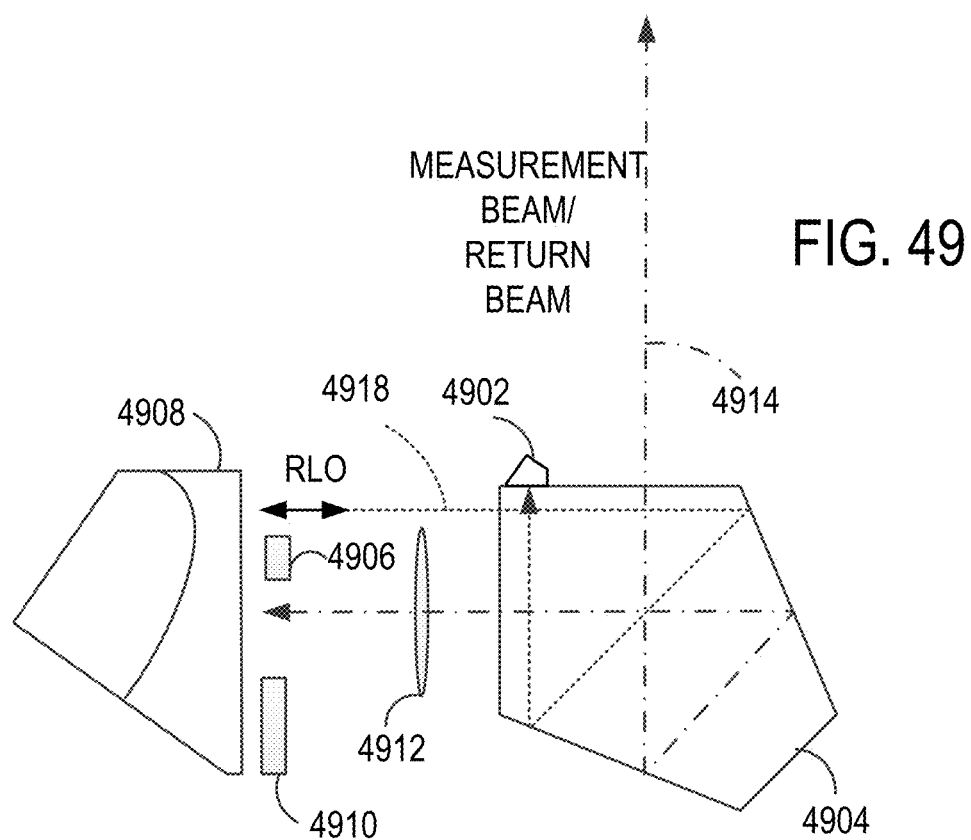

RADAR SYSTEMS WITH DUAL FIBER COUPLED LASERS

CROSS REFERENCE TO RELATED APPLICATIONS

This application claims the benefit of U.S. Provisional Application 61/728,999, filed Nov. 21, 2012, and U.S. Provisional Application 61/753,786, filed Jan. 17, 2013; and is related to U.S. Patent Applications "LOW DRIFT REFERENCE FOR LASER RADAR," "LASER RADAR WITH REMOTE LOCAL OSCILLATOR," and "SCAN MIRRORS FOR LASER RADAR," which are filed concurrently with the present application, all of which are incorporated herein by reference.

FIELD

The disclosure pertains to laser radar systems.

BACKGROUND

Laser radar systems provide simple, convenient, non-contact measurements that aid in single-operator object inspection. Laser radar systems are particularly useful for applications in which large objects, such as aircraft, automobile, wind turbine or satellite parts, are to be measured. Some conventional laser radar systems are described in U.S. Pat. Nos. 4,733,609; 4,824,251; 4,830,486; 4,969,736; 5,114,226; 7,139,446; 7,925,134; U.S. Patent Application Publication 2011/0205523, and Japanese Patent 2,664,399 which are incorporated herein by reference. In such laser radar systems, a laser beam is directed to and scanned over a target surface, and portions of the laser beam that are reflected or scattered back to the laser radar are detected and processed to provide target information. Useful beam scan rates can be limited by encoder speeds, and distance calibration tends to drift during use. In addition, costs of such systems are great. Accordingly, improved laser radar methods and apparatus are needed.

SUMMARY

In some examples, distance measurement systems comprise a scanning reflector that includes at least two reflective surfaces. A first rotational stage is coupled to the scanning reflector and configured to scan an optical measurement beam with respect to a target and receive an optical return beam from the target in response to the scanned optical measurement beam. In some embodiments, a light source is coupled to direct the optical measurement beam to the scanning reflector and an optical receiver is situated to receive the return optical beam from the scanning reflector. A signal processor is configured to provide an estimated target distance for at least one target location based on the received return optical beam. In other examples, the light source is coupled to direct the optical measurement beam to the scanning reflector along an axis that is orthogonal to an axis of propagation of the measurement beam from the scanning reflector to the target. In typical examples, the two reflective surfaces are situated at an angle of 45 degrees or 135 degrees with respect to each other. In further embodiments, an optical fiber is configured to receive the measurement beam from the light source and direct to the measurement beam to the scanning reflector from a fiber end surface, and to receive the return beam at the end surface.

In representative examples, distance measurement systems include a corner-cube situated to receive the measurement beam from the end surface of the optical fiber. A beam focusing optic is configured to receive the measurement beam from the corner cube and focus the measurement beam at a target surface, wherein the corner cube is moveable with respect to the beam focusing optic so as to produce a measurement beam focus at a selected target distance. In some examples, a second rotational stage is configured to change a propagation direction of the measurement beam by the rotation of the first rotational stage. In a typical example, the first rotational stage is situated to produce a selected beam elevational angle and the second rotational stage is configured to produce a selected beam azimuthal angle. In some alternatives, the second rotational stage is configured to rotate the end surface of the optical fiber. In some embodiments, the two reflective surfaces are defined on respective plane reflectors or at surfaces of a solid prism such as a pentaprism.

In some disclosed examples, the light source is configured to produce a secondary beam based on the measurement beam such that the optical receiver is situated to receive the secondary beam, and wherein the signal processor is configured to provide the estimated target distance for at least one target location based on the received return optical beam and the secondary beam. In an embodiment, the estimated target distance for the at least one target location is based on a difference frequency associated with the received return optical beam and the secondary beam. In representative examples, the light source is configured so that the optical measurement beam and the secondary optical beam are frequency chirped optical beams, and the estimated target distance for the at least one target location is based on a difference frequency associated with the received return optical beam and the secondary beam and a chirp rate. In representative examples, the signal processor is coupled to the light source and configured to select a frequency chirp of the frequency chirped optical measurement beam based on an estimated or measured target distance.

In representative examples, a corner-cube situated to receive the optical measurement beam and a beam focusing optic is configured to receive the measurement beam from the corner cube and focus the measurement beam at a target surface. The corner cube is moveable with respect to the beam focusing optic so as to produce a measurement beam focus at a selected target distance. The light source is configured to direct the secondary beam to the corner cube and the optical receiver is situated so as to receive the secondary beam after propagation in the corner cube. The light source is coupled to an optical fiber system configured to produce the optical measurement beam and the optical secondary beam from a common input optical beam, wherein the optical fiber system is further configured to receive the optical return beam and provide a combined beam that includes the return and secondary optical beams to the receiver optical system.

Representative methods include directing a measurement optical beam so as to be reflected by at least two reflective surfaces of a scan mirror and rotating the scan mirror so as to scan the measurement beam along a scanned axis. An optical beam returned by the scan mirror from the scanned axis is received, and, based on the received returned beam, at least one target distance is estimated. In some examples, the scan mirror is rotated to direct the measurement beam to a reference reflector so as to produce a reference return beam. Based on the reference return beam, a deviation of the scan axis from an intended scan axis is determined.

Calibration devices for optical measurement apparatus include a support structure, and a first reflective optical surface secured to the support structure. The first reflective surface defines a circulating optical path having an optical path length based on the support structure, and the first reflective surface is configured to introduce an optical beam so as to propagate along the circulating optical path. A reference photodetector is configured to receive at least two optical beams having a relative delay based on the optical path length and produce an output signal, and a signal processor associates an output signal characteristic with the optical path length. In some examples, the first reflective surface is configured to couple a plurality of delayed optical beams to a photodetector, wherein each of the delayed optical beams of the plurality of delayed optical beams has an optical delay corresponding to an integer multiple of the optical path length of the circulating optical path. In other examples, a second reflective surface is secured to the support structure. The second reflective surface is configured to couple a plurality of delayed optical beams to the reference photodetector, wherein each of the delayed optical beams of the plurality of delayed optical beams has an optical delay corresponding to an integer multiple of the optical path length of the circulating optical path. In representative embodiments, the first reflective surface and the second reflective surface are secured to the support structure so as to define a Fabry-Perot resonator, and the optical path length corresponds to a separation of the first and second reflective surfaces. In some examples, the second reflective surface is configured to couple a plurality of delayed optical beams to a photodetector, wherein each of the delayed optical beams of the plurality of delayed optical beams has an optical delay corresponding to an integer multiple of the optical path length of the circulating optical path.

In typical examples, the optical path length defined by the support structure is based on a portion of the support structure having a coefficient of thermal expansion of less than $0.5 \cdot (10^{-6})/^{\circ}$ C., $0.5 \cdot (10^{-7})/^{\circ}$ C., or $0.2 \cdot (10^{-7})/^{\circ}$ C. According to some examples, the optical path length defined by the support structure is based on a portion of the support structure comprising a glass ceramic such as a lithium aluminum silicon oxide glass ceramic having a coefficient of thermal expansion of less than $0.1 \cdot (10^{-6})/^{\circ}$ C.

In some embodiments, at least one of the first reflective surface and the second reflective surface is non-planar. In a typical example, at least one of the first reflective surface and the second reflective surface is non-planar so that the Fabry-Perot resonator is a stable resonator. In other examples, the first reflective surface and the second reflective surface are situated along an axis that includes centers of curvature of the first reflective surface and the second reflective surface so that the introduced optical beam is directed so as to propagate off-axis. In still other alternatives, first, second, and third reflective surfaces are secured to the support structure so as to define a ring resonator, and the optical path length is corresponds to a propagation distance based on separations of the first, second, and third reflective surfaces. In additional examples, a container is configured to retain the support structure and the first reflective optical surface so that the circulating optical path is defined within the container. A temperature controller is thermally coupled to the container and configured to set a container temperature.

Laser distance measurement apparatus comprise a probe beam source configured to direct a probe beam to a target. A measurement detector is configured to receive at least a portion of the probe beam from the target. A reference length defines a circulating optical path having an optical path length based on an ultralow coefficient of thermal expansion (ULE) support structure. The reference length is configured to receive a reference beam and direct the reference beam so as to propagate along the circulating optical path. A reference detector is configured to receive the reference beam from the circulating optical path. A signal processor is coupled to the measurement detector and the reference detector and configured to establish an estimate of a target distance based on a received portion of the probe beam from the target and a received portion of the reference beam from the reference length. In other embodiments, the reference beam received from the circulating optical path is associated with propagation of the reference beam along two or more multiples of the optical path length of the reference length and the signal processor is configured to establish the estimate of the target distance based on received portions of the reference beam associated with the two or more multiples of the optical path length. According to representative examples, the reference length includes a first reflector and a second reflector secured to the support structure so as to define the circulating optical path. In typical examples, the first reflector and the second reflector are arranged to define a Fabry Perot resonator, and the optical path length is associated with a separation of the first reflector and the second reflector.

In other embodiments, the support structure is a ULE rod and the first reflector and the second reflector are situated at opposing ends of the ULE rod. According to a representative example, the ULE material is one or more of a lithium aluminum silicon oxide ceramic or fused quartz. In some embodiments, a fiber coupler is configured to produce the measurement beam and the reference beam from a common optical beam, and the reference length includes an input optical fiber and an output optical fiber configured to receive the reference beam from the fiber coupler and direct the reference beam from the circulating optical path to the reference detector.

In a particular example, the common optical beam is a frequency swept optical beam, and the signal processor is configured to establish the estimate of the target distance based on a frequency difference between the received portion of the probe beam from the target and a local oscillator beam and at least one frequency difference associated with received portions of the reference beam associated with two or more multiples of the optical path length of the reference length. Typically, a hermetically sealed container is configured to retain the reference length, and a temperature controller is coupled to the hermetically sealed container to select a temperature associated with the reference length. In some cases, the reference length is defined in an optical fiber or other refractive medium. In other embodiments, the reference length includes a plurality of reflective surfaces arranged to define a ring resonator, and the optical path length is associated with separations of the plurality of reflective surfaces. In further examples, the reference length includes at least one reflective surface situated so that propagation of the reference beam along the optical path length is associated with two reflections at different locations on the at least one reflective surface.

Methods comprise directing a reference optical beam to an optical resonator that defines an optical path length so as to produce a reference beam portion associated with a transit along the optical path. The optical path length is based on a dimension of an ultralow thermal expansion (ULE) support. The reference beam portion is received at one or more photodetectors, and a propagation length associated with the reference beam portions is estimated based on the received portion. In some examples, a plurality of reference beam portions is produced and the reference beam portions are associated with corresponding transits along the optical path. In typical examples, the reference optical beam is a swept frequency optical beam, and the propagation length estimates are based on frequency differences between the reference beam portions. According to other examples, the frequency differences are obtained by directing the plurality of reference beam portions to a photodetector and obtaining heterodyne frequencies associated with interference of the reference beam portions. In some examples, the ULE support is a lithium aluminum silicon oxide ceramic. In other alternatives, a correspondence of a frequency sweep associated with the swept frequency optical beam and target distances is established. In still further examples, a probe optical beam is directed to a target, the probe optical beam being a swept frequency optical beam having a frequency sweep corresponding to the frequency sweep of the reference optical beam. A difference frequency between the probe optical beam as received from the target and a local oscillator optical beam is obtained. Based on the difference frequency associated with the probe optical beam and the correspondence of the frequency sweep and target distances, at least one target distance is estimated.

Measurement apparatus comprise a measurement beam source coupled to provide a probe beam and a reference beam. An optical system includes a focus adjustment optical system having at least one movable optical element so as to focus the probe beam at a target surface. At least one photodetector is configured to receive a portion of the probe beam returned by the target surface to the focus adjustment optical system and a portion of the reference beam from the focus adjustment system. In some examples, the reference beam propagates as a collimated beam in the focus adjustment system. In some examples, the focus adjustment optical assembly is situated so that the portion of probe beam returned by the focus adjustment system and the reference beam have a common number of traverses of the movable optical element of the focus adjustment optical assembly as received at the at least one photodetector. In representative examples, the movable optical element is a movable retroreflector such as a corner cube. In other alternatives, the focus adjustment optical system includes a reference beam retroreflector and reference beam reflector, wherein the reference beam retroreflector is situated to receive the reference beam from the movable retroreflector and direct a displaced reference beam to the reference beam reflector through the retroreflector, and the reference beam reflector is configured to direct the displaced reference beam back to the reference beam retroreflector. According to some examples, the measurement beam source includes an optical fiber configured to provide the probe beam and the reference beam, and the focus adjustment optical system is configured to deliver the portion of the probe beam returned by the target surface and the reference beam from the reference beam retroreflector to the optical fiber. In still other examples, the measurement beam source includes an optical fiber configured to provide the probe beam and the reference beam, and the focus adjustment optical system is configured to deliver the portion of the probe beam returned by the target surface and the reference beam to the optical fiber. In other examples, the focus adjustment system includes a return reflector situated to receive the probe beam from the retroreflector and direct the probe beam back to the reflector and the optical system includes a lens situated to receive the probe beam and focus the probe beam at a target distance. Typically, the lens is situated to direct the portion of the probe beam returned by the target surface into the optical fiber. In some examples, the measurement beam is a swept frequency beam and the photodetector is configured to produce a signal at a difference frequency that is associated with a target distance.

According to some embodiments, the measurement apparatus comprises a compound rotational stage that includes an azimuthal rotational stage and an elevational rotational stage secured to the azimuthal rotational stage, wherein the optical system is secured to the elevational stage so that the probe beam is directed to the target surface based on an elevational angle and an azimuthal angle. In typical embodiments, a signal processor is configured to determine a target distance estimate based on the difference frequency. In representative examples, a beam divider is configured to provide the probe beam and the reference beam from the measurement beam. In some examples, the beam divider is based on division of wavefront or division of amplitude. In a representative example, the beam divider includes a beam splitter situated to receive the measurement beam and transmit one of the probe beam or the reference beam, and at least one of the probe beam or the reference beam is directed by the beam splitter to the focus adjustment optical system. In some examples the beam splitter is a polarizing beam splitter (PBS), and a wave plate is situated so as the reference beam is coupled from the PBS to the movable optical element in a first state of polarization and from the movable optical element to the PBS in a second SOP that is orthogonal to the first SOP. In convenient examples, the first and second SOPs are linear SOPs, and the at least one wave plate is configured to provide a ¼ wave retardation.

In other alternatives, the beam divider includes at least one optical surface configured to select a first portion of a measurement beam cross section as a probe beam and a second portion of the measurement beam cross section as a reference beam. According to some examples, the at least one optical surface is a refractive surface having a first curvature in a surface area corresponding to the probe beam portion of the measurement beam and a second curvature in surface area corresponding to the reference beam portion of the measurement beam. In other examples, the at least one optical surface includes a first reflective surface area situated so as to reflect either the probe beam portion of the measurement beam or the reference beam portion of the measurement beam. In some embodiments, the first reflective surface area is situated to provide a first beam divergence for the probe beam and a second beam divergence for the reference beam, wherein the first beam divergence and the second beam divergence are different. In still further examples, the beam divider includes a first optical surface and a second optical surface configured to select a first portion of a measurement beam cross section as a probe beam and a second portion of the measurement beam cross section as a reference beam. In some embodiments, the first surface includes a reflective area associated with either the probe beam portion or the reference beam portion, and configured to reflect either the probe beam portion or the reference beam portion to the second surface. The second surface has a reflective surface area situated to reflect the received beam portion from the first surface so that the probe beam portion and the reference beam portion propagate along a common axis with different beam divergences. According to representative examples, the second surface includes a transmissive area configured to transmit the measurement beam to the first surface and an optical fiber is situated to couple the measurement beam to the second surface. The optical fiber includes a fiber surface situated at the second surface, wherein the fiber surface couples the measurement beam to the second surface.

Methods comprise selecting a focus of a probe beam at a target with a focusing optical assembly and receiving a portion of the probe beam from the target returned to the focusing optical assembly. A reference beam is directed to the focusing optical assembly and returned from the optical assembly. A target distance is estimated based on the received portion of the probe beam and the reference beam returned from the focusing optical assembly. In some examples, the focus adjustment optical assembly is situated so that the portion of probe beam returned by the focus adjustment system and the reference beam have a common number of traverses of at least a portion of the focus adjustment optical assembly. According to representative examples, the focus of the probe beam is selected with a movable optical element of the focusing assembly, and the portion of the probe beam returned from the target and the reference beam have a common number of traverses of the movable optical element of the focus adjustment optical assembly. In some embodiments, the movable optical element is a movable corner cube or a roof prism such as an air corner cube or an air roof prism. In some embodiments, the measurement beam is divided based on a division of measurement beam wavefront so as to form the probe beam and the reference beam. According to some examples, the measurement beam is divided by directing the measurement beam to an optical surface having surface areas with different curvatures or different reflectivities. In some examples, the measurement beam is divided by directing the measurement beam to a first surface configured to transmit a first cross sectional area of the measurement beam and reflect a second cross sectional area of the measurement beam portion. In representative embodiments, the target distance is estimated by mixing the probe beam portion returned from the target and the reference beam at a detector, and determining a frequency difference between the probe beam portion and the reference beam.

Beam dividers configured to provide a probe beam and a reference beam from a measurement beam comprise at least one optical surface configured to select a first portion of a measurement beam cross section as a probe beam and a second portion of the measurement beam cross section as a reference beam and produce different beam divergences for the probe beam and the reference beam. In some examples, the at least one optical surface is a refractive surface having a first curvature in a surface area corresponding to the probe beam portion of the measurement beam and a second curvature in surface area corresponding to the reference beam portion of the measurement beam. In other examples, the at least one optical surface includes a first reflective surface area situated so as to reflect either the first portion or the second portion of the measurement beam. In still other examples, the first reflective surface area is situated to provide a first beam divergence for the probe beam and a second beam divergence for the reference beam, wherein the first beam divergence and the second beam divergence are different. According to some examples, the first surface includes a reflective area associated with either the probe beam portion or the reference beam, and configured to reflect either the probe beam or the reference beam to the second surface. The second surface has a reflective surface area situated to reflect the received beam portion from the first surface so that the probe beam and the reference beam propagate along a common axis with different beam divergences. In further examples, the second surface includes a transmissive area configured to transmit the measurement beam to the first surface. In some examples, an optical fiber is situated to couple the measurement beam to the second surface.

Beam pointing systems comprise a first rotational stage configured to provide a rotation about a first axis and a second rotational stage coupled to the first rotational stage, and configured to provide a rotation about a second axis that is not parallel to the first axis. A rotatable optical element is coupled to the second rotational stage, and an optical system is situated to provide a probe beam to the rotatable optical element. In some examples, the first axis is an azimuthal axis and the second axis is an elevational axis, or the first axis is an elevational axis and the second axis is an azimuthal axis. In representative examples, the rotatable optical element is situated to receive the probe beam from the optical system along a propagation axis parallel to the second axis. According to some examples, the rotatable optical element has a planar reflective surface situated to receive the probe beam so that the probe beam is directed to a target location based on a first rotation angle and a second rotation angle associated with the first rotational stage and the second rotational stage, respectively. In some examples, the rotatable optical element is a pentaprism. According to some embodiments, the rotatable optical element is situated to receive the probe beam from the optical system along an axis parallel to the first axis. In other alternatives, the optical system is configured so as to be stationary with respect to rotations of the first and second rotational stages. In additional examples, the optical system includes a photodetector configured to receive a portion of the probe beam returned from a target. In still further examples, a camera is secured so as to be rotatable about the first axis so as to image a target field of view.

In still other alternatives, rotatable optical element optical is situated to receive the probe beam from the optical system along an axis parallel to the second axis. An optical fiber is coupled to the optical system so as to deliver a measurement beam to the optical system, and the optical system is configured to produce a probe beam and a reference beam based on the measurement beam. In some embodiments, the first rotational stage and the second rotational stage include respective encoders, and a signal processor is coupled to the encoders so as to determine a pointing direction of the probe beam based on encoder signals. According to some examples, the optical system includes at least one optical element that is translatable to adjust a focus distance of the probe beam. In particular embodiments, the optical system includes a corner cube and an objective lens, wherein the translatable optical element is the corner cube situated so as to vary a propagation distance associated with the objective lens. In some examples, the optical system is configured to produce the reference beam based on a portion of the measurement beam directed to the corner cube. In some convenient examples, the optical system is configured to couple a portion of the probe beam returned from a target and the reference beam into the optical fiber. In other examples, a camera is coupled so as to be rotatable about the second axis, and configured to image at least a portion of a target.

Distance measurement systems comprise a scanning reflector that includes at least two reflective surfaces. An optical system is configured to direct an optical probe beam to the scanning reflector. A first rotational stage is coupled to the scanning reflector and configured to scan an optical probe beam with respect to a target based on a rotation of the scanning reflector, wherein the optical system is configured to receive an optical return beam from the target in response to the scanned optical probe beam. According to some embodiments, an optical receiver is situated to receive the optical return beam from the optical system, and a signal processor is configured to provide an estimated target distance for at least one target location based on the optical return beam. In still other alternatives, the optical probe beam is directed to the scanning reflector along an axis that is orthogonal to an axis of propagation of the optical probe beam from the scanning reflector to a target. In some examples, the two reflective surfaces of the scanning reflector are situated at an angle of 45 degrees or 135 degrees with respect to each other. In yet other embodiments, an optical fiber is configured to receive the optical probe beam from the light source and direct to the optical probe beam to the optical system and to receive the return beam from the target.

In a particular example, the optical system comprises a corner cube situated to receive the optical probe beam from the optical fiber. A beam focusing optic is configured to receive the optical probe beam from the corner cube and focus the measurement beam at a target surface, wherein the corner cube is moveable with respect to the beam focusing optic so as to produce a beam focus at a selected target distance. In additional examples, a second rotational stage is configured to change a propagation direction of the optical probe beam to the target, wherein the first rotational stage is situated to produce a selected beam elevational angle and the second rotational stage is configured to produce a selected beam azimuthal angle. In some examples, the two reflective surfaces are defined at surfaces of a solid prism such as a pentaprism. In further examples, the light source is configured to produce a secondary beam, and the optical system is configured to couple the secondary beam and the return probe beam to a photodetector. The signal processor is configured to provide the estimated target distance for at least one target location based on the received return optical beam and the secondary beam. In some examples, the estimated target distance for the at least one target location is based on a difference frequency associated with the received return optical beam and the secondary beam.

Laser radar systems comprise a measurement beam source configured to provide a swept frequency optical beam. An optical system is coupled to receive the swept frequency optical beam and produce a probe beam and a reference beam, select a focus distance of the probe beam, and couple a probe beam portion from a target and the reference beam to a detector. A probe beam pointing system includes an elevational rotational stage and an azimuthal rotational stage, wherein the elevational rotational stage is coupled to the azimuthal rotational stage. A rotatable reflective surface is coupled to the elevational stage, and configured to receive the probe beam and direct the probe beam to a selected target location. In some examples, the probe beam is coupled to the rotatable reflective surface along an elevational axis of rotation or along an azimuthal axis of rotation.

Optical measurement apparatus comprise a beam pointing system comprising an elevational stage and an azimuthal stage. An optical system is secured so as to be rotatable with the azimuthal stage. The optical system is configured to receive a measurement beam and shape the measurement beam for delivery to a target area as a probe beam, wherein the target area is based on an elevational angle and an azimuthal angle established by the beam pointing system. The optical system also combines a portion of the probe beam returned from the target with a portion of the measurement beam in an optical fiber, and includes a rotatable reflective surface situated so as to establish an elevational angle for the probe beam. A signal processing system is configured to provide an estimate of a target distance based on the combined beam. In some examples, a measurement detector is coupled to the combined probe beam and measurement beam portions, wherein the signal processing system is electrically coupled to the measurement detector and configured to provide the estimate of the target distance based on an electrical signal from the measurement detector. According to other examples, the measurement detector is secured so as to be rotatable with the azimuthal stage or so as to be fixed with respect to elevational and azimuthal rotations provided by the beam pointing system. In representative examples, the rotatable reflective surface is a surface of a plane mirror, a surface of a prism such as a pentaprism, a surface of a pentamirror, and can be defined by a multilayer dielectric coating. In some examples, first and second measurement lasers are coupled to provide a dual wavelength measurement beam to the optical fiber of the rotatable optical system.

In additional examples, a reference length includes a Fabry-Perot resonator coupled to receive a portion of the dual wavelength measurement beam. A reference detector is optically coupled to the Fabry-Perot resonator and electrically coupled to the signal processing system so as to provide a reference electrical signal, wherein the signal processing system is configured to provide the estimate of target distance based the reference electrical signal. In typical examples, the reference electrical signal includes signal portions corresponding to a plurality of transits of a cavity defined by the Fabry-Perot resonator. In other examples, the rotatable optical system includes at least one translatable optical element configured to adjust a focus of the probe beam, wherein the portion of the measurement beam combined with the returned portion of the probe beam is coupled through the at least one translatable optical element. In some examples, the portion of the measurement beam and the returned portion of the probe beam are combined so as to have corresponding optical paths in the at least one translatable optical element or to have a common number of transits of the at least one translatable optical element. According to some examples, the at least one translatable optical element is a corner cube or a roof prism.

In further examples, an enclosure is configured to retain the reference length, and a temperature controller is thermally coupled to the enclosure and configured to establish a temperature of the enclosure. In additional embodiments, a pointing laser that produces a visible optical beam is configured so that the visible optical beam is coupled with the dual wavelength measurement beam to the optical fiber of the rotatable optical system. In some alternatives, the optical fiber of the rotatable optical system is a polarization retaining single mode optical fiber. In yet other examples, a camera is secured so at to be rotatable with the azimuthal stage and situated to image along a propagation axis of the probe beam.

In other embodiments, measurement apparatus include a dual wavelength fiber-optic transmitter and receiver system that includes first and second lasers coupled to provide a combined beam to an input/output optical fiber, a reference length coupled to receive a portion of the combined beam and to couple a reference beam to a reference fiber, and a thermally controlled enclosure configured to retain at least the reference length. A beam shaping optical system is coupled to receive the combined beam from the input/output optical fiber of the transmitter/receiver system. Typically the beam shaping optical system includes a beam focusing lens and at least one translatable focus adjustment optical element configured to focus a dual wavelength probe beam at a target surface. In some examples, an azimuthal stage is configured to direct the dual wavelength probe beam to the target surface on a selected azimuthal angle, and the beam shaping optical system is configured to direct the dual wavelength probe beam along an axis of rotation of the azimuthal stage. According to some alternatives, a rotatable reflective surface is configured to receive the dual wavelength measurement beam and direct the dual wavelength measurement beam along a selected elevational angle. In some embodiments, a camera is configured to image a target surface along the axis of rotation of the azimuthal stage. In further embodiments, a rotatable reflective surface is configured to receive the dual wavelength probe beam and direct the dual wavelength probe beam along a selected elevational angle. A cold mirror is configured to transmit the dual wavelength probe beam to the rotatable reflective surface and reflect imaging optical radiation to the camera. In other cases, an elevational stage and an azimuthal stage are configured to select a target location, wherein the beam shaping optical system is secured to so as to be rotatable based on the selected elevational angle. In further examples, a signal processor is configured to provide a target distance estimate based on portions of the probe beam returned from the target. In additional examples, the beam shaping optical system is configured to form a combined local oscillator (LO) beam, wherein the signal processor is configured to provide the target distance estimate based on the portions of the probe beam returned from the target and the combined LO beam. In some examples, the LO beam is formed so as to have an optical path in the translatable focus adjustment optical element corresponding to an optical path in the translatable focus adjustment optical element of the returned probe beam portions to and from the target. In some cases, the target distance is estimated based on a difference frequency between the probe beam and the LO beam. In typical examples, a first detector and a second detector are configured to receive returned probe beam portions and LO beam portions corresponding to the first laser and the second laser, respectively, and the target distance is estimated based on difference frequencies between the probe beam and the LO beam at the first detector and the second detector.

The foregoing and other features, and advantages of the disclosed technology will become more apparent from the following detailed description, which proceeds with reference to the accompanying figures.

BRIEF DESCRIPTION OF THE DRAWINGS

FIG. 15 illustrates a representative all refractive (dioptric) optical system that can produce measurement and local oscillator beams from a common input beam.

FIGS. 16A-16C illustrate representative refractive (dioptric) optical elements that can produce measurement and local oscillator beams from a common input beam.

FIGS. 21A-21B illustrate heterodyne beat frequencies associated with upchirped measurement and LO beams, and down-chirped measurement and LO beams.

FIG. 22 is a schematic diagram of a representative reference length standard using a Fabry-Perot interferometer configuration.

FIG. 23 is a schematic diagram of a representative reference length standard based on multiple reflections within a dimensionally stable container.

FIGS. 44A-44B are schematic diagrams of an optical assembly configured to produce a dual laser measurement beam and two remote LO beams.

FIG. 49 illustrates an optical system configured to receive a dual laser measurement beam and at least one LO beam from corresponding optical fibers in which an LO reflector is secured to a scanning assembly.

DETAILED DESCRIPTION

Figure 1:
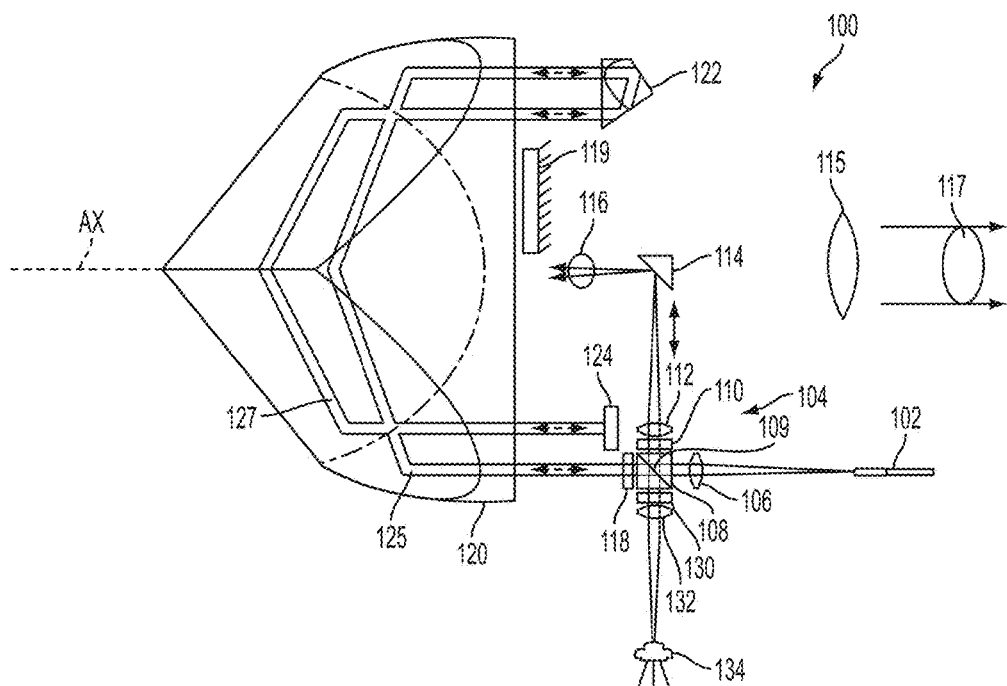
FIG. 1 is a schematic diagram of a portion of a representative laser radar that includes a local oscillator beam and measurement beam that are directed to a corner cube that provides focus adjustment for the measurement beam.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, the terms "light" and "optical radiation" refer to propagating electromagnetic radiation in a wavelength range of 300 nm to 10 µm, but other wavelengths can be used. Such radiation can be directed to one or more targets to be profiled, detected, or otherwise investigated. This radiation is referred to herein as propagating in one or more "beams" that typically are based on optical radiation produced by a laser such as a laser diode. As used in this application, beams need not be collimated, and propagating radiation in a waveguide is referred to as a beam as well. Beams can have a spatial extent associated with one or more laser transverse modes, and can be substantially collimated. Wavelengths for which optical fibers or other optical waveguides and coherent laser sources are readily available are convenient. In some examples, laser diodes at wavelengths around 1550 nm are used.

For convenience, beams are described as propagating along one or more axes. Such axes generally are based on one or more line segments so that an axis can include a number of non-collinear segments as the axis is bent or folded or otherwise responsive to mirrors, prisms, lenses, and other optical elements. The term "lens" is used herein to refer to a single refractive optical element (a singlet) or a compound lens that includes one or more singlets, doublets, or other compound lenses. In some examples, beams are shaped or directed by refractive optical elements, but in other examples, reflective optical elements such as mirrors are used, or combinations of refractive and reflective elements are used. Such optical systems can be referred to as dioptric, catoptric, and catadioptric, respectively. Other types of refractive, reflective, diffractive, holographic and other optical elements can be used as may be convenient. In some examples, beam splitters such as cube beam splitters are used to separate an input beam into a transmitted beam and a reflected beam. Either of these beams can be arranged to serve as measurement beam or a local oscillator beam in a coherent detection systems as may be convenient. Beam splitters can also be provided as fiber couplers, and polarizing beam splitters are preferred in some embodiments.

In the disclosed examples, laser radar systems are configured to scan a probe or measurement beam over a scan path that can be a polygon, portions of a closed curve, a raster, a w-pattern, or other pattern, and scanning can be periodic or aperiodic. In response to a measurement beam or a probe beam directed to a target, a return beam is obtained based on reflection, scattering, diffraction, refraction, or other process at the target. Evaluation of the return beam permits estimation of target properties. The examples below are provided with respect to a laser radar that is configured to, for example, provide an estimate of surface topography based on portions of an optical beam directed to a surface that are returned to a receiver. The disclosed methods and apparatus can also be incorporated into laser tracker systems.

As used herein, an ultralow thermal expansion (ULE) material is material having a coefficient of thermal expansion (in units of $10^{-6}/°$ C.) of less than about 5, 0.5, 0.2, 0.05, 0.02, 0.010, or 0.007. Some ULE materials include lithium aluminum silicon oxide glass ceramics such as ZERODUR glass ceramic and fused quartz.

As used herein, a circulating optical path is an optical path defined by reflective or refractive optical surfaces such that an optical beam is directed one or more or multiple times to the optical surfaces. In some examples, an optical beam propagates multiple times along a common optical path, such as an optical path defined by a Fabry-Perot or ring resonator. In another example, an optical beam is reflected by a two mirror system so as to trace an elliptical path on a mirror surface, and the optical beam can follow different paths in each pass. Such systems are described in Herriott and Schulte, "Folded Optical Delay Lines," Applied Optics 4:883-889 (1965), which is incorporated herein by reference. In the examples disclosed below, such circulating optical paths are defined using reflective surfaces, but refractive optical elements can be used as well.

In some examples described herein, a measurement optical beam is divided into a probe beam that is directed to a target, and a reference beam that can be used for calibration by being directed to a reference length or serve as a local oscillator beam and used for heterodyne detection and target distance estimation in combination with the probe beam. In other examples, a beam directed to a target is referred to as a measurement beam. In the disclosed examples, portions of one or more optical beams are directed to a target, detectors, or communicated from one to one or more destinations. As used herein, a beam portion refers to any fraction of an optical beam, including the entire optical beam.

In some examples, rotations are described with reference to azimuthal angles and elevational angles. While such angles are typically defined with respect to vertical and horizontal axes, as used herein, orientation with vertical and horizontal is not required. Typically, systems are described with reference to such angles with systems assumed to be in a standard in-use orientation. For purposes of convenient illustration, corner cubes are shown in some figures as roof prisms.

Swept Frequency Laser Radar

In the following, various configurations and aspects of laser radar systems are disclosed. The disclosed systems, system components, modules, and associated methods can be used in various laser radar systems. In typical examples, so-called swept frequency laser radar systems are provided. Typical coherent radar systems generally use one or more laser diode light sources. The laser diode frequency is directly modulated by modulating a laser diode injection current or modulating laser diode temperature or in some other way. The laser frequency is generally modulated with a waveform so as to produce a linear frequency sweep or linear "chirp." Laser frequency f(t) can then be expressed as a function of time t as:

$$f(t)=f_0+(\Delta f/\Delta t)t=f_0+\beta t,$$

wherein $f_0$ is a laser initial frequency and $\beta=\Delta f/\Delta t$ is a rate of laser frequency change. Linear sweeps are not required and arbitrary laser frequency variations as a function of time are theoretically useful such as stepped or other discontinuous frequency variations, or continuous variations based on polynomial or other functions, but linear chirps are generally more convenient and practical. A frequency modulated (FM) measurement beam is focused at a target, and a portion of the beam is scattered, reflected, refracted or otherwise directed so as to be collected by receiver optics. A local oscillator beam ("LO beam") is generally obtained as a portion of the same laser beam used to produce the measurement beam. A round trip transit time associated with measurement beam propagation to and from the target results in a frequency difference between the returned portion of the measurement beam (the return beam) and the local oscillator. This frequency difference can be used to determine target distance. The return beam and the LO are directed to a detector such as a PIN photodiode (typically referred to as a square law detector) to produce sum and difference frequency signals. The sum frequency (at a several hundred THz for a 1.5 µm measurement beam) is beyond available detector bandwidth, but the return and LO beams also produce a difference frequency $\Delta f$ (heterodyne frequency) within the detector bandwidth. A distance R to a target location can be calculated as $R=c\Delta f/2\beta$, wherein $\Delta f$ is the heterodyne frequency associated with the return beam, $\beta$ is the chirp rate, and c is the speed of light. Heterodyne frequency generation also requires that the LO and return beam are not orthogonally polarized, but since range is determined based on frequency differences and not amplitudes, polarization effects generally do not degrade laser radar performance.

Successful laser radar systems control or measure laser frequency precisely as the accuracy of range measurements can be limited by the linearity of laser frequency modulation. For example, if a target is one meter distant, a linearity of one part per thousand is necessary to ensure 1 mm accuracy. Accordingly, laser sources for FM laser radar are configured to provide highly linear chirps, and variances from linearity are detected and compensated. In some cases, range measurements can have precisions in the few micron range.

FM laser radar systems are largely immune to ambient lighting conditions and changes in surface reflectivity because signal detection is based on heterodyne beat frequency, which is independent of signal amplitude and unaffected by stray radiation. Thus, amplitude or intensity variations in the return beam, the measurement beam, or the LO beam tend to have little effect on range measurements. In addition, coherent heterodyne detection can successfully detect optical signals to the shot noise limit so that FM coherent laser radars can make reliable measurements with as little as one picowatt of return beam power, corresponding to a nine order-of-magnitude dynamic range.

Figure 51A:
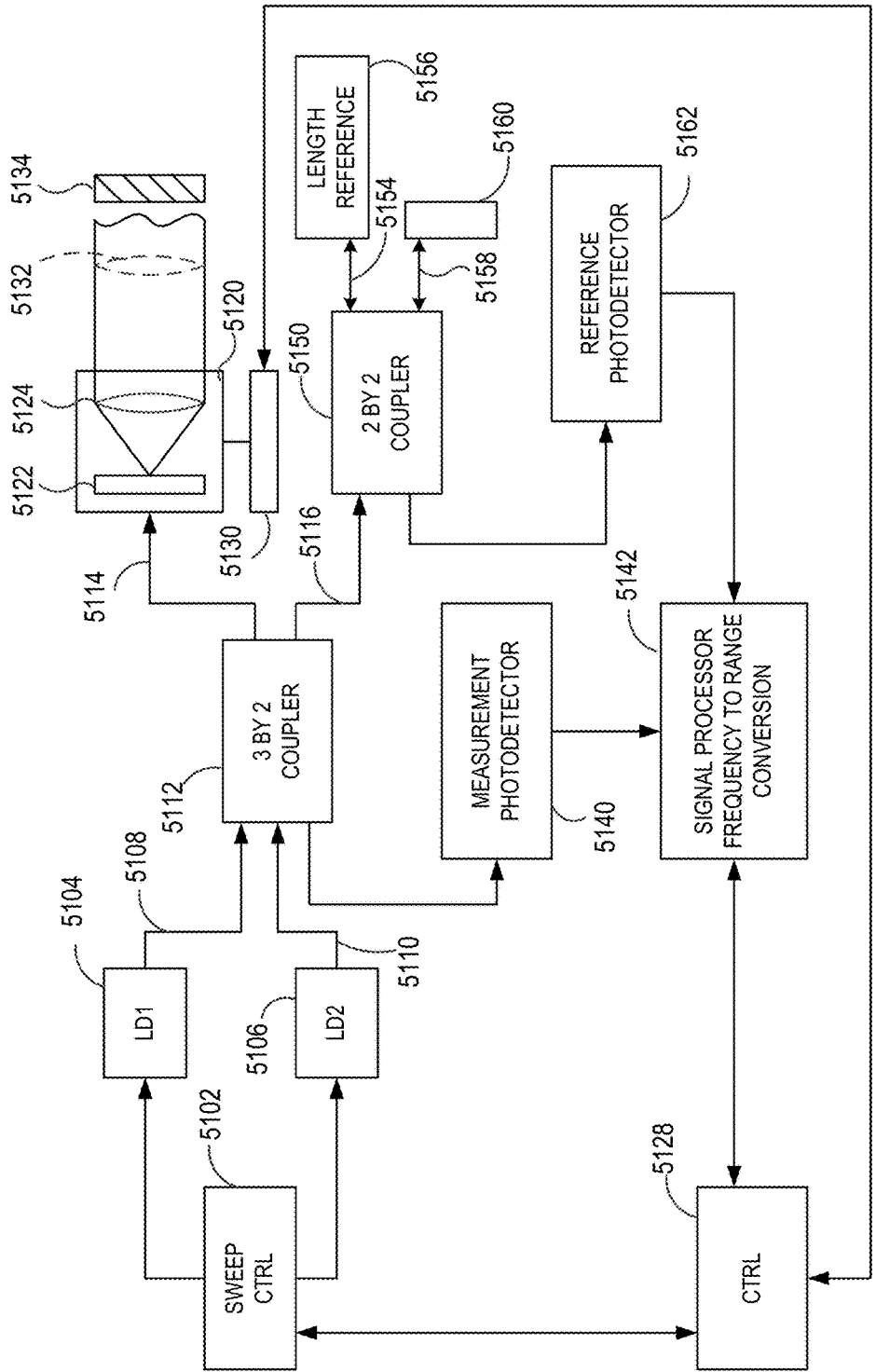
FIG. 51A is a schematic diagram of a polarization maintaining based fiber optical system configured to produce first and second local oscillator beams and a dual wavelength measurement beam.

A representative optical fiber based laser radar is illustrated in FIG. 51A. As shown in FIG. 51A, polarization retaining fibers are used for beam coupling and delivery, but in other examples, free space propagation, surface waveguides, or other optical systems can be used. A laser sweep controller 5102 is coupled to a first laser diode 5104 and a second laser diode 5106 so as to produce chirped laser beams that are coupled to optical fibers 5108, 5110, respectively. A 3 by 2 fiber coupler 5112 receives these beams and couples portions of each beam to a measurement path optical fiber 5114 and a reference path optical fiber 5116. The dual wavelength beam is delivered by an optical fiber 5114 to a laser radar optical system 5120 that includes a reflector 5122 and a beam shaping lens 5124. A scanning stage 5130 is configured to provide azimuthal and elevational rotations so as to direct a measurement beam 5132 to a target 5134. Portions of the measurement beam 5132 are returned by the target 5134 and coupled into the optical fiber 5114. The reflector 5122 reflects a portion of the combined beams from the optical fiber 5114 back into the optical fiber 5114 to produce local oscillator beams associated with each of the laser diodes 5104, 5106.

To determine target range, the return beam and local oscillator beams propagate to the combiner 5112 and a portion of these combined beams is directed to at least one measurement photodetector 5140. Heterodyne frequencies associated with both laser diodes are produced, and a signal processor 5142 determines range estimates based on the heterodyne frequencies and laser chirp rates.

Range calibration can be provided based on portions of the laser beams that propagate in the optical fiber 5116 to a 2 by 2 fiber coupler 5150 that in turn couples beam portions to a fiber 5154 that is coupled to a length reference 5156. The coupler 5150 also directs beam portions to a fiber 5158 to produce local oscillator beams based on reflection of the combined beams at a fiber end 5160. Beams associated with the length reference are combined with the local oscillator beams at a reference photodetector 5162. Heterodyne frequencies associated with the length reference are produced and detected by the signal processor 5142 for use in calibration. For example, if the length reference has a length L and produces a heterodyne frequency difference $\Delta f$, a range scale factor $R_L$ can be obtained as $R_L = L/\Delta f$. Target range can then be calculated as $R = R_L \Delta f_m$.

Reference standards can be based on optical fibers having a precise length and that are coated with a metallic or other coating to prevent length changes associated with ambient humidity. Typical reference lengths are in a range of from about 1 m to 5 m. Temperature dependent length changes can be controlled by retaining the fiber in a temperature controlled, hermetically sealed container, or monitoring temperature to estimate temperature dependent length changes. Such a container can be made from aluminum or copper with fiber inputs and outputs metalized and soldered to the container where they pass through the wall. An O-ring seal can be incorporated into the lid to complete the sealing. Sealing can also be accomplished by welding or soldering the container. In addition, the container can be backfilled with a dry, inert gas to provide a moisture free environment for the fiber. A reference fiber can be overcoated with a polyimide layer and a sealing coat to reduce humidity induced changes. Sealing coatings can include metals such as gold or can be of inert materials such as carbon. Other representative reference standards based on multiple reflections are described in the examples below.

A controller 5128 is coupled to the sweep controller 5102, the signal processor 5142, and the scanning stage 5130 to permit assessment of range over target areas. The scanning stage 5130 can be configured to scan in a raster, a W-pattern, a spiral, or other selected pattern. In addition, the controller 5128 can be used to select and/or vary laser diode sweep rates based on target range, as well as measure and control component temperatures, but temperature sensors and controls are not shown in FIG. 51A. Typically optical isolators are inserted at various locations to reduce or eliminate unwanted back reflections that can produce undesirable changes in laser operation, but for convenient illustration, optical isolators are not shown in FIG. 51A. Laser beam wavelengths can be selected as convenient, and wavelengths of between about 1000 nm and 1600 nm are typical. A visible beam can be included as well to permit visual identification of a measurement location, but is not shown in FIG. 51A.

Figure 51B:
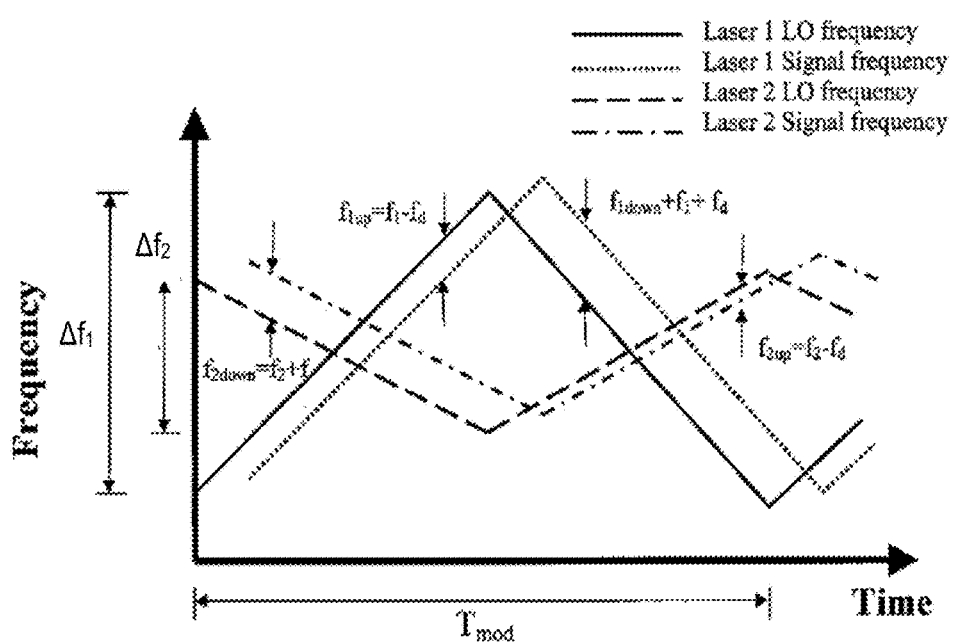
FIG. 51B illustrates heterodyne frequencies associated with a moving target location using the system of FIG. 51A.

FIG. 51B depicts linear frequency modulations (chirps) of measurement beam portions returned from an arbitrary moving target location from first and second laser diodes modulated to have different chirp rates. The chirps of the associated local oscillator beams are also shown. Heterodyne frequencies $f_1$, $f_2$ associated with each laser diodes are shown. The up and down chirped frequency differences for each laser include a Doppler shift contribution $f_d$ such that $f_{1up}=f_1-f_d$, $f_{1down}=f_1+f_d$, $f_{2up}=f_2-f_d$, and $f_{2down}=f_2+f_d$. Based on these difference frequencies, target speed and target range can be estimated. Typically, heterodyne frequencies are selected to be between 1 MHz and 100 MHz, but other frequencies can be used.

If a target surface is moving relative to the measurement beams, heterodyne frequencies corresponding to laser frequency upsweeps will be different from heterodyne frequencies corresponding to frequency downsweeps due to Doppler frequency shifting. Measurement of frequency differences between upsweeps and downsweeps permits estimation of target speed as well as target range. Any configuration of frequency sweeps that includes local oscillator frequencies that are greater and less than the measurement beam frequencies can be used. Additional details concerning such determinations can be found in Rezk and Slotwinski, U.S. Patent Appl. Publ. 2011/0205523, which is incorporated herein by reference.

Described below are numerous examples of methods, components, systems, and sub-systems for laser radar based range finding, laser radar, and laser tracking. These examples can be combined with one another to form various example laser radar systems, but these examples are not to be used to limit the scope of the disclosure.

Remote Local Oscillators

As discussed above, coherent laser radar systems generally direct a probe beam to a target, and mix radiation returned from the target with a reference optical signal that is referred to as a local oscillator signal. The returned radiation is then detected using interference between the returned radiation and the local oscillator using so-called coherent detection. In some cases, then the returned radiation and the local oscillator have a common frequency, and coherent detection is referred to as homodyne detection. In most practical applications, the probe beam and the local oscillator signal are at different frequencies, and the coherent detection is referred to as heterodyne detection. In heterodyne detection, signals associated with a sum and a difference of probe and local oscillator signals are produced. Due to the very high frequencies associated with the sum frequency (500 THz or more), only the difference frequency is generally detected and processed.

If a local oscillator is provided that does not propagate along a common path with the probe beam, range errors can be introduced due to drifts between a measurement optical path and a local oscillator optical path. While these drifts can in some cases be compensated, disclosed herein are local oscillator configurations that provide a more common path with the probe beam so that variations in the probe beam path and the local oscillator path tend to be similar and can offset each other. This reduces or eliminates errors due to temperature, vibration pressure, humidity or other environmental effects. Fiber-optic systems that deliver a dual wavelength measurement beam to scanning optics such as a pentamirror over a common optical fiber also reduce any dependencies on environmental effects. Thus, the disclosed systems are well adapted to fiber beam delivery to moving portions of a laser radar, i.e., fibers can deliver beams to optical systems mounted to rotational stages or other moving parts without introducing measurement error.

In representative examples described below, division of wavefront or division of amplitude approaches are used to form a measurement beam and an LO beam from a single input beam. In some examples, an input beam is directed through a first surface of a catadioptric optical system to a second surface of the catadioptric optical system that reflects a portion of the input beam back to the first surface. The first and second surfaces typically have reflective and transmissive areas so as to produce a first beam by transmission without reflection, and a second beam based on reflection by the first and second surfaces before transmission through the second surface. The first and second surfaces can be air spaced, or be provided as surfaces on a solid catadioptric optical element. Divergences of the first and second beams can be selected based on surface curvatures, spacings, and refractive indices. For convenience, a more diverging beam of the first and second beams is typically referred to as a measurement beam and a lesser diverging beam (typically collimated) as an LO beam. A reflective area on the second surface can be a central area or can be situated at a surface perimeter. In some configurations, a source location is typically relayed by the optical system to a different location such as closer to or more distant from a focus adjustment corner cube that is used to adjust beam focus on a target. Closer source locations typically permit use of smaller focus adjustment corner cubes, while more distant source locations tend to reduce the magnitude of any ghost reflections from corner cube surfaces. Input fibers can be index matched at fiber output surfaces to reduce reflections, or fiber output surfaces can be tilted with respect to a propagation axis defined by the fiber. In some examples, folded optical systems are used in which an LO beam, a measurement beam, or both are directed along a folded path. Mirrors, prisms, or other reflective optical elements can be used to fold the path as may be convenient.

Remote Local Oscillator: Example 1

With reference to FIG. 1, a laser radar system 100 includes an optical fiber 102 coupled to a light source such as a swept frequency laser that directs a chirped optical beam to a beam splitter assembly 104. A lens 106 is situated to receive the optical beam from the optical fiber 102 and produce a collimated beam that is directed into a beam splitter 108. The beam splitter 108 includes a partially reflective surface 109 that directs a measurement portion of the optical beam along a measurement beam path to an optical filter or waveplate 110 and an additional beam shaping lens 112. In some examples, the beam splitter 108 is a polarizing beam splitter but a non-polarizing beam splitter can be used as well. As shown, a mirror 114 is situated so as to direct a measurement beam 116 to a focus adjustment corner cube 120. The measurement beam is reflected by the corner cube 120 so as to be reflected back into the focus adjustment corner cube 120 by a return reflector 119. Upon exiting the focus adjustment corner cube 120, the measurement beam is shaped or focused by a lens 115 to form an optical beam 117 that is directed to a target. For clarity in FIG. 1, the measurement beam path in the corner cube is not shown, but the return reflector is generally displaced from a measurement beam propagation axis so that the measurement beam is not obstructed. By displacing the corner cube 120 from the lens 115 with one or more translation stages (not shown in FIG. 1), the measurement beam can be focused at a selected target distance. Portions of the measurement beam returned from the target ("return beam") propagate in the opposite direction of the measurement beam and are transmitted by the beam splitter 108 to one or more filters or waveplates 130 and a detector focus lens 132 so that the return beam is received by a detector 134.

The partially reflective surface 109 of the beam splitter 108 transmits a local oscillator portion (LO beam) to an optical filter or waveplate 118 and then to the focus adjustment corner cube 120. The LO beam is directed by the focus adjustment corner cube 120 to an LO reflecting corner cube 122 along a path 125. The LO corner cube 122 is situated so that the LO beam is returned to the focus adjustment corner cube 120 and propagates along a path 127 that is parallel to and displaced from the path 125. In other examples, a roof prism is used to reflect and shift the LO beam instead of a corner cube. The LO beam then exits the focus adjustment corner cube 120 and is incident to a retroreflector 124 that redirects the LO beam along the paths 127, 125 so as to return to the beam splitter 108. The beam splitter 108 reflects at least a portion of the LO beam so as to be incident to the detector 134. Thus, portions of both the measurement beam and the LO beam are received by the detector so that a heterodyne signal can be obtained.

As shown in FIG. 1, the LO beam propagates through the corner cube four times along optical paths that are parallel to and displaced from measurement beam paths. The measurement beam propagates twice through the focus adjustment corner cube 120 before being directed to a target. The return beam from the target follows the measurement beam path in reverse thus traversing the focus adjustment corner cube 120 two more times so that any path differences produced by the focus adjustment corner cube 120 are substantially the same for both the LO beam and the measurement/return beam.

Although the focus adjustment corner cube 120 of FIG. 1 is also used in providing the LO beam, the size of the focus adjustment corner cube 120 need not increase to accommodate LO optics, depending on the location of the LO beam path. In the example of FIG. 1, the input/exit surfaces of the corner cubes 120, 122 and other optical surfaces can produce undesirable reflections that can complicate range determination. Each such reflection typically produces a secondary or "ghost" LO beam that may be used (either intentionally or accidentally) in determining a range estimate. Since the locations of these surface reflections are known, multiple measurements based on a primary LO beam or on one or more secondary "ghost" beams can be combined to produce range estimates. However, in most practical examples, these ghost reflections are avoided to permit simpler range determinations. To reduce the magnitude of such reflections, some or all surfaces can be provided with suitable antireflection coatings. Alternatively, surfaces can be tilted with respect to the local oscillator beam such as by providing wedged optical elements. In other examples, hollow optical elements can be used to avoid such surfaces. For example, a hollow corner cube can be formed of three first surface mirrors. Such a hollow corner cube lacks surfaces associated with unwanted multiple reflections.

Remote Local Oscillator: Example 2

Figure 2:
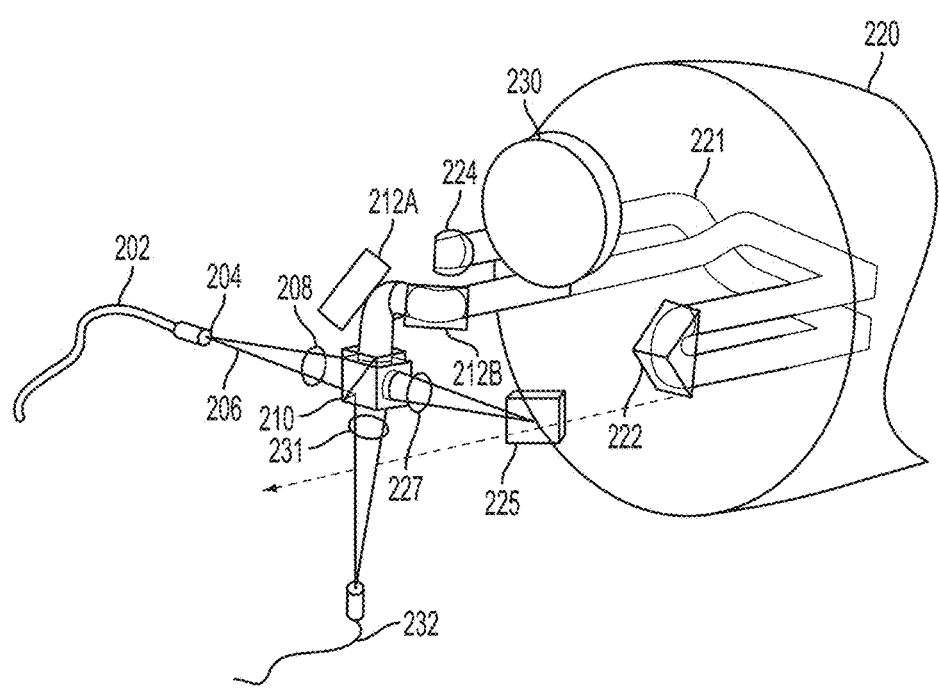
FIG. 2 is a perspective view of a portion of a representative laser radar system that includes a remote local oscillator beam.

With reference to FIG. 2, a laser radar system includes an optical fiber 202 that has an exit surface 204 configured to deliver a chirped laser beam 206 to a collimating lens 208 and to a beam splitter cube 210. An LO portion of the chirped laser beam 206 is reflected to mirrors 212A, 212B and then to a focus adjustment corner cube 220. The focus adjustment corner cube 220 is generally configured to be translatable to provide focus adjustment for a measurement portion of the chirped laser beam, but translation mechanisms are not shown in FIG. 2. The LO beam propagates along a path 221 through the corner cube 220 to an LO right angle prism 222 and to a retroreflector 224. The LO right angle prism 222 is situated so as to serve as a roof prism, as the prism hypotenuse is used as an entrance/exit surface, and the right angles faces serve to reflect the LO beam. Other prisms, such as roof prisms can be used. The retroreflector 224 returns the LO beam along the path 221 to the right angle prism pair 212A, 212B and to the beam splitter cube 210. As shown in FIG. 2, the beam splitter cube 210 transmits the LO beam or a portion thereof to a focusing lens 231 that directs the LO beam to an optical fiber 232 that can be coupled to a detector (not shown).

The measurement portion of the chirped laser beam 206 (the measurement beam) is transmitted by the beam splitter cube 210 and focused by a lens 227 to form a diverging beam at or near a mirror 225 that directs the measurement beam to the focus adjustment corner cube 220 along a measurement beam path to a return reflector 230. The measurement beam path is offset from the LO beam path 221, but is not indicated in FIG. 2 for clarity. After reflection by the return reflector 230, the measurement beam is reflected back along the measurement beam path towards the mirror 225. Because the measurement beam is diverging, the mirror 225 does not appreciably obstruct the measurement beam. The measurement beam is incident on an objective lens (not shown) that shapes or focuses the measurement beam at a target surface. A return beam from the target follows the measurement beam path in reverse so that the beam splitter cube 210 reflects the measurement beam to the focusing lens 231 that directs the return beam (and the LO beam) to the optical fiber 232.

As shown in FIG. 2, the LO beam and the measurement beam/return beam propagate along parallel, displaced paths in the focus adjustment corner cube 220, and the total path length in the focus adjustment corner cube 220 is substantially the same for the LO beam and the measurement beam/return beam. The LO beam propagates as a collimated beam in the focus adjustment corner cube 220, while the measurement beam and return beam are diverging and converging respectively.

Remote Local Oscillator: Example 3

Figure 3:
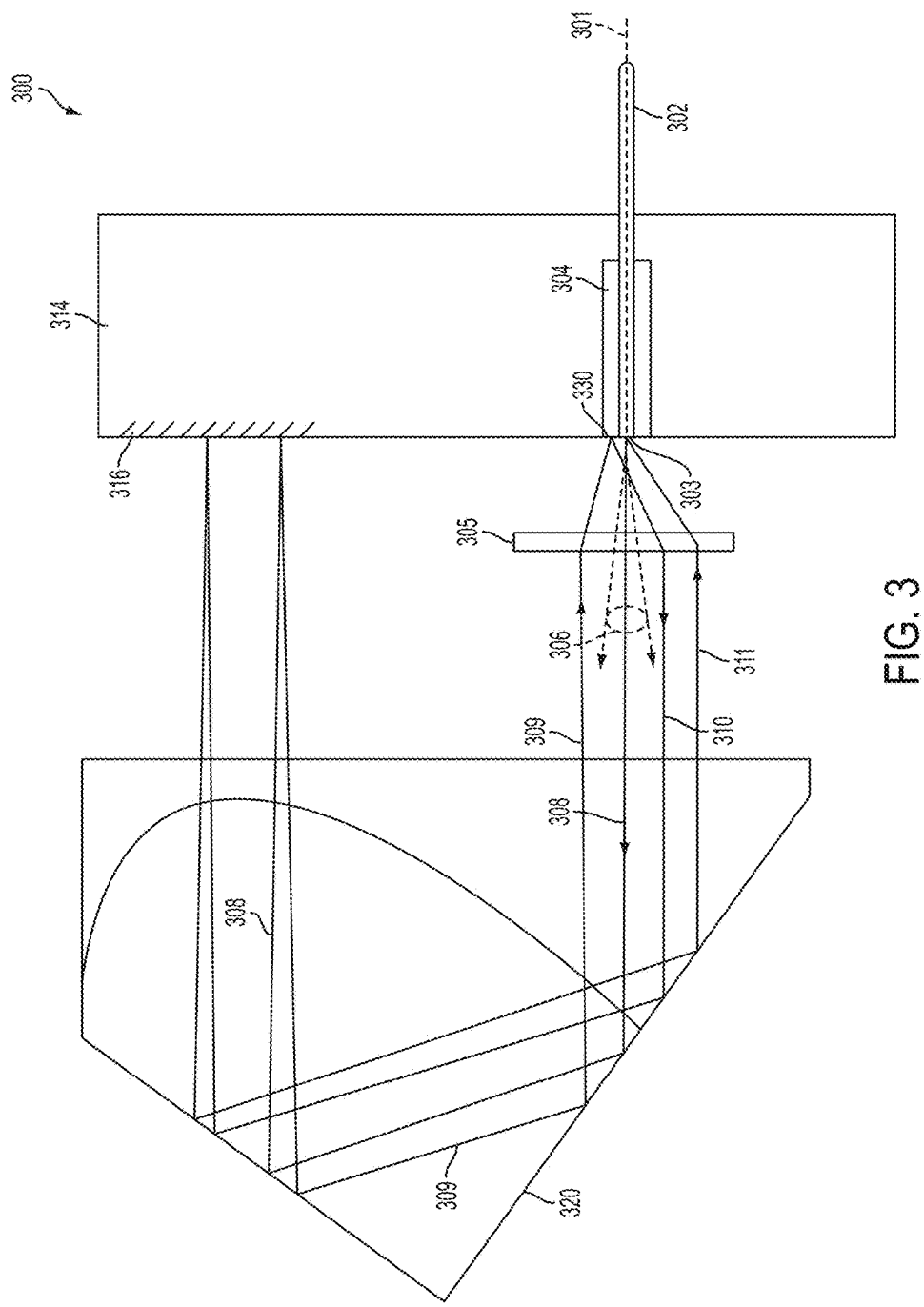
FIG. 3 is a schematic diagram of a portion of a representative laser radar system that includes a reflective surface situated at or near a fiber input and configured as part of an optical path of a local oscillator beam.

In some examples, a measurement beam portion and an LO beam portion are configured to propagate at a slight angle with respect to each other. Referring to FIG. 3, a portion an optical system 300 for a laser radar includes an optical fiber 302 that extends through a ferrule 304 that is retained by a supporting substrate 314. The optical fiber 302 emits a chirped optical beam from a fiber end surface 303 that is directed to a Fresnel zone plate 305 or other optical element that transmits a measurement beam portion 306 along an axis 301. The measurement beam 306 typically retains a beam divergence corresponding to a numerical aperture of the optical fiber 302. An LO beam portion is collimated by the zone plate 305 so as to propagate along an axis 308 that is at an angle with respect to the axis 301. The LO beam is coupled through a focus adjustment corner cube 320 to a reflective surface 316 that returns the LO beam toward the Fresnel zone plate 305 but along an axis 309 that is at an angle with respect to the axes 301, 308. The LO beam is focused by the zone plate 305 at a location displaced from but approximately or exactly coplanar with an emission area of the fiber end surface 303. In some examples, the LO beam is focused onto a polished ferrule surface 330 that reflects the LO beam along an axis 311. The LO beam then propagates back to the reflective surface 316 through the focus adjustment corner cube 320 and returns along an axis 311 so that the zone plate 305 focuses the LO beam back into the fiber 302. The zone plate 305 reimages the end surface 303 onto the end surface 303. Because the end surface 303 is situated at or near a focal point of the zone plate 305, LO beam propagation along the axes 308, 309, 310, 311 results in refocusing of the LO beam into the optical fiber 302.

The measurement beam 306 is divergent and is directed through the corner cube 320 to a return reflector and then back through the corner cube 320 to an object lens that focuses the measurement beam at a target. A return beam follows this path in reverse, and is coupled into the optical fiber 302 along with the LO beam. To simplify FIG. 3, the measurement beam path, return reflector, and objective lens are not shown. The divergence of the measurement beam and the relative tilt of the LO propagation axes with respect to the axis 301 are exaggerated for convenient illustration. Multiple reflections at corner cube surfaces can be reduced with anti-reflection coatings, and effects associated with unwanted reflections at the end surface 303 of the fiber 302 can be reduced using an angle polished (APC) connectorized fiber.

Remote Local Oscillator: Example 4- Measurement Beam/LO Beam Production

Collimated beam portions (typically used as LO beams) and diverging beam portions (typically used as measurement beams) can be obtained with a variety of optical arrangements, examples of which are illustrated below. Such optical systems can be based on division of beam amplitude or wavefront as may be convenient. In some examples, optical fibers are used to supply a beam to be divided into a measurement beam and an LO beam. To reduce reflections from fiber end surfaces, curved or angled surfaces can be used, or fiber end surfaces can be secured with an optical adhesive that can be selected to provide an approximate index match. In some examples, the fiber is cemented to a first surface, and LO and measurement beams are formed using combinations of reflection and transmissive at the first surface and a second surface. Beam collimation or divergence can be provided based on surface curvatures and separations.

Reflective Division of Wavefront Coupled Fiber Configurations

Figure 4:
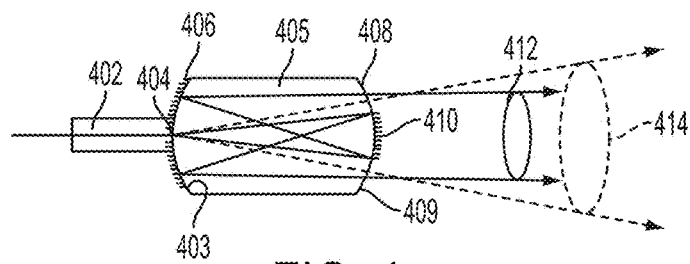
FIGS. 4-7 are schematic diagrams illustrating optical systems configured to produce a local oscillator beam and a measurement beam from a common input beam based on a division of input beam wavefront.

In the examples of FIGS. 4-7, a fiber is coupled to a catadioptric or other optical element, typically with an optical adhesive to reduce fiber end surface reflections. With reference to FIG. 4, an optical fiber 402 is configured to emit an optical beam that is transmitted by transmissive aperture 404 defined on an first surface 403 of a double convex lens 405 formed of an optical glass, fused silica, or other transmissive optical material. The optical fiber 402 can be cemented to the first surface 403. A portion the optical beam is reflected by a central reflective area 410 defined on a second surface 408 of the lens 405 to an outer reflective area 406 on the first surface 403. The reflective area 406 directs the reflected beam to an outer transmissive portion 409 of the second surface 408 so that a beam 412 is formed. A portion of the input optical beam is transmitted by the outer transmissive portion 408 of the second surface without internal reflections to form a diverging beam 414. The beams 412, 414 can be further directed so as to become a measurement beam or an LO beam, and beam shapes, sizes, and divergences can be selected based on curvatures and spacing of the first and second surfaces 403, 408 and an index of refraction of the lens 405. The lens 405 need not be biconvex, but can have convex, concave, spherical, or aspheric surfaces as illustrated in some of the following additional examples. In addition, the first and second surfaces 403, 408 can be defined on separate surfaces and spaced apart and a solid lens element is not required.

Figure 5:
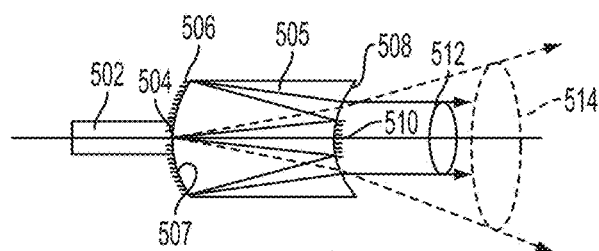

FIG. 5 illustrates an optical system that produces LO and measurement beams from a single beam input received from a fiber 502 at a transmissive aperture 504 at a first surface 507 of a catadioptric optical element 505. An LO beam is obtained by reflecting a portion of the input beam at a central reflective area 510 of a second surface 508 and an outer reflective portion 506 of the first surface 507. The LO beam is then refracted at an outer portion of the second surface 508 to produce a collimated beam 512. A diverging measurement beam is produced by transmitting a portion of the input beam around the central reflective area 510 of the second surface 508 to form a measurement beam 514. The catadioptric optical element 505 includes a convex first surface and a concave second surface, but other surface curvatures can be used.

Figure 6:
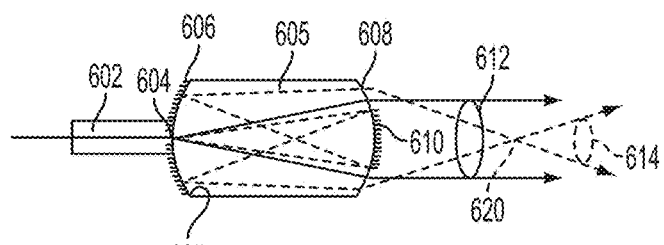

In another example illustrated in FIG. 6, an optical system produces LO and measurement beams from a single beam input received from a fiber 602 at a transmissive aperture 604 at a first surface 607 of a catadioptric optical element 605. A measurement beam is obtained by reflecting a portion of the input beam at a central reflective area 610 of a second surface 608 and an outer reflective portion 606 of the first surface 607. This portion of the input beam is then refracted at an outer portion of the second surface 608 to produce a measurement beam 614 that diverges from a focus 620. A collimated LO beam is produced by transmitting a portion of the input beam around the central reflective area 610 of the second surface 608 to form an LO beam 612. The catadioptric optical element 605 includes convex first and second surfaces, but other surface curvatures can be used. A curvature of the second surface is selected so that the LO beam is substantially collimated.

Figure 7:
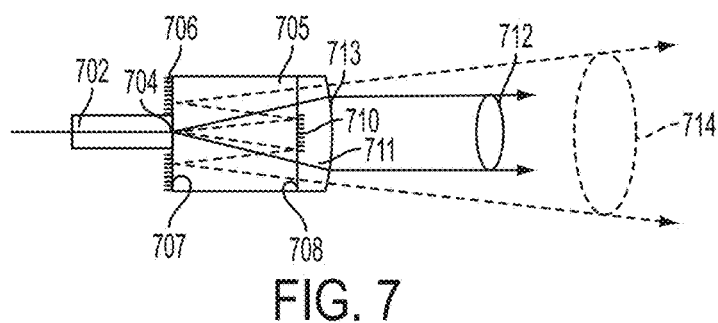

FIG. 7 illustrates yet another example optical system. In this example, an optical fiber 702 delivers an input beam to a transmissive aperture 704 defined on a first surface 707 of a catadioptric optical element 705. An LO beam portion is transmitted around a central reflective area 710 of a second surface 708 to a lens 711 that collimates the LO beam. The central reflective area 710 can be provided as a reflective coating on one or both of the lens 711 and the catadioptric optical element 705. A measurement beam is obtained by reflecting a portion of the input beam at the central reflective area 710 of the second surface 708 and an outer reflective portion 706 of the first surface 707. The measurement beam is then refracted at a convex surface 713 of the lens to form a diverging measurement beam 714. In this example, the first surface 707 and the second surface 708 are planar surfaces, and the additional lens element (lens 711) is a plano-convex lens that can be cemented to the catadioptric optical element 705.

Figure 8:
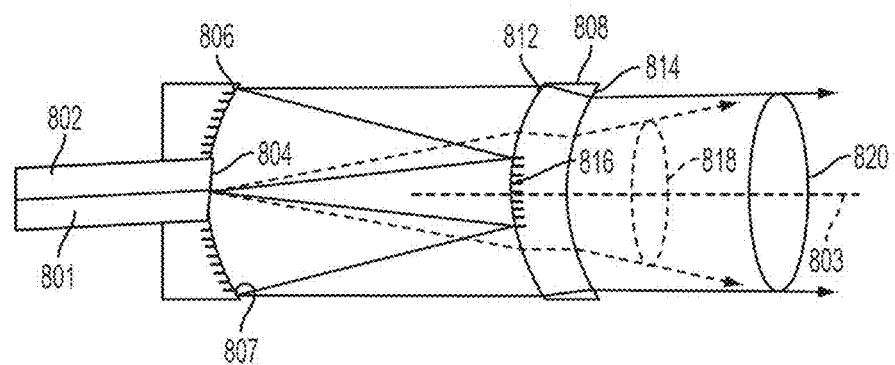
FIGS. 8-9 are schematic diagrams illustrating optical systems configured to produce a local oscillator beam and a measurement beam from a common input beam based on a division of the input beam wavefront and to reduced unwanted multiple reflections with an angled fiber beam coupling surface.
Figure 9:
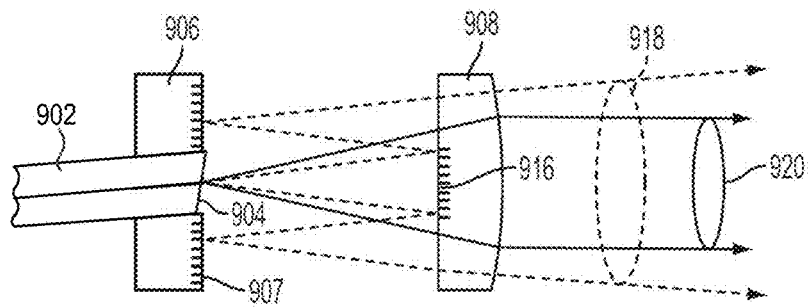

Examples in which fiber end surfaces are tilted with respect to a fiber axis are shown in FIGS. 8-9. Referring to FIG. 8, a fiber 802 is inserted into an aperture defined in a first reflective optical element 806. To reduce back reflections, the fiber 802 terminates at a tilted end surface 804. As shown in FIG. 8, the tilted end surface 804 is situated so that a fiber axis 801 aligns with an optical system axis 803 in consideration of refraction of the fiber axis 801 upon exiting the fiber 802. In other examples, the fiber is retained so that the axes 801, 803 form a straight line axis, and emission from the tilted end surface 804 propagates at an angle with respect to the optical system axis 803. In most cases, these tilts are small, and are exaggerated in FIG. 8 for purposes of illustration. An LO portion of an input beam from the fiber 802 is reflected by a central reflective area 816 defined on a surface 812 of a convex/concave catadioptric optical element 808 back to a reflective surface 807 of the reflective optical element 806. The reflected portion is then refracted by a convex/concave catadioptric optical element 808 to form a collimated beam 820. A measurement beam portion is transmitted to the catadioptric optical element 808 to produce a measurement beam 818. The optical elements 806, 808 are spaced apart, and spacing and curvatures can be selected for beam shaping as preferred.

Referring to FIG. 9, a fiber 902 is inserted into an aperture defined in a planar reflective optical element 906. To reduce back reflections, the fiber 902 terminates at a tilted end surface 904. The effects of a measurement portion of an input beam from the fiber 902 is reflected by a central reflective area 916 of a surface 912 of a plano-convex catadioptric optical element 908 back to a reflective surface 907 of the reflective optical element 906. The reflected portion is then refracted by the catadioptric optical element 908 to form a diverging beam 918. An LO beam portion is transmitted to the catadioptric optical element 908 to produce an LO beam 920. The optical elements 906, 908 are spaced apart, and spacing and curvatures can be selected for beam shaping as preferred.

Figure 10:
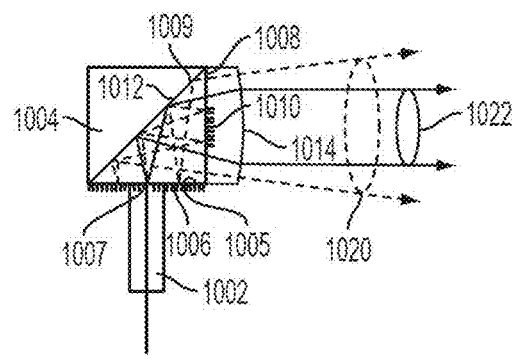
FIG. 10 is a schematic diagram of a representative folded optical system that includes an angled fiber beam coupling system and that can produce measurement and local oscillator beams from a common input beam.

FIG. 10 illustrates a configuration similar to that of FIG. 7, but with a folded axis. A fiber 1002 is situated to couple an input beam to a cube reflector 1004 formed as a right angle prism pair with a reflective coating through a transmissive aperture 1007 of a cube reflector input surface 1005. A reflective surface 1009 of the cube reflector 1004 reflects an LO beam portion around a reflective area 1010 of a cube reflector exit surface 1008 to a plano-convex lens 1014 so as to form a collimated LO beam 1022. A measurement beam is formed by reflecting a portion of the input beam at the reflective central area 1010 and a reflective portion 1006 of the cube reflector input surface 1005. The measurement beam is then transmitted around the central reflective area 1010 to the lens 1014 to form a diverging measurement beam 1020.

Figure 11:
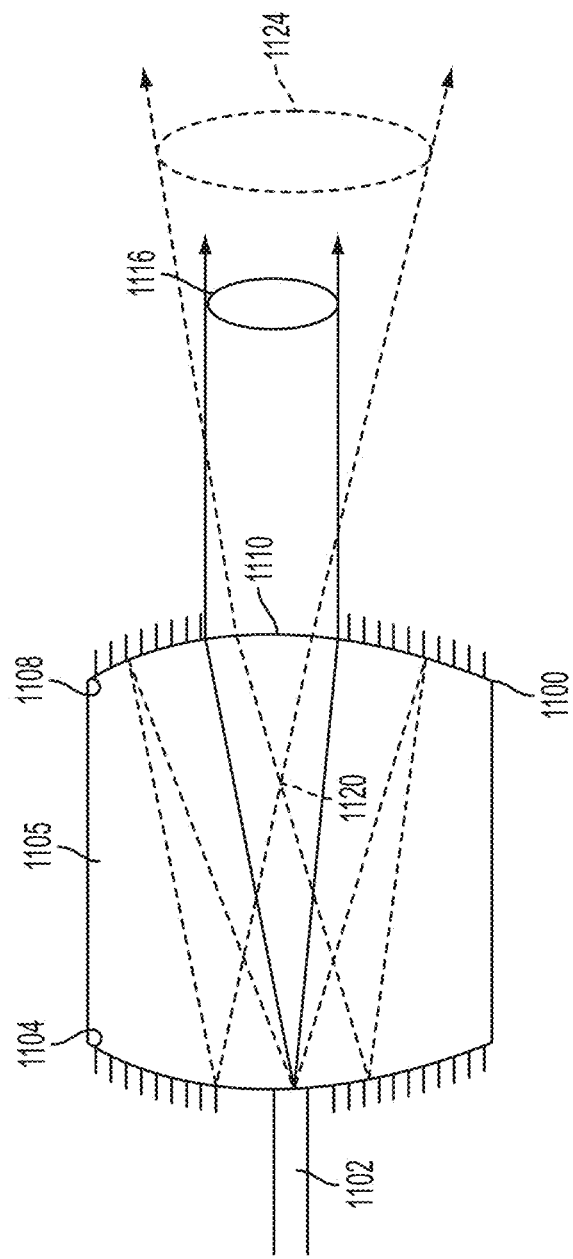
FIGS. 11-12 are schematic diagrams of additional catadioptric optical systems that can produce a measurement beam and a local oscillator beam.

In the disclosed examples, solid catadioptric elements are used in which reflective coatings are provided over selected parts of concave, convex, or planar surfaces. Spaced apart optical elements are also used in some examples. Generally, a central portion of at least one optical surface is reflective and a central portion of at least one optical surface is transmissive so that the optical path for at least one beam is folded, but there are many possible variations. In some cases, an input beam is transmitted through a central transmissive portion of an optical element to form an LO or measurement beam, without reflection. The other beam (LO or measurement beam) is then produced with reflection at an outer portion of the optical element. A representative example is shown in FIG. 11 in which a fiber 1102 couples an input beam to a solid catadioptric element 1105 that has a central transmissive area 1110 on an output surface 1100. An LO beam 1116 is formed by transmission and refraction of a portion of the input beam by the output surface 1100, without reflection. A portion of the input beam is reflected at an outer reflective area 1108 of the output surface 1106 to a reflective input surface 1104. The reflected portion forms a focus at 1120 and is then transmitted by the central transmissive area to form a diverging measurement beam 1124.

Figure 12:
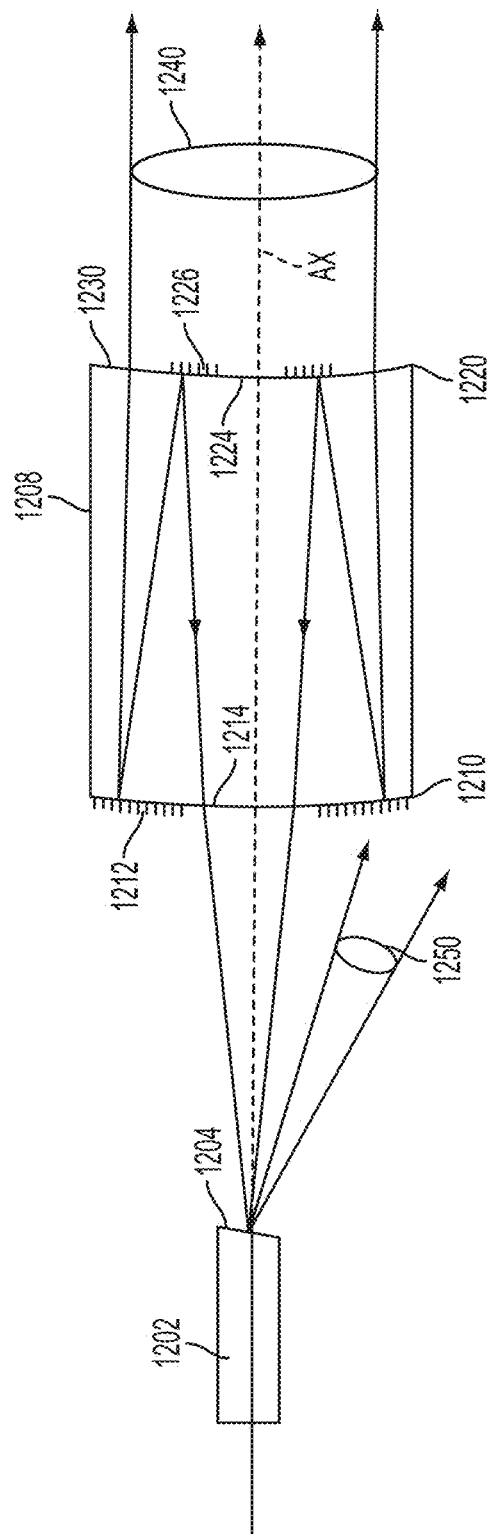

FIG. 12 illustrates a solid catadioptric optical element 1208 that is situated to receive an input optical beam exiting an optical fiber 1202 at a tilted end surface 1204. The optical element 1208 includes a first surface 1210 and a second surface 1220 that are centered on an axis AX. The first surface 1210 includes an outer reflective area 1212 and a central transmissive area 1214. The second surface 1220 includes a central transmissive area 1224, an intermediate reflective area 1226, and an outer transmissive area 1230. As shown in FIG. 12, a collimated beam 1240 is formed. A diverging beam (not shown) can also be formed by transmission of a portion of the input beam through the central transmissive area 1224. Because of the tilt of the fiber end surface 1204, a reflected beam 1250 is directed away from the axis AX and is not captured by the optical system.

Figure 13:
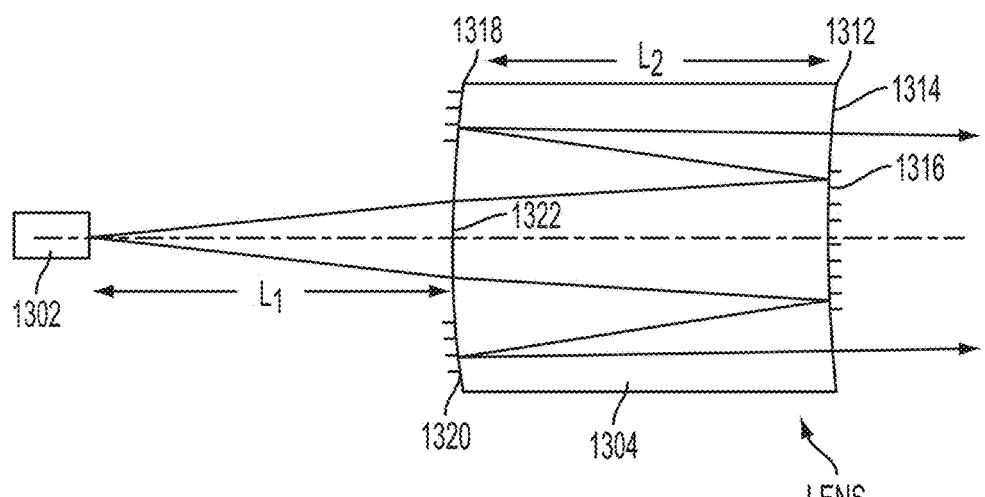
FIG. 13 is a schematic diagram of a zero power lens configured to produce measurement and local oscillator beams from a common input beam.

As shown in the examples above, collimated LO beam generation is accompanied by generation of a non-collimated, diverging or converging measurement beam. A so-called "two power" element can be used as shown in FIG. 13. A solid catadioptric element 1304 has a first surface 1318 having a transmissive central aperture 1322 and reflective annulus 1320. A second surface 1312 has a central reflective area 1316 and a transmissive annulus 1314. Curvatures of the first and second surfaces can be selected so that the catadioptric element 1304 has a first power or focal length for a straight through beam and second power for a beam that is reflected along a folded path within the catadioptric optical element 1304. For a meniscus shape, if the curvatures of the two surfaces are approximately equal, the catadioptric element serves as a zero power lens for the straight through beam. (In this case curvatures are selected based on thickness, as equal curvatures produce zero power only in a thin lens approximation.) Production of a collimated beam based on an input beam from an optical fiber is illustrated, and a diverging beam is not shown.

Figure 14:
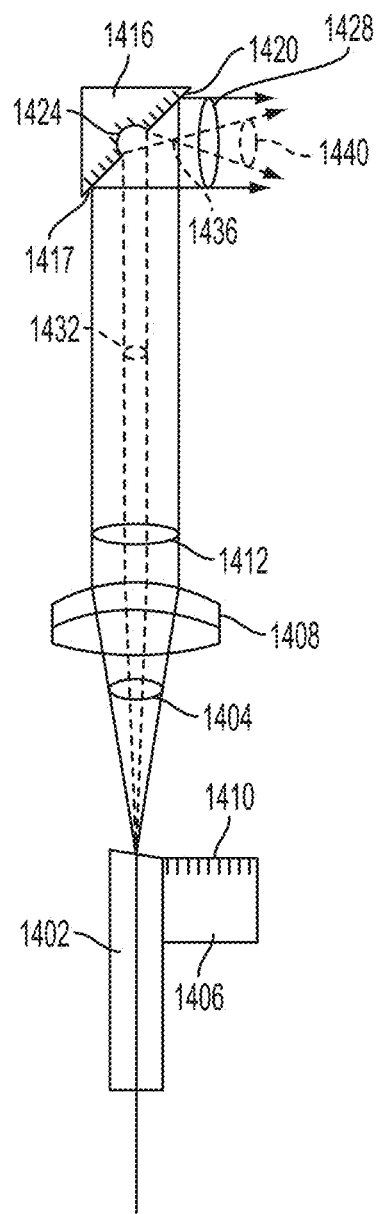
FIG. 14 is a schematic diagram illustrating a reflective surface that is provided with portions having two different surface curvatures for separation of an input beam into measurement and LO beams.

With reference to FIG. 14, an optical fiber 1402 is situated to direct an input optical beam 1404 to a collimating lens 1408 that produces a collimated beam 1412 that is directed to a reflective surface 1417 of a right angle prism 1416. The prism 1416 includes a planar reflective area 1420 and a curved reflective area 1424. The planar reflective area 1420 is situated to reflect an outer portion of the collimated beam 1412 to produce a collimated LO beam 1428. The curved reflective area 1424 is situated to focus an inner portion 1432 of the collimated beam 1412 to a focus 1436 and produce a divergent measurement beam 1440. If the central reflective area 1424 is concave, the measurement beam comes to a real focus 1436 as shown. However a convex curvature may be used and would produce a virtual focus. The central area can also be planar, and the outer area curved. Generally, any combination of different curvatures for inner and outer portions can be used and the incident beam 1412 need not be collimated. A right angle reflection is shown for convenient illustration, but other angles can be used. A reflective surface 1410 at the fiber exit surface can be provided if multiple reflections of an LO beam are desired.

Refractive Division of Wavefront Coupled Fiber Configurations

In many examples, reflective surfaces are included, but optical systems that include only transmissive or refractive surfaces can be used. For example, a refractive optical element having at least one bifurcated or other compound optical surface can be used. As shown in FIG. 15, an optical system includes a fiber 1502 that is situated to deliver an input optical beam along an axis 1508 to a double convex lens 1510 having convex input/output surfaces 1512, 1514. (A slight deviation of the axis 1508 with respect to a propagation axis 1507 in the fiber 1502 due to a tilt of a fiber output surface 1503 is not shown.) In the example of FIG. 15, the output surface 1514 has an outer annular portion 1516A and a second lens 1518 is secured to the first lens 1510 so as to cover an axial portion. The second lens 1518 is shown as a concave/convex lens that can be cemented or otherwise contacted to the first lens 1510, or can be air spaced from the first lens either on or off of the axis 1508. Other surface curvatures can be used for one or both of the first lens 1508 and the second lens 1518, and output side curvature of the first lens 1510 need not match the input side curvature of the second lens 1518. In other examples, bifurcated lenses are used.

An annular portion 1516 of the lens 1510 is selected to produce a converging optical beam 1530 that can serve as an LO beam. The second lens 1518 produces a converging beam 1532 that can serve as a measurement beam. As shown above in FIG. 3, a reflective surface 1536 can be provided at the fiber exit surface 1503 to direct an LO beam so that after multiple reflections, the LO beam is coupled back into the optical fiber 1502. In other examples, a collimating lens can be secured to the fiber, and a second lens can be used to intercept a portion of the collimated beam to form a measurement beam.

Representative bifurcated lenses 1602, 1612, 1622 are shown in FIGS. 16A-16C. The lens 1602 includes a first convex surface 1604 and a second convex surface 1606. An axial portion 1608 of the second convex surface 1606 is provided with a curvature different from that of a curvature of other portions of the second convex surface 1606. Similarly, the lens 1612 includes a plano surface 1614 and a convex surface 1616. An axial portion 1618 of the surface 1616 is provided with a curvature different from that of a curvature of other portions of the convex surface 1606. In the example of FIG. 16C, a lens 1622 includes a convex surface 1624 and a plano surface 1626. An axial portion 1628 of the lens 1622 is provided with a curvature different from that of a curvature of other portions of the plano surface 1626. The axial portion 1628 can be integral to the lens 1624, or can be provided with an additional lens element secured to or spaced apart from the surface 1626.

Polarization Based Division of Amplitude Beam Separation

Figure 17:
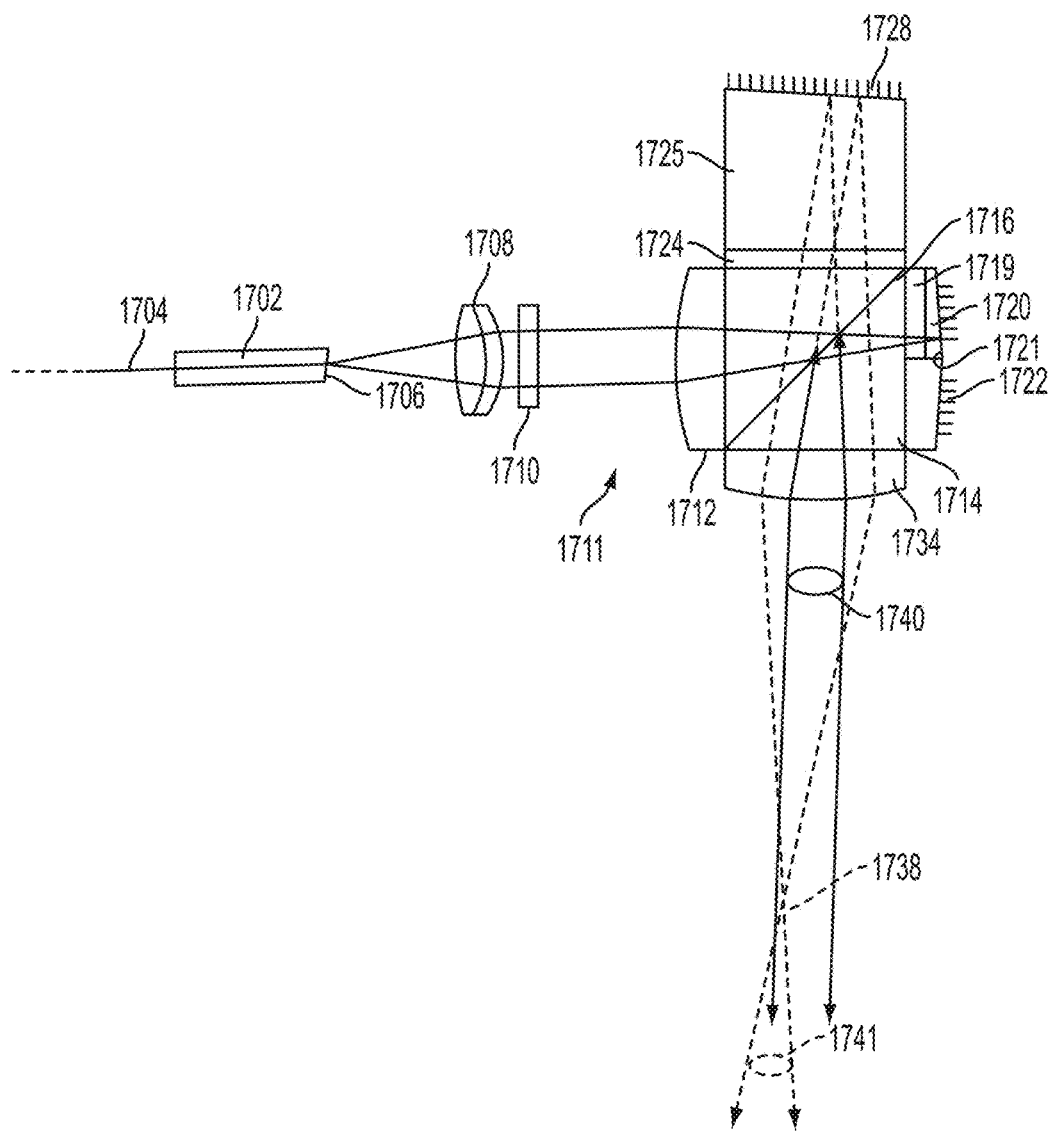
FIG. 17 illustrates a representative optical system that can produce measurement and local oscillator beams from a common input beam using a polarizing cube beam splitter (PBS) and quarter wave retarders.

Referring to FIG. 17, a beam separation optical system includes an optical fiber 1702 that is configured to direct an optical beam along an axis 1704 to a collimating lens 1708 and a waveplate 1710. The waveplate 1710 is oriented so as to produce a selected state of polarization (SOP) for the received optical beam. In most practical examples, the optical beam from the optical fiber 1702 is a linearly polarized beam, and the waveplate 1710 is a half wave retarder that can be oriented to produce a linear SOP in an arbitrary direction. An optical assembly 1711 is situated so as to receive the optical beam, and includes an input lens 1712, a polarizing beam splitter (PBS) 1714, a quarter wave plate 1719, and a wedge prism 1720 with a reflective surface 1721. A portion of the input beam in a first SOP is transmitted by a PBS reflecting surface 1716 through the quarter wave plate 1719 and is then reflected by the reflective surface 1721 back through the quarter wave plate 1719. The quarter wave retarder 1719 is arranged so that upon traversing the quarter wave retarder 1719 twice, the first SOP is transformed into a second SOP, orthogonal to the first SOP. The reflecting surface 1721 thus directs the transmitted beam to the PBS reflective surface 1716 which reflects the beam to an output lens 1734 so as to produce a collimated beam 1740.

The PBS reflective surface 1716 directs a measurement beam portion of the input beam in the second SOP to a quarter wave retarder 1724 and a reflective surface 1728 that can be provided on a surface of a solid prism 1725. The quarter wave retarder 1724 is arranged so that upon traversing the quarter wave retarder 1724 twice, the second SOP is transformed into the first SOP so that the reflected measurement beam is transmitted by the PBS reflective surface 1716. The output lens 1734 converges the measurement beam to a focus at 1738 beyond which an output measurement beam 1741 diverges. The SOP of the input beam can be selected based on retardance and orientation of the wave plate 1710, so that portions of the input beam reflected and transmitted by the PBS can be chosen to obtain a selected division of optical power between measurement and LO beams. As shown in FIG. 17, the beams 1740, 1741 propagate along non-parallel axes.

The collimated LO beam 1740 is directed to a focus adjustment corner cube and return mirror (not shown in FIG. 17) and is returned to the lens 1734. However, the returned LO beam is incident to the reflective surface 1716 so as to be directed to reflective surface 1722 without traversing a waveplate. In contrast to the reflective surface 1721, the reflective surface 1722 does not have a corresponding retarder such as quarter-wave retarder 1719. The reflective surface 1722 then directs the LO beam back to the focus adjustment corner cube and return mirror. The LO beam is then returned to through the lens 1734 so as to be reflected by the reflective surface 1716 to the quarter-wave retarder 1719 for reflection by the reflective surface 1721 to the fiber 1702. Typically, tilts of the reflective surfaces 1720, 1721, 1728 are chosen to be as small as possible while maintaining sufficient separation of the LO beam and the measurement beam, and also to provide sufficient displacement of the LO beam at reflective surfaces 1721, 1722.

Figure 18:
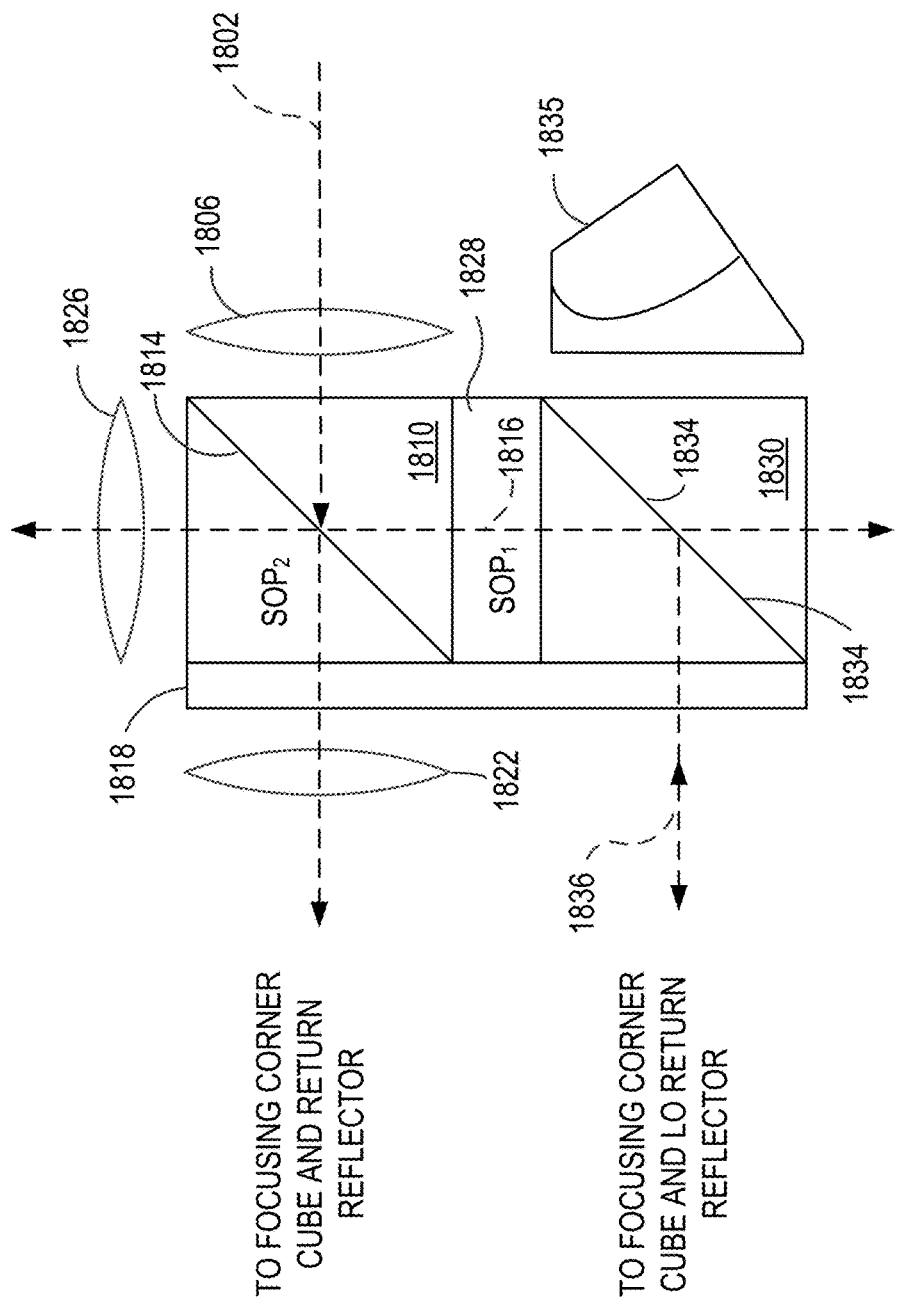
FIGS. 18-19 illustrate a representative optical system that can produce measurement and local oscillator beams from a common input beam using polarizing beam splitters and retarders.

With reference to FIG. 18, an optical fiber or other input beam source is situated to direct an optical beam along an axis 1802. A first beam shaping lens 1806 and a polarizing beam splitter (PBS) 1810 are situated on the axis 1802, and a reflective surface 1814 of the PBS 1810 is situated to reflect a portion of the input beam along a folded axis 1816 and transmit a portion of the input beam to a quarter wave retarder 1818. The reflected and transmitted beam portions correspond to first and second orthogonal (typically linear) states of polarization (SOPs), respectively. A second beam shaping lens 1822 is situated along the axis 1802 to produce a measurement beam that can be directed to a target. (Alternatively, this beam can serve as an LO beam.) The quarter wave retarder 1818 is situated to transform the second SOP that is associated with the transmitted beam into a circularly polarized transmitted beam. This circularly polarized beam is directed to a target as a measurement beam, typically using a focus adjustment corner cube arrangement such as illustrated in FIG. 1.

A portion of the measurement beam reflected at a target can be returned to the second beam shaping lens 1822 as a circular polarization with or without a change in handedness. If returned with a change in handedness, the circular SOP of the returned beam is converted by the quarter wave retarder 1818 into the second SOP that is reflected by the PBS 1810. A third beam shaping lens 1826 directs the returned measurement beam from the PBS 1810 to a detector or to a fiber or other optical system for delivery to a detector.

The PBS 1810 is situated to direct a reflected beam portion as a first (linear) polarization for use as an LO beam along the folded axis 1816. A quarter wave retarder 1828 is situated on the axis 1816 along with a PBS 1830. A reflective surface 1834 of the PBS 1830 is configured to reflect a beam portion along an axis 1836 that is parallel to and offset from the axis 1802. The quarter wave retarder 1828 is oriented so as to produce a circular SOP from a linear SOP (the first SOP) as reflected by the PBS 1810, so that some optical power exits the PBS 1830 along the axis 1816 and is not recaptured. An LO beam is reflected by the PBS 1830 through the quarter wave retarder 1818 to produce an LO beam in a first circular SOP. This circularly polarized LO beam is then directed to a focus adjustment corner cube and an LO return reflector 1835 that directs the LO beam back along the axis 1836.

Figure 19:
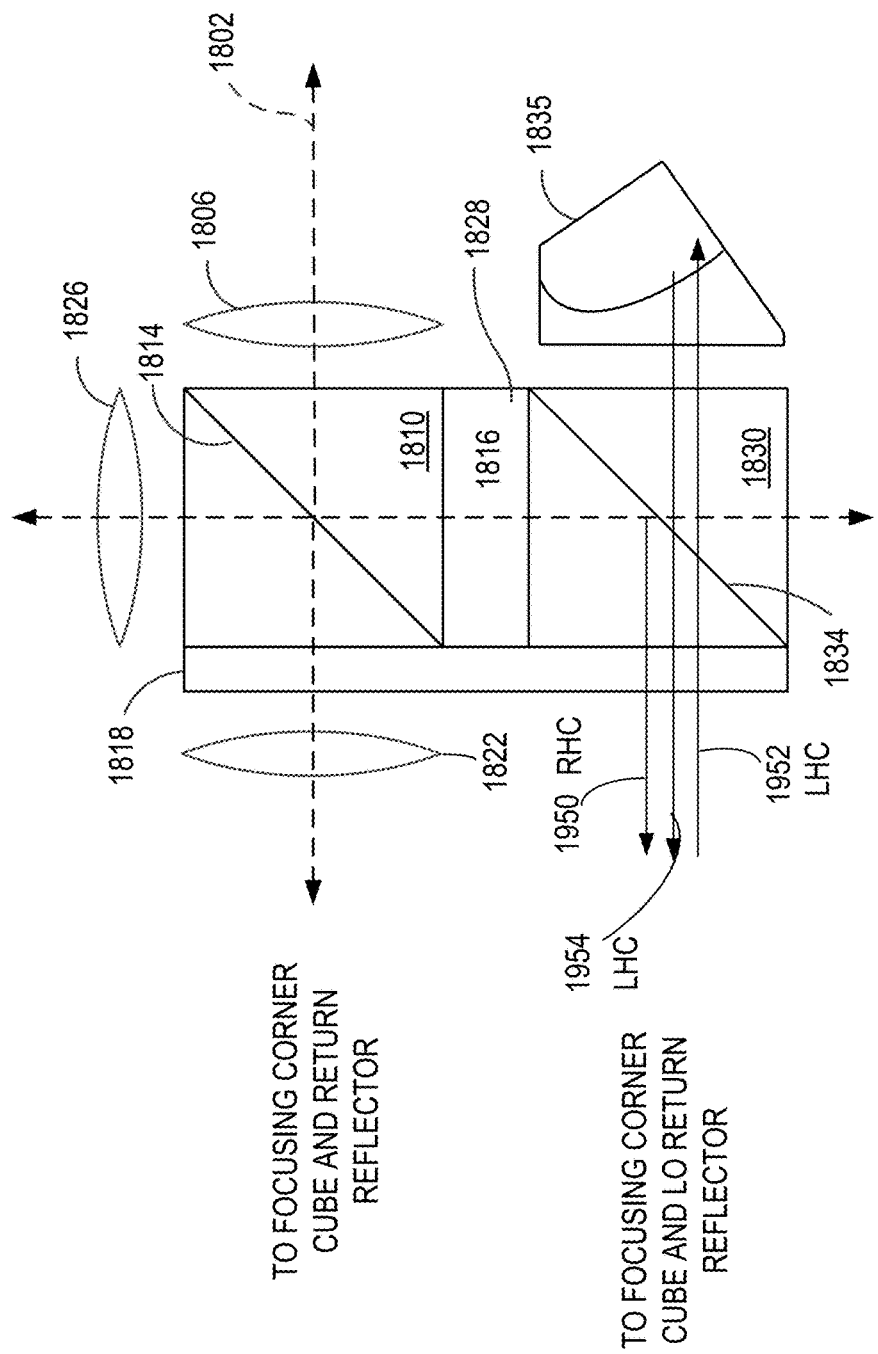

FIG. 19 illustrates the optical system of FIG. 18, showing an LO beam 1950 in a first circular SOP (for example, as a right handed circular SOP or "RHC") propagating to a focus adjustment corner cube. A circularly polarized LO beam 1952 in a second circular SOP (for example, as a left handed circular SOP or "LHC") orthogonal to the first circular SOP is reflected back to the quarter wave retarder 1818. The reflected LO beam 1952 is generally returned from a focus adjustment corner cube and a return mirror or a dedicated LO reflector as shown in FIG. 1, but such an LO return reflector is omitted from FIGS. 18-19. Upon transmission by the quarter wave retarder 1818 the returned LO beam 1952 is in the first linear SOP that is transmitted by the PBS 1830. The return retroreflector 1835 (shown as a corner cube in FIGS. 18-19) reflects the LO beam back through the PBS 1830 and the quarter wave retarder 1818 so as to propagate as a circularly polarized LO beam 1954 in the second circular SOP having a handedness opposite to that of the first circular SOP, i.e. as LHC.

The LO beam 1954 is directed to a focus adjustment corner cube/return reflector and is reflected back to the quarter wave retarder 1818 and the PBS 1830. The LO beam 1954 is transmitted to the focus adjustment corner cube in the second circular SOP and returns in the first circular SOP. The quarter wave retarder 1818 converts the first circular SOP to the first linear SOP so that the LO beam is reflected through the PBS 1810 to the third lens 1826 that couples measurement and LO beams to a fiber or directly to a detector. LO beam polarization is readily controlled to provide appropriate SOPs, but a returned measurement beam portion cannot generally be so readily controlled and additional power losses can arise due to SOP mismatches.

Figure 20:
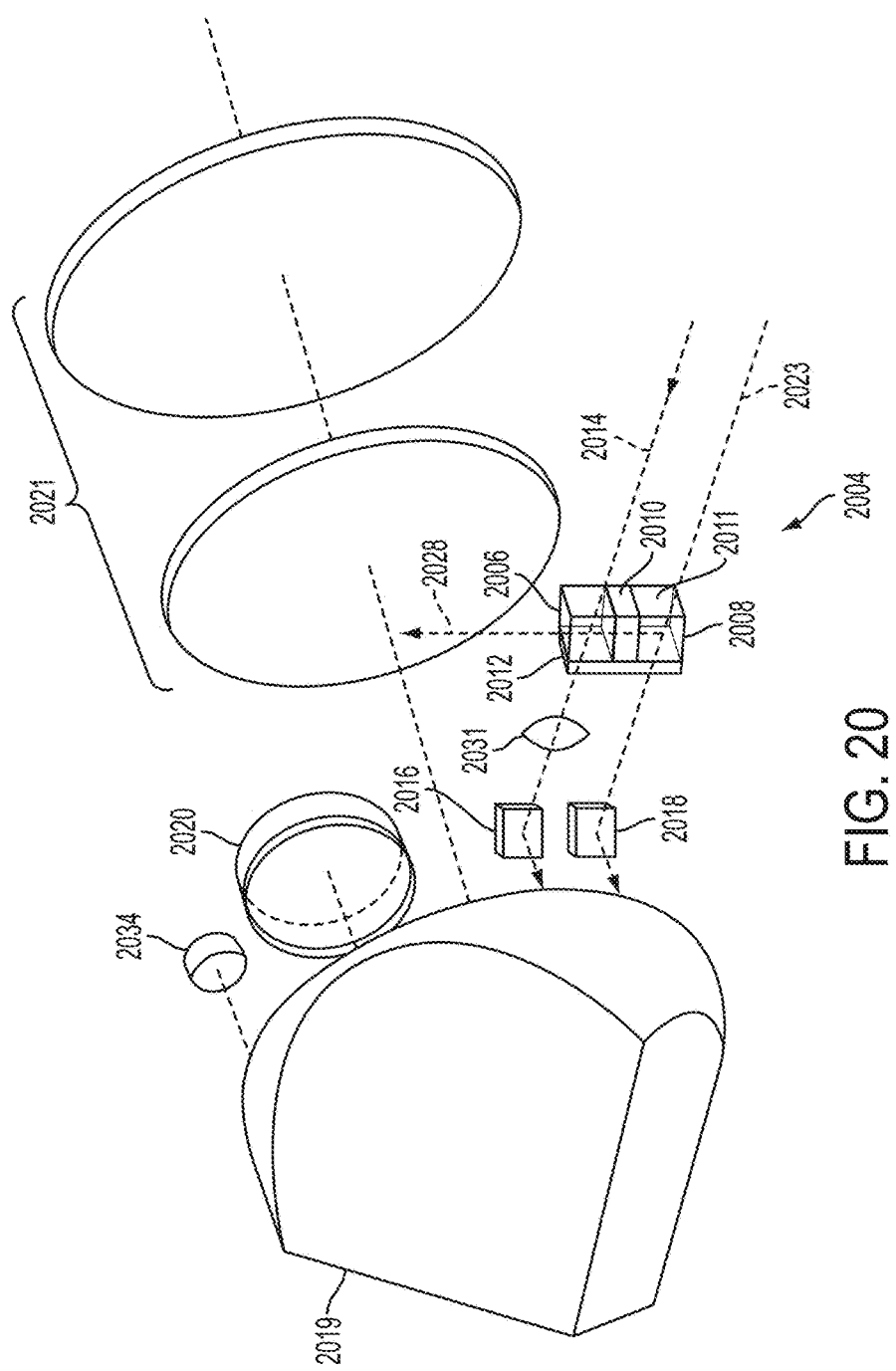
FIG. 20 is a perspective view of a representative laser radar optical system in which measurement and local oscillator beams are obtained from a common input beam based on beam states of polarization.

FIG. 20 is a perspective view of an optical system that separates a measurement beam and an LO beam using polarization optics as shown in FIGS. 18-19. An optical assembly 2004 includes first and second polarizing beam splitters 2006, 2008 and quarter wave retarders 2010, 2012. An input beam is directed along an axis 2014 to produce a straight through measurement beam that propagates to a first mirror 2016. An LO beam is produced by reflections in the PBS 2006 and the PBS 2008 so that an LO beam is directed to a second mirror 2018 along an axis 2023. A focus adjustment corner cube 2019 and a return reflector 2020 are situated to receive the measurement beam and reflect the measurement beam to an objective lens 2021 shown in FIG. 20 as a two element, air spaced lens. The returned measurement beam follows the optical path in reverse to the optical assembly 2004 so as to propagate along an axis 2028 for coupling to a fiber or directly to a photodetector.

The LO beam is directed to the focus adjustment corner cube 2019 and an LO return reflector 2034 (or a portion of the return reflector 2020) so as to be returned to the optical assembly 2004. The LO beam is reflected at a reflective surface 2011 (or by a retroreflector) at the optical assembly 2004 back to the focus adjustment corner cube 2018 and return reflector 2034. The reflective surface 2011 is shown in FIG. 20 as a surface of the polarizing beam splitter 2008, but generally a retroreflector is situated on the axis 2023 and can be secured to or air-spaced from the polarizing beam splitter 2008. After this second transit of the focus adjustment corner cube 2019, the LO beam is directed along the folded axis 2028 for coupling to a fiber or directly to a photodetector. As a result, measurement beam portion and LO beam portions that reach a detector make the same number of transits of the focus adjustment corner cube 2019, reducing errors introduced by path differences associated with beam focusing. For convenient illustration, additional lenses used to focus beams are not shown, and in most practical examples, the measurement beam is focused at or near the first right mirror 2016 with a lens 2031 so as to be divergent at the lens 2021.

Laser Radar Length References

Laser radar systems typically include a reference arm or length reference for use in confirming and/or calibrating range measurements. Some laser radars use a swept frequency measurement beam and a swept frequency local oscillator beam. A distance to a target is obtained based on a difference or heterodyne frequency between a returned portion of the measurement beam and the local oscillator. The returned portion of the measurement beam is at a laser frequency from an earlier time in the frequency sweep, and target distance can then be estimated as $c\Delta f/\beta$, wherein c is a speed of light, $\Delta f$ is the heterodyne frequency, and $\beta$ is a laser frequency sweep rate. FIGS. 21A-21B illustrate optical frequencies as a function of time for a measurement beam and an LO beam. The LO beam and measurement beam are produced from a common chirped input beam, and a portion of the input beam is diverted and not launched to a target so as to serve as an LO beam. A target feature at a selected distance returns a portion of the measurement beam and the returned portion and the LO beam are mixed. FIG. 21A illustrates variation of optical frequency as a function of time for each beam, and FIG. 21B illustrates a difference frequency that can be used to estimate a target range. At some times, the difference frequency varies due to periodicity in the chirp, but during other times, the difference frequency is constant and is used in range determination. By interrogating a reference standard with a known length, a value of laser sweep rate $\beta$ can be estimated, and sweep linearity corrected or calibrated.

FIG. 22 illustrates a representative length standard 2200 that include a lithium aluminosilicate glass-ceramic tube 2202 having a length selected for use as a reference length. Lithium aluminosilicate glass-ceramic is particularly advantageous due to its low coefficient of thermal expansion (CTE), typically less than or equal to about $0.2\times10^{-7}$/K. One example of this material is commercially available as ZERODUR glass ceramic but other glass ceramics with similar CTEs can be used such as Cer-Vit or Sitall. The tube 2202 is sealed with mirrors 2204, 2206 that include dielectric coatings 2205, 2207, respectively. The mirrors are aligned so as to be orthogonal to an axis 2209. The tube 2202 and the mirrors 2204, 2206 form a Fabry-Perot resonator and the reflectivity of the dielectric coatings 2205, 2207 can be selected to provide a selected resonator finesse. Typically, reflectances greater than 50%, 75%, or 90% are used. In one example, a resonator length is about 25 cm so that reflections associated with round trips correspond to 50 cm separations.

An optical fiber 2208 is situated so as to deliver a calibration optical beam (typically all or a portion of a measurement or probe beam) to a collimating lens 2210 that directs a collimated beam 2212 along the resonator axis 2209. A focusing lens 2211 is situated to direct the calibration beam into a detector. The two mirrors form a Fabry-Perot interferometer. With each pass some light escapes the tube and is focused by a second lens onto a photodetector. Depending upon the reflectivity of the partial mirrors, multiple heterodyne frequency signals corresponding to different numbers of passes through the tube can be generated. For a tube 25 cm in length, each signal represents a range difference of 50 cm. Any of these signals can be used as the reference arm signal. An amplifier 2226 couples the heterodyne frequency signals to a heterodyne frequency detector 2230 that identifies one or more heterodyne frequencies associated with a single, one way transit of the resonator path and/or multiple round trips. A processor or other measurement system 2234 receives one or more identified heterodyne frequencies and determines a scale calibration $R_L$ for some or all frequencies and their associated path lengths. While the glass ceramic tube 2202 is made of a very low CTE material, a thermal sensing/control system 2240 can be configured to monitor temperature with one or more temperature sensors 2242 and heat or cool the tube 2202 with a heater/cooler 2244. In some examples, tube temperature is measured so that a suitable correction to an effective tube length can be determined, and the scale calibration $R_L$ is based on the temperature dependent tube length.

Another representative reference length is illustrated in FIG. 23. A glass ceramic frame 2302 is provided with reflective surfaces 2302A, 2302B or a plurality of reflecting regions or discrete reflectors situated to reflect an input calibration beam. A laser source 2312 is coupled to a fiber coupler 2314 that directs a portion of an input beam along a fiber 2315 to a collimating lens 2316. The collimating lens 2316 produces a calibration beam that propagates along a multiply folded path 2320 to a retroreflector 2324. The retroflector 2324 is arranged so as to reflect the calibration beam back along the path 2320 to the collimating lens 2316 to the fiber coupler 2314. A fiber output surface 2318 of the fiber 2315 is configured to reflect a portion of the input beam, typically about 4%, back towards the fiber coupler 2314 as well. The fiber coupler 2314 delivers the multiply reflected calibration beam from the frame 2302 to a detector 2328 as well as the portion reflected at the fiber output surface 2318. The combined beams produce a heterodyne signal at a photodetector 2328 that can be buffered or amplified with an amplifier 2336 prior to delivery to a calibration system such as illustrated in FIG. 22. Temperature control and/or monitoring can be provided, and the frame 2302 is typically configured to be sealed within a container. In one example, cover plates are secured to the frame so that optical propagation along the optical path 2320 can be controlled based on a stable environment.

Figure 24:
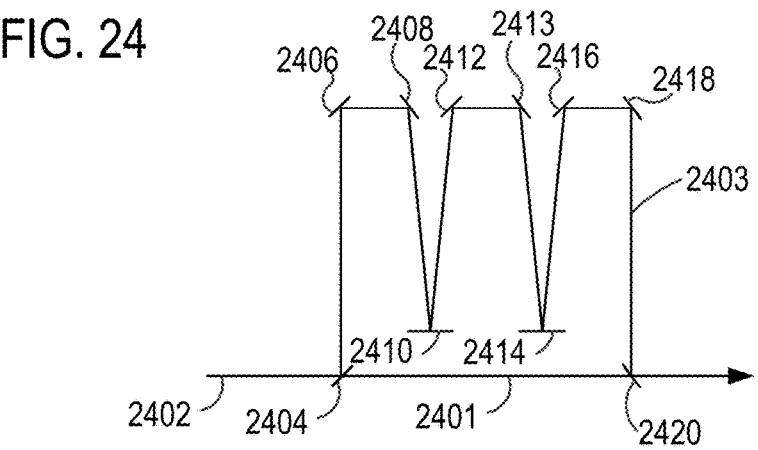
FIGS. 24-25 illustrate additional reference length configurations.
Figure 25:
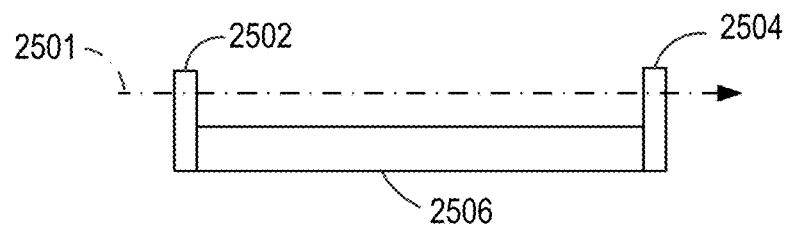

In other examples, calibration optical paths can be based on other interferometer paths such as Mach-Zehnder paths in which a path difference is defined using a glass ceramic or other ultrastable material. Fabry-Perot etalons do not require a tube, but can be defined by reflectors that are spaced apart by glass ceramic rods or plates. Ring resonator configurations can also be used. Some additional examples are illustrated in FIGS. 24-25. Referring to FIG. 24, a reference length is defined by beam splitters 2404, 2420 and reflectors 2406, 2408, 2410, 2412, 2413, 2414, 2416, 2418 that are arranged to direct a first portion of an input beam along an axis 2401 and a second portion along a multiply folded axis 2403. The beam splitters and reflectors can be secured to a temperature stable base of a material such as a lithium aluminosilicate glass-ceramic. Referring to FIG. 25, a first mirror 2502 and a second mirror 2504 are situated along an axis 2501 in a Fabry-Perot configuration. The mirrors 2502, 2504 are secured to a temperature stable rod 2506 that defines a reference length. The rod 2506 can have a square, circular, rectangular, or other cross section. In still other examples, reference path differences can be provided in an optical fiber or in other bulk dielectric media or waveguides. In some cases, waveguides or bulk media are situated in hermetically sealed, selected, pressure resistant containers to avoid length perturbations due to environmental causes. Connections to such waveguides or bulk media can be made with optical fibers, if desired.

Dynamic Frequency Selection

Laser radars with dual lasers have distinct advantages when Doppler effects on measurements are of concern. Such so-called "measurement Doppler" is caused by movement of laser radar optics with respect to the target being measured. Several dual laser approaches include (1) the superposition of two completely separate systems (LO, reference arm, etc), (2) a system where the two lasers are separated by polarization, and (3) a system where the two lasers are separated by their LO frequency. The third approach using LO frequency separation is typically a lowest cost option but has additional constraint that the two LO frequencies must be picked to keep the measurements separated for signal processing reasons by say by 1 MHz. For systems using fixed LO frequencies this leads to lower performance in the Laser Radar. Disclosed herein are systems and methods in which laser chirp rates can be adjusted depending upon a target distance.

As shown in Rezk et al., U.S. Patent Application Publication 2011/0205523, in a dual laser system with a first laser chirping up at a first rate and a second laser chirping down as a second rate, a range measurement can be found based on both the first and second chirps as:

$$M1 = \frac{f_{1up} + f_{2down}}{2} = \frac{f_1 + f_d + f_2 - f_d}{2} = \frac{f_1 + f_2}{2},$$

wherein $f_1$ and $f_2$ are independent ranges estimate, and $f_d$ is a Doppler contribution to the heterodyne frequency. Range errors can be reduced by using large heterodyne frequencies. However, heterodyne frequency should also be kept within practical detection bandwidths. Typically, in dual laser systems, range error and noise effects are associated with the lower heterodyne frequency.

Laser chirp rates can be selected based on target range. For each laser of a dual laser system, range is estimated based on an associated scale factor $R_L$ which can be conveniently expressed in units of MHz/m. As an example, a system that provides variable or dynamic chirp rates can be based on a laser having a coherence length of 30 m (maximum range), a maximum heterodyne frequency bandwidth of 60 MHz, a minimum frequency separation of 1 MHz, and a minimum target distance of 1 m. With fixed chirps, heterodyne frequencies for a target distance of 1 m are shown in the following table.

| Dual Laser Radar Fixed Chirp Rates | | | | |
|---|---|---|---|---|
| Total Range | $R_{L1}$ | $f_1$ | $R_{L2}$ | $f_2$ |
| 30 m | 2 MHz/m | 60 MHz | 1 MHz/m | 30 MHz |
| 1 m | 2 MHz/m | 2 MHz | 1 MHz/m | 1 MHz |

However, in a representative dynamic system, chirp rates for one or both lasers can be varied. For example, in the following table, the chirp rate associated with the second laser is varied.

| Dual Laser Radar Variable Chirp Rates | | | | |
|---|---|---|---|---|
| Range | $R_{L1}$ | $f_1$ | $R_{L2}$ | $f_2$ |
| 30 m | 2 MHz/m | 60 MHz | 1.966 MHz/m | 59 MHz |
| 1 m | 2 MHz/m | 2 MHz | 1 MHz/m | 1 MHz |

Variable chirp rates tend to improve noise performance and provide superior Doppler correction at longer ranges as the two heterodyne frequency magnitudes are closer together. Typically, calibration and chirp linearization are used as well, based on, in part, measurement of a reference length such as those described above.

Figure 26:
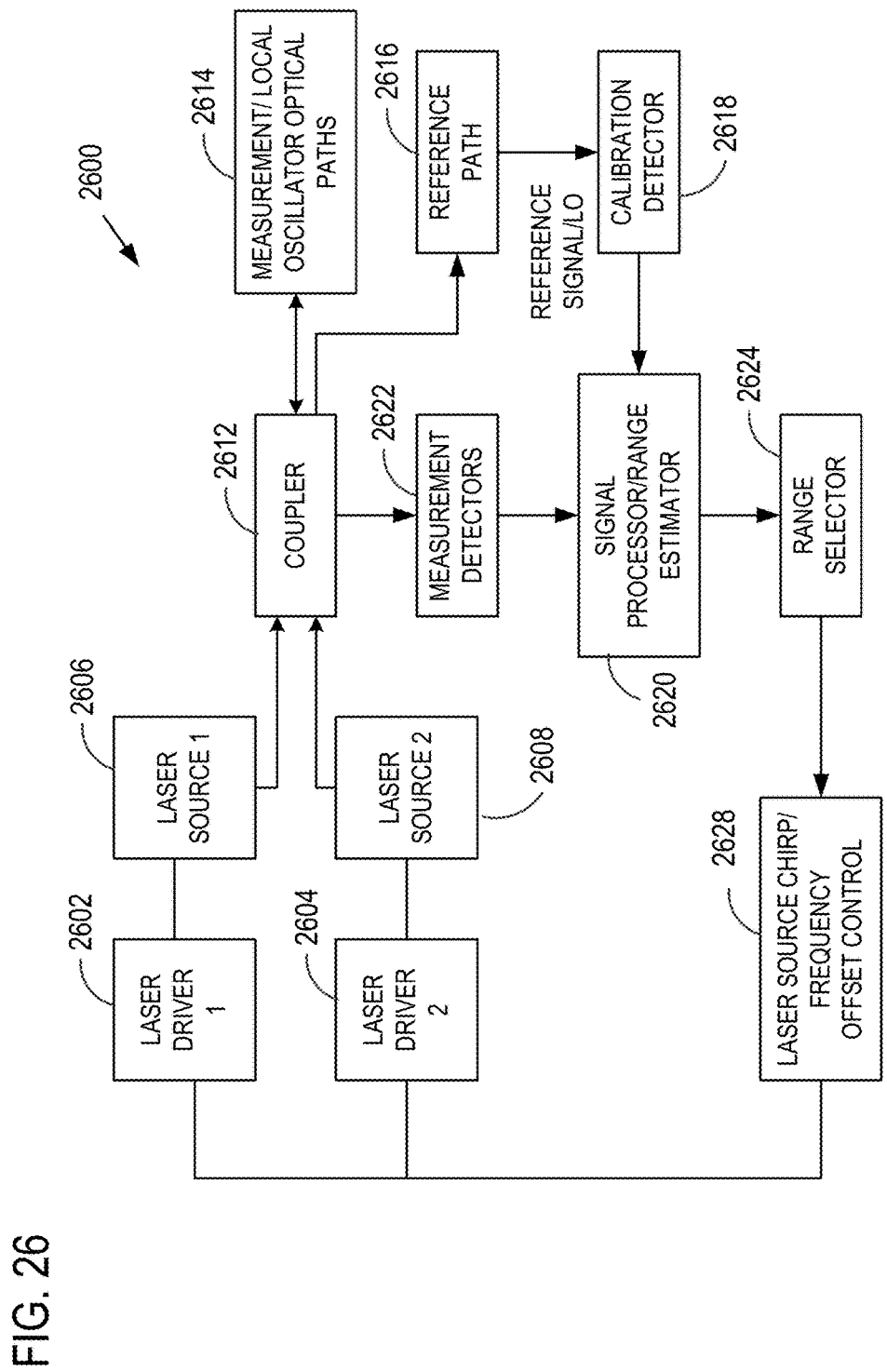
FIG. 26 is block diagram of a laser radar that includes a laser chirp controller configured to permit automatic or manual change of laser chirp rates.

A representative dual laser radar system 2600 in which laser chirp rates are variable is illustrated in FIG. 26. A first laser driver 2602 is coupled to a first laser source 2606 so as to produce a first beam that is provided to a fiber coupler 2612. A second laser driver 2604 is coupled to a second laser source 2608 so as to produce a second beam that is combined with the first beam in the fiber coupler 2612. The combined beams are directed to a measurement/LO optical path 2614 and a reference optical path 2616. Reference length heterodyne frequencies are generated at a calibration detector 2618 based on the first and second beams as combined with portions that propagate along a reference path. The calibration detector 2618 is coupled to a signal processor 2620 that can determine suitable scale factors for one or both of the first and second laser beams.

Measurement beams from a target and LO beams are returned from the measurement/LO optical path 2614 and coupled to a detector 2622 so as to produce first and second heterodyne frequencies associated with target range for the first laser beam and the second laser beam, respectively. The first and second heterodyne frequencies are coupled to the signal processor 2620 that provides a range estimate based on the heterodyne frequencies and the scale factor. A range selector 2624 is coupled to a laser source frequency controller 2628 so as to provide suitable laser drive control signals or control data to the laser drivers 2602, 2604. The range selector 2624 is configured to select a chirp rate so as to obtain a heterodyne frequency in a predetermined range or at a predetermined value for one or both to of the first laser source 2606 and the second laser source 2608. For example, if the first heterodyne frequency is larger or smaller than preferred, the chirp rate of the first laser source can be decreased or increased, respectively. The range selector 2624 can be arranged so that a heterodyne frequency for a particular feature of interest (on all features of interest) is substantially constant by varying laser source chirp rate. For example, if a measured first heterodyne frequency is 1 MHz at a scale factor $R_L$, the chirp rate and a first scale factor $R_{L1}$ can be increased by a factor of 50 so as to produce a 50 MHz heterodyne frequency. Chirp rates may be limited due to laser source characteristics, but within such bounds the laser source chirp can be changed as convenient.

Figure 27:
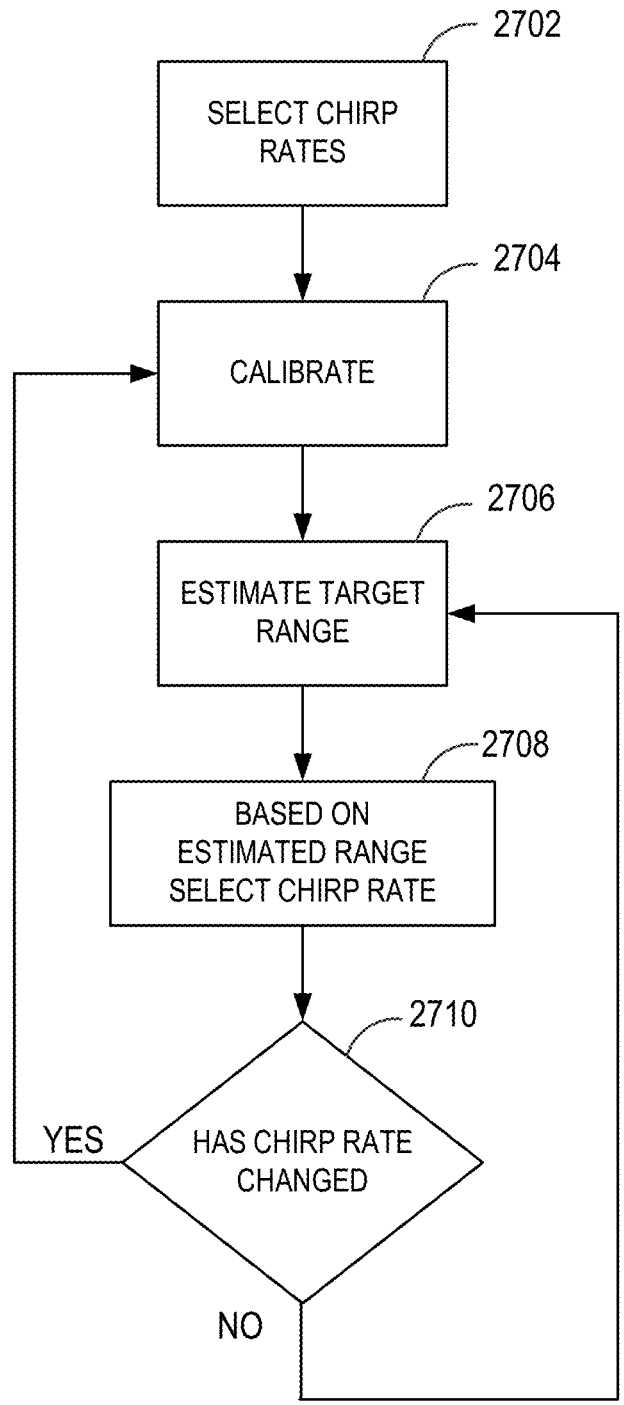
FIG. 27 is a block diagram of a method of estimating a range to a target using variable laser chirp rates.

FIG. 27 illustrates a representative laser range finding method. At 2702, laser chirp rates are selected for one or more laser sources. At 2704, the chirp rates and laser frequency sweeps are calibrated to determine scale factors and deviations from an intended chirp profile. Typically, linear chirp profiles are selected and deviations from linearity can be measured with a reference length. Deviations from linearity and scale factors are stored for use in providing range estimates. Stepped, polynomial, exponential or other chirp rates can be used, although such chirp profiles are typically more difficult to establish. At 2706, target range is estimated using the selected chirp rates, and at 2708 preferred chirp rates can be selected for some or all lasers based on the measured target range. Chirp rates can be selected so that heterodyne frequencies are within a preferred range, or are greater than a preferred minimum or less than a preferred maximum value. If one or more chirp rates are selected that are different than current chirp rates as determined at 2710, frequency sweeps are calibrated again at 2704 and additional target distance measurements are obtained.

In the above examples, chirp rates for multiple lasers are changed, but chirp rate can be changed in single laser laser radar systems as well.

Penta-Mirror Scanning

Measurement rates in laser radar systems can be limited by the rate at which a measurement beam can be scanned over a target. In some conventional systems, relatively massive optical systems and components must be rotated so that high speed scanning is difficult and expensive. Representative scanning systems and methods described below can address these and other limitations of conventional approaches.

Figure 28:
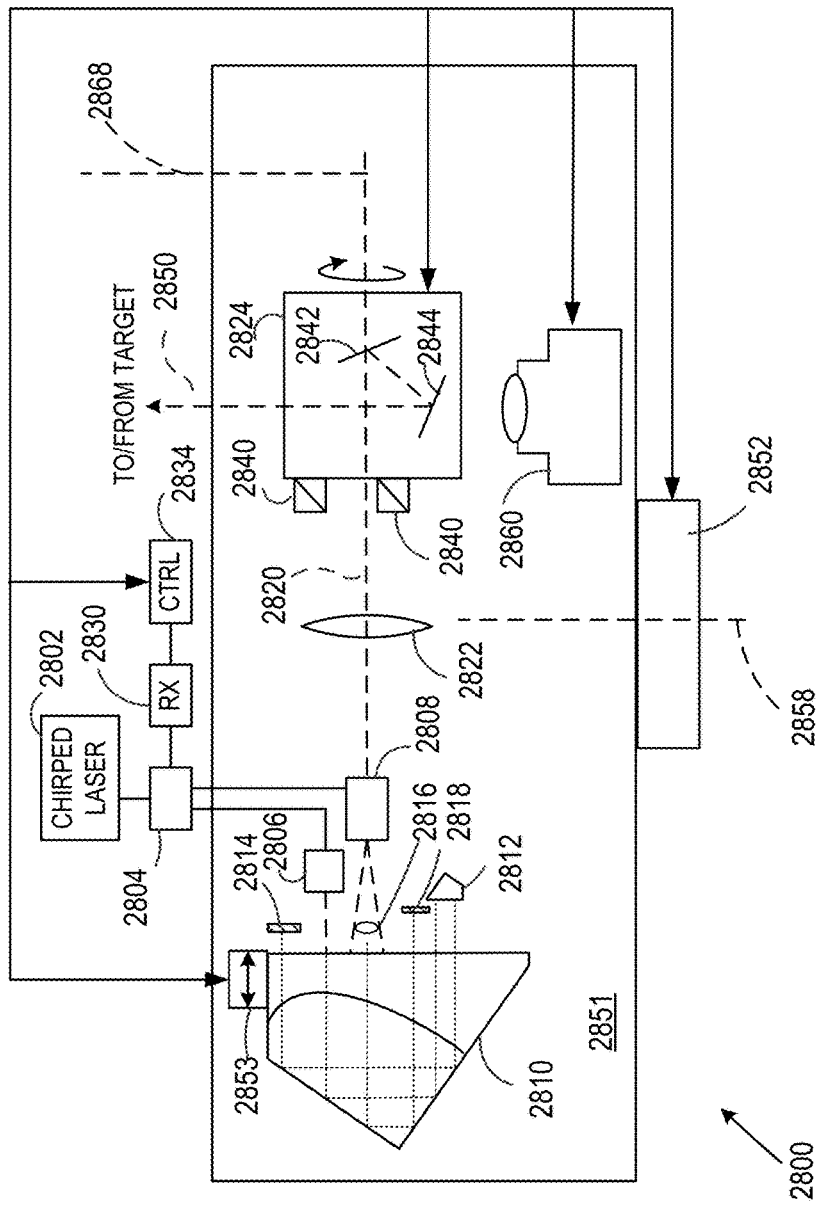
FIGS. 28 and 29A-29C illustrate laser radar systems with representative scanning assemblies.

With reference to FIG. 28, a laser radar system 2800 includes at least one chirped laser 2802 that is coupled to a fiber coupler 2804. The fiber coupler delivers portions of a chirped laser beam to a local oscillator beam optical system 2806 and a measurement beam optical system 2808 that produce an LO beam and a measurement beam, respectively. As shown in FIG. 28, the LO beam optical system 2806 is configured to couple the LO beam through a focus adjustment corner cube 2810 for reflection by an LO corner cube 2812 and an LO return reflector 2814, preferably implemented as a retroreflector. The measurement beam pickup/delivery optical system 2808 directs a diverging measurement beam 2816 to the focus adjustment corner cube 2810 and to a return reflector 2818. In this configuration, the LO is a "remote LO" in that path differences associated with the focus adjustment corner cube 2810 are substantially the same for the measurement optical path and the LO optical path, i.e., four passes through the focus adjustment corner cube 2810 for the LO beam and the measurement/return beams.

The laser radar system 2800 is configured so that the measurement beam is directed along an axis 2820 to an objective lens 2822 to an elevational scan assembly 2824. A return beam is collected by the objective lens 2822 and coupled to the fiber coupler 2804 along a reverse of the measurement beam optical path. A receiver 2830 is coupled to receive the combined beams and produce a signal at a heterodyne frequency that is coupled to a system controller 2834 configured to provide range estimates based on heterodyne frequencies.

The system controller 2834 can include or be based on a personal computer or other computing device (not shown in FIG. 28) such as a laptop, tablet, a workstation, or a handheld communication device. The receiver 2830 is configured to produce a recognition signal for the personal computer, and the personal computer can calculate or compute a range estimate based on detected heterodyne frequencies. In some examples, the system controller 2834 can include one or more computers that can be in a common location or coupled via a wired or wireless network such as a local area network or a wide area network. A first computer can receive signals from the receiver 2830 and forward the received signals or digital or other representations thereof to a second computer using a wired or wireless communication network or communication link. The second computer establishes range estimates using received signals based on heterodyne frequencies.

The elevational scan assembly 2824 includes bearings 2840 configured for rotation about the axis 2820. The bearings 2840 typically include encoders as well that permit determination of rotational angle. First and second reflectors 2842, 2844 are situated to direct the measurement beam along a rotatable axis 2850.

The elevational scan assembly 2824 and the LO and measurement beam optical systems can be secured to a base 2851 that is coupled to an second scanner 2852 that is configured to rotate the base 2850 about an axis 2858. Scanning of the measurement beam is directed by the control system 2834 that is coupled to the elevational scan assembly 2824 and the secondary scanner 2852. The control system 2834 is also coupled to a translation stage 2853 that is situated to translate the focus adjustment corner cube 2810 in a direction parallel to the axis 2820 so as to focus the measurement beam at a target surface.

A camera 2860 can also be provided for viewing a target area. The camera 2860 can be situated to image along the axis 2850 through the reflector 2844. In representative examples, the measurement beam is an infrared or near-infrared beam and the reflector 2844 can be configured to transmit a visible beam and reflect the measurement beam. For example, the reflector 2844 can be a so-called "hot mirror" that reflects infrared radiation and transmits visible radiation. In other examples, the camera 2860 is situated to image along an axis 2868 that is displaced from and possibly tilted with respect to the measurement axis 2850. The camera 2860 is generally fixed with respect to or secured to the elevational scan assembly 2834 so that a visible image of a target can be obtained or monitored during scanning. In addition, since the camera 2860 moves with and is aligned to the measurement beam, the camera output image can be used in a variety of ways to provide additional metrology information.

Figure 29A:
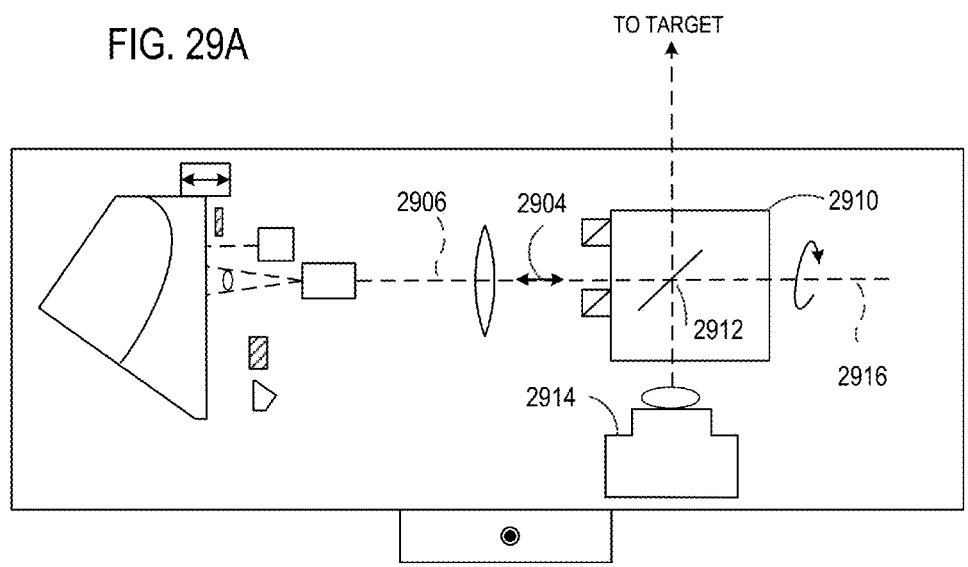
Figure 29B:
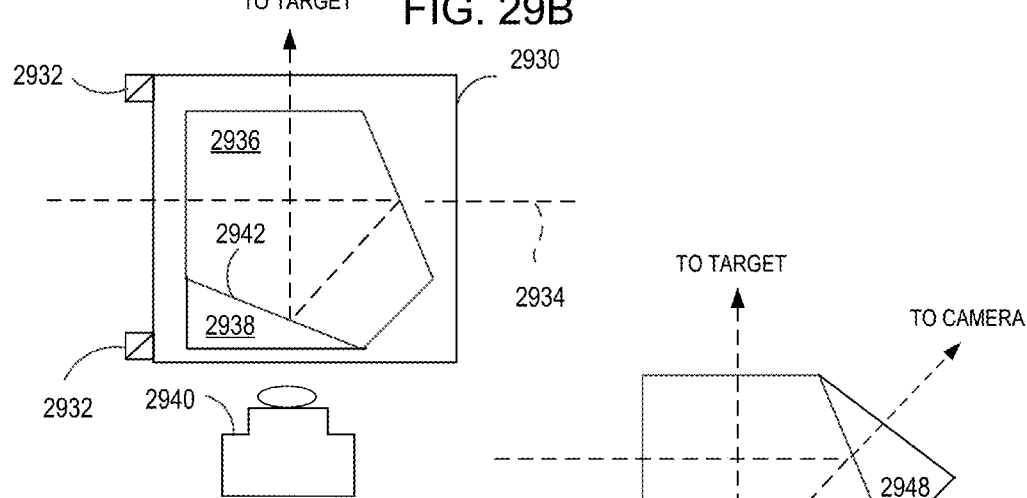
Figure 29C:
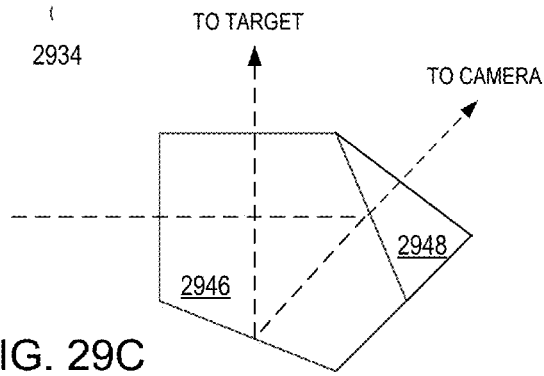

FIGS. 29A-29C illustrate alternative elevational scan assemblies for laser radars. As shown in FIG. 29A, measurement and return beams 2904 are directed along an axis 2906. An elevational scan assembly 2910 includes a single reflector 2912 that can have a wavelength dependent reflectance to permit imaging of a target area with a camera 2914. The elevational scan assembly is configured to rotate about the axis 2916 (an extension of the axis 2906). FIG. 29B illustrates a representative scan assembly 2930 that includes bearings 2932 configured to provide rotation about an axis 2934. A pentaprism 2936 is configured to direct the measurement beam to a target (and a return beam to a detection system). Pentaprism surfaces can be coated or total internal reflection can be used. If total internal reflection is used, polarization compensation may be required if the laser radar is polarization sensitive. A wedge prism 2938 can be secured to the pentaprism 2936 to permit a camera 2940 to view a target area. If such a wedge prism is used, a wavelength dependent dielectric coating 2942 is provided to reflect the measurement and return beams to and from the target, and transmit a viewing beam to the camera 2940. FIG. 29C illustrates a pentaprism 2946 and a wedge prism 2948 configured to transmit a viewing beam to a camera via a different pentaprism face. It will be apparent that other examples are possible.

Figure 30A:
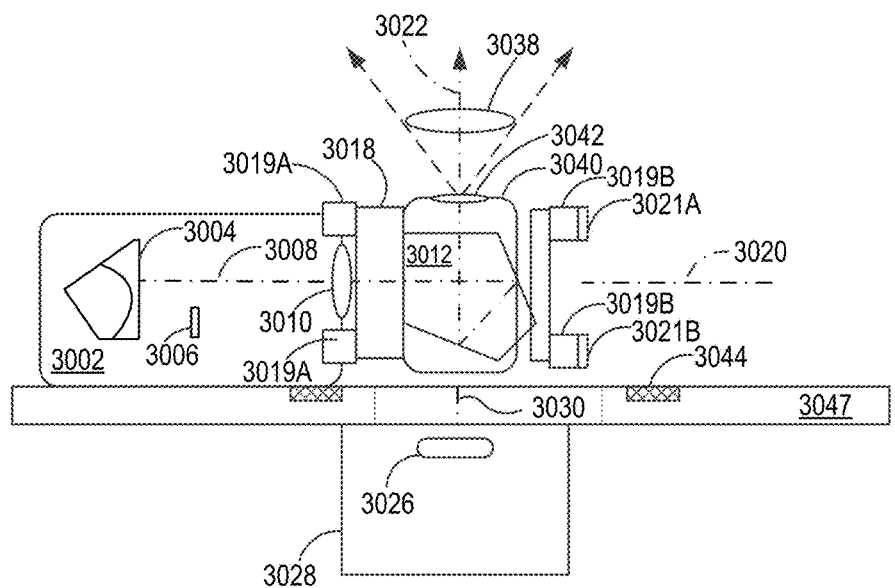
FIGS. 30A-30B are elevational and plan views of a laser radar system that includes a pentaprism scanner.
Figure 30B:
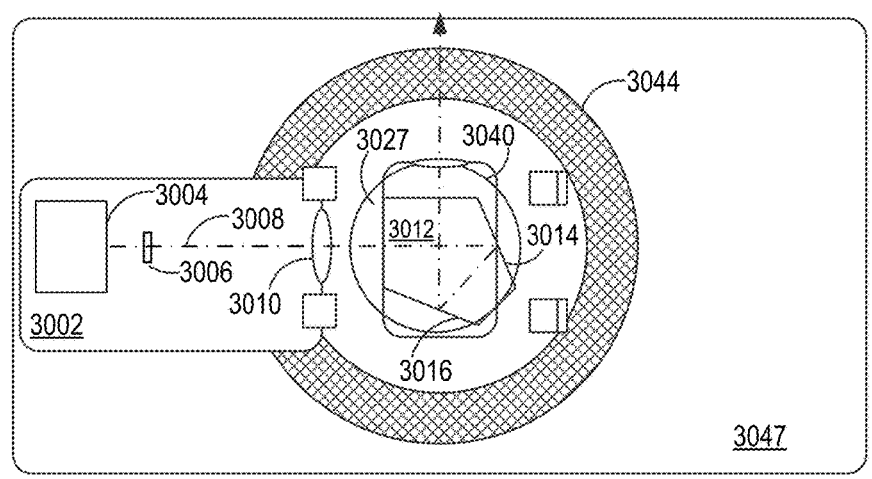

A representative laser radar optical assembly that includes a rotatable pentaprism scanner is illustrated in FIGS. 30A-30B. A beam shaping and beam collection optical system 3002 includes a corner cube 3004 and a return reflector 3006 that are situated along an axis 3008 with an objective lens 3010 so as to produce a focused measurement beam. A pentaprism 3012 is configured to reflect the measurement beam from the optical system 3002 at surfaces 3014, 3016 so as to direct the measurement beam to the target. While a pentaprism 3012 is convenient, mirrors can be arranged so as to produce similar reflections. The pentaprism 3012 is secured to an elevational rotational stage 3018 that is rotatable about an elevational axis 3020. Elevation bearings 3019A, 3019B permit rotation about the axis 3020 so that the measurement beam is directed along a rotatable axis 3022. In some examples, only one of the elevation bearings 3019A, 3019B is used.

A reference mirror 3026 is secured to a base 3028. The axis 3022 can be rotated so that the measurement beam can be directed to the reference mirror 3026 through an aperture 3027. The reference mirror 3026 can be used to establish a reference length for calibration, and path differences in an LO beam can be compensated based on the calibration. Elevational angles can be detected with one or more encoders such as encoders 3021A, 3021B, rotations about an azimuthal axis can be provided with an azimuthal rotational stage 3047 and the base 3028 can be rotated about an axis 3030.

FIG. 30B is similar to FIG. 30A but is a top view with the pentaprism 3012 rotated 90 degrees about the axis 3020. A camera 3040 includes a lens 3042 that is situated so as to image in a field of view 3038 along an axis that is parallel to and displaced from the axis 3022. One or more azimuth encoders such as encoder 3044 permits determination of azimuthal rotations produced with the azimuthal stage 3047.

In some examples, the axis 3022 as folded corresponds to the elevational axis 3020. The pentaprism 3012 tends to reduce beam pointing errors associated with elevational axis bearing wobbles, and provides increased optical path length. In FIGS. 30A-30B, laser sources, local oscillator optics, and control and processing systems are not shown for clarity. An optical fiber can be used to deliver a chirped beam to the optical system 3002 as well as couple returned measurement beam portions and an LO beam to a detection system as shown in the examples above.

Figure 30C:
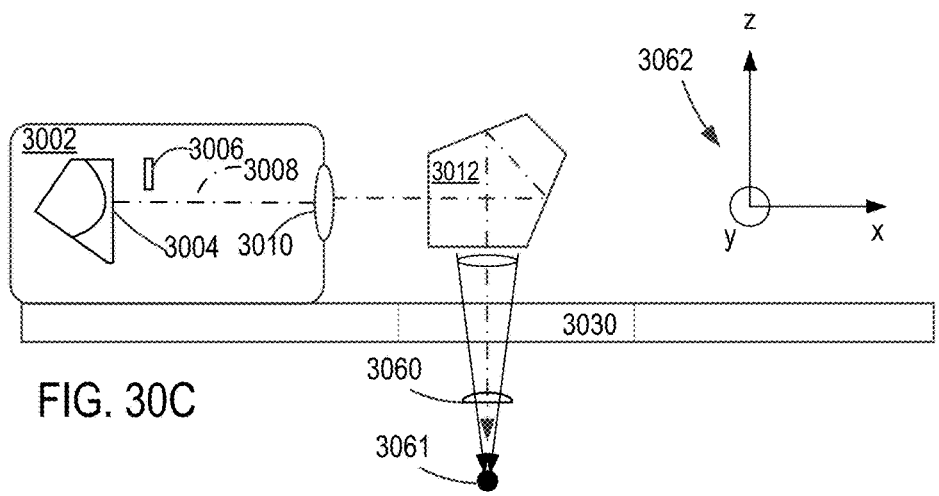
FIGS. 30C-30D illustrate detection and correction of wobble induced errors based on a curved reference mirror in laser radar systems such as those of FIGS. 30A-30B.
Figure 30D:
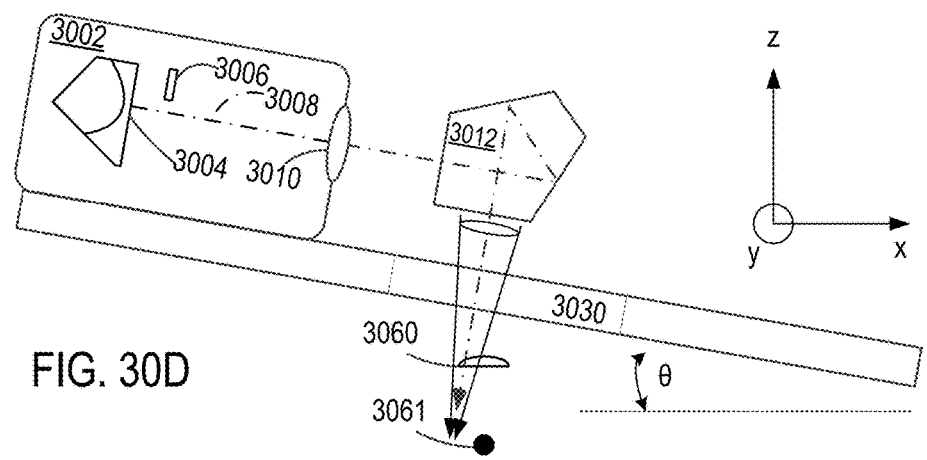

If the reference mirror 3026 is a curved mirror, azimuth bearing wobble can be detected and estimated by directing the measurement beam to a center of curvature of the reference mirror 3026. Referring to FIGS. 30C-30D, a curved reference mirror 3060 is provided, and apparatus of FIGS. 30A-30B is arranged so that the measurement beam is directed to a center of curvature 3061 of the reference mirror 3060. An xyz coordinate system 3062 is also shown. Rotational errors about the x-axis (such as azimuthal wobble) cause return signal amplitude to decrease, and this signal loss can be recovered by adjusting the azimuthal angle, i.e., with a corresponding scanner rotation about the x-axis. Wobble in other directions also causes signal loss, but such signal loss is not generally recoverable with an elevational adjustments. For example, as shown in FIG. 30D, a rotational error θ is not correctable with a rotation about the x-axis.

FIG. 49 illustrates an optical system in which an LO retroreflector 4902 is secured to or situated at a surface of a scannable pentaprism 4904. A corner cube 4908 and a return reflector 4906 are situated for measurement beam focusing with a lens 4912, and an LO reflector 4910 is situated to reflect an LO beam into the corner cube 4908. This configuration permits movement of the LO corner cube 4902 away from a propagation axis of the measurement beam. Additional details are similar to those of other examples, and one or more LO beams can be provided with similarly situated LO corner cubes.

The elevational scan assembly in above embodiment is not limited to two reflective surfaces situated at an angle of 45 degrees, but can also be configured so that the two reflective surfaces are at angles of 10, 20, 30, 40, 50, 60, 70, 80, 90, 100, 120, 130, 135, 140, 150, 160, or 170 degrees. The elevational scan assembly may be situated at an intersection of an axis associated with beam propagation to the elevational scan assembly from the laser (i.e., a beam delivery axis), and a target direction from the elevational scan assembly. During rotations of the elevational scan assembly, an angle between the beam delivery axis and the target direction from the elevational scan assembly may be constant or approximately constant. For example, this angle may be constant or approximately constant during from 10% to 100% of a predetermined period of rotation. In addition, in other examples, positions of the elevational scan assembly and the pentaprism 2936 can be measured in other ways. For example, the position of the pentaprism 2936 can be measured with an interferometer so that the interferometer shows position changes during rotation. The result may be used to correct or compensate target distances estimates.

In other examples, the elevational scan assembly can be movable along the axis 2850 or other axes. Such movement can be used to select a position of the measurement beam on at least one of the reflective surfaces.

Fiber Based Laser Radar Systems

Figure 31:
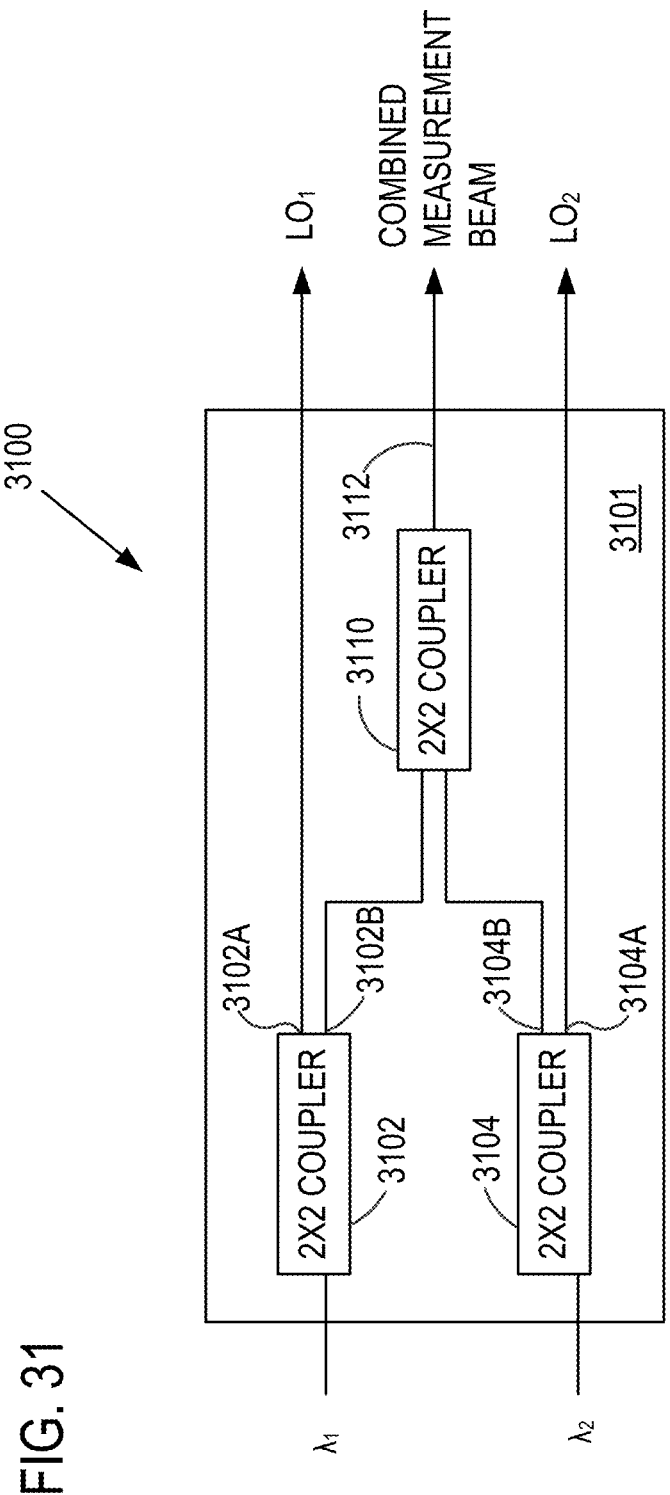
FIG. 31 is a schematic diagram of an optical fiber based beam combining system for a dual laser laser radar system.

Referring to FIG. 31, chirped (typically counterchirped) laser beams at first and second wavelengths λ1, λ2, respectively can be coupled to beam shaping, scanning, and collection optics using an optical fiber system 3100. First and second chirped laser beams from first and second lasers are coupled to optical fibers that are in turn coupled to respective fiber couplers 3102, 3104. The fiber couplers 3102, 3104 are secured to a laser radar optical support 3101 that is situated so as to rotate with at least one of an elevational or azimuthal rotation stage. The fiber couplers 3102, 3104 include two outputs 3102A, 3102B and 3104A, 3104B, respectively. A portion of the first chirped laser beam is coupled to the output 3102A to serve as a first LO beam, while another portion is delivered to a third fiber coupler 3110 from the output 3102B. Similarly, a portion of the second chirped laser beam is coupled to the output 3104A to serve as a second LO beam, while another portion is delivered to the third fiber coupler 3110. The portions of the first and second chirped laser beams from the outputs 3102B, 3104B are combined in an output 3112 of the third fiber coupler 3110 to produce a combined beam (with $\lambda_1$ and $\lambda_2$ beams) that can be used a measurement beam. The couplers shown in FIG. 31 typically are 2 by 2 couplers and have additional input or output ports, but unused ports are not shown. Such unused ports are usually terminated to reduce back reflections. The couplers and optical fibers are preferably polarization retaining, but other fibers and couplers can be used. Coupler split ratios are typically selected so that an input beam is divided into two substantially equal portions, but other split ratios can be used. Measurement beam and LO beam optics of various kinds can be used, but are not shown. In this configuration, the measurement beam paths for each of the first and second chirped laser beams are the same.

Figure 32:
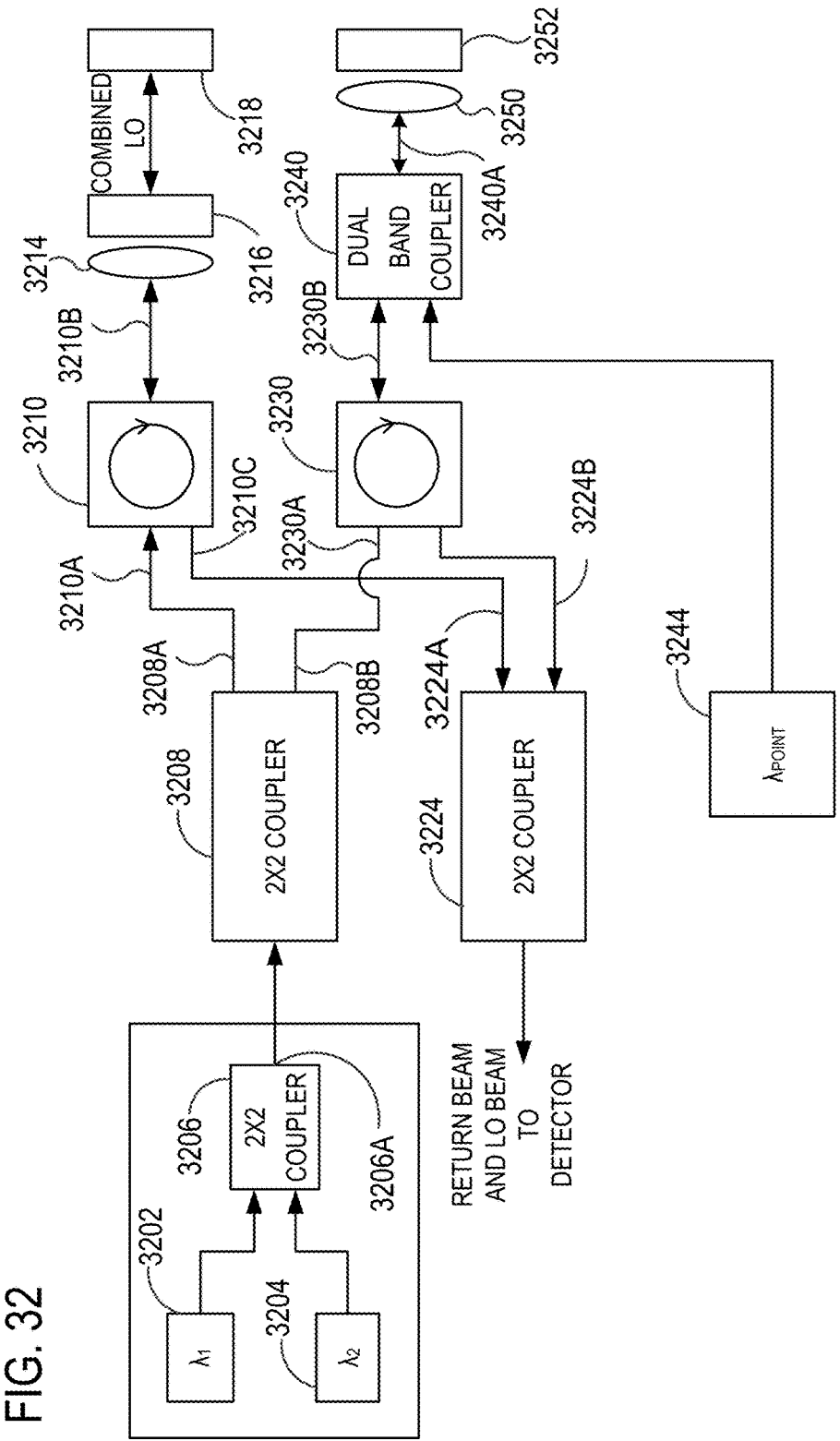
FIG. 32 is a schematic diagram of an optical fiber based beam combining system for a dual laser laser radar system that includes optical circulators and a pointing laser.

Referring to FIG. 32, a fiber based, dual wavelength, chirped laser radar system includes a first laser 3202 and a second laser 3204 that are optically connected to a 2 by 2 coupler 3206. Combined first and second laser beams are available at a coupler output 3206A (and a second output, not shown). The coupler output 3206A is connected to a 2 by 2 coupler 3208. A coupler output 3208A is connected to an optical circulator 3210 so as to communicate an optical beam from a circular port 3210A to a circulator port 3210B. A combined beam associated with laser beams from the first and second lasers 3202, 3204 is available at the circulator port 3210B. A lens 3214 and a quarter wave retarder 3216 are situated to direct the combined beam as an LO beam along an LO path in a circular SOP to a reflector 3218. The return beam is directed to the circulator 3210 and to port 3210C of the circulator. Circulator port 3210C is connected to a port 3224A of a 2 by 2 coupler 3224.

The coupler output 3208B is connected to an optical circulator 3230 so as to communicate an optical beam from a circulator port 3230A to a circulator port 3230B. A combined beam associated with laser beams from the first and second lasers 3202, 3204 is then available at the circulator port 3230B. A port 3240A of a dual band coupler 3240 is connected to the circulator port 3230B and to a viewing or pointing laser 3244. Combined first and second chirped laser beams and a viewing laser beam are then available at a coupler port 3240A. A lens 3250 and a quarter wave retarder 3252 are situated to direct the combined beams as measurement and viewing beam to a target, and receive a return beam associated with the first and second chirped lasers from the target. The return beam is directed to through the dual beam coupler 3240 to the circulator 3230 and to a port 3224B of the 2 by 2 coupler 3224. The 2 by 2 coupler 3224 thus receives the return beam at port 3224A and the LO beam at 3224B and delivers a mixture to a port 3224C that is coupled to a detection system configured to detect heterodyne frequencies associated with one or both of the chirped lasers and provide a range estimate. In this example, the detection system can be located remotely from movable (scanned) optics, but the return beam and the LO beam both contain contributions from each of the two chirped lasers. The combined beams can be brought to the scanning optics from the coupler 3206 on a single optical fiber to reduce the number of fibers needed.

Figure 46:
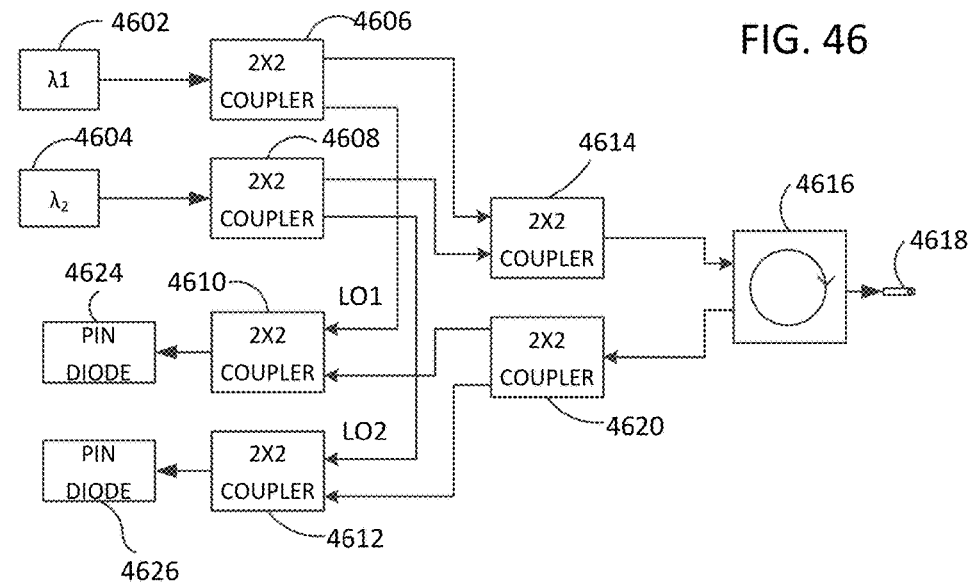
FIG. 46 illustrates an optical fiber system that produces a dual laser measurement beam, and combined a returned beam with each of two local oscillator beams.

Referring to FIG. 46, a fiber system for producing LO beams and a dual laser measurement beam includes first and second laser sources 4602, 4604 coupled to respective 2 by 2 beam splitting couplers 4606, 4608. These couplers typically provide approximately even power splitting to coupler outputs, but other split ratios can be used. One output of each of the couplers 4606, 4608 is coupled to 2 by 2 beam combining couplers 4610, 4612, respectively. The remaining outputs of the couplers 4606, 4608 are connected to a laser combining 2 by 2 coupler 4614 which is configured to couple a dual wavelength measurement beam to a circulator 4616. The circulator 4616 couples the dual wavelength measurement beam to a polarization maintaining single mode fiber 4618 which can provide the measurement beam to laser radar scanning optics.

A return beam from a target is coupled by the circulator 4616 to a return beam splitting 2 by 2 coupler 4620 that directs portions of the return beam to the beam combining couplers 4610, 4612. PIN diode detector 4624 is configured to receive a portion of the return beam and the first LO beam from the coupler 4610 and produce a heterodyne frequency associated with the chirp of the laser 4602. PIN diode detector 4626 is configured to receive a portion of the return beam and the second LO beam from the coupler 4612 and produce a heterodyne frequency associated with the chirp of the laser 4604. In this example, the LO beams are coupled to the return beam via optical fiber, and are not directed to measurement beam scanning or focusing optics.

Figure 47:
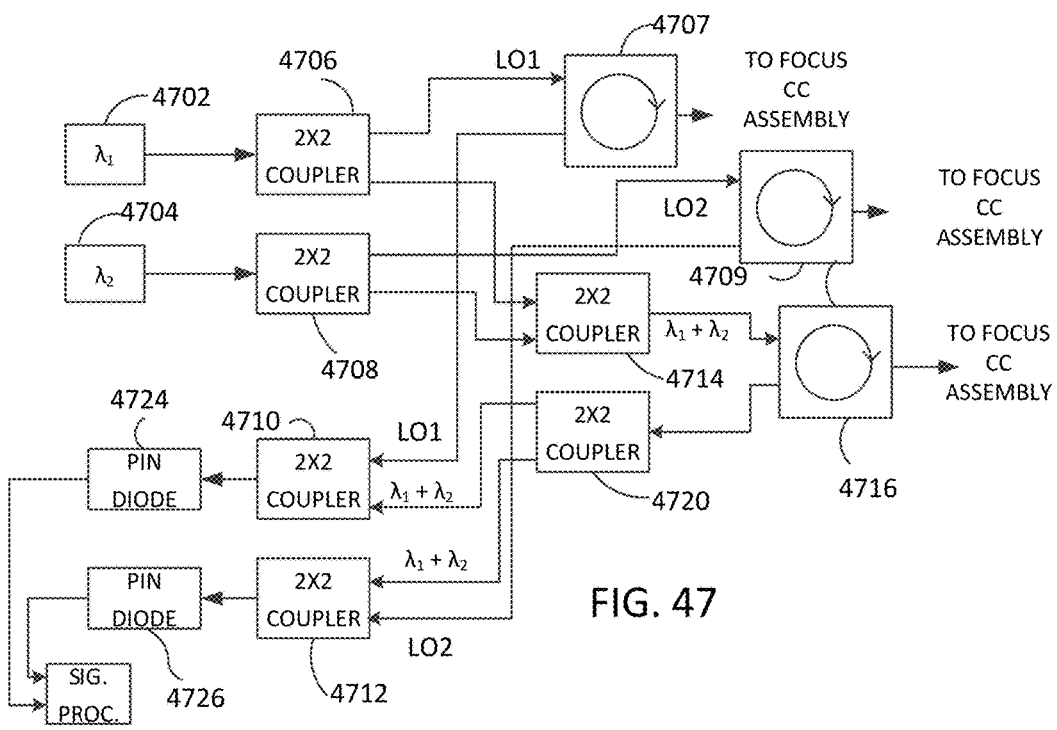
FIG. 47 illustrates an optical fiber system that produces a dual laser measurement beam, and combined a returned beam with each of two remote local oscillator beams.

In another example shown in FIG. 47, a fiber system for producing LO beams and a dual laser measurement beam includes first and second laser sources 4702, 4704 coupled to respective 2 by 2 beam splitting couplers 4706, 4708. These couplers typically provide approximately even power splitting to coupler outputs, but other split ratios can be used. One output of each of the couplers 4706, 4708 is coupled to respective LO optical circulators 4707, 4709. These circulators couple the LO beams to laser radar focusing and scanning optics. The remaining outputs of the couplers 4706, 4708 are connected to a laser combining 2 by 2 coupler 4714 which is configured to couple a dual wavelength measurement beam to a circulator 4716. The circulator 4716 couples the dual wavelength measurement beam to laser radar focusing and scanning optics.

LO beams returned from the laser radar focusing and scanning optics are directed by the LO optical circulators 4707, 4709 to the beam combining 2 by 2 couplers 4710, 4712, respectively. A return beam from a target is coupled by the circulator 4716 to a return beam splitting 2 by 2 coupler 4720 that directs portions of the return beam to the beam combining couplers 4710, 4712. PIN diode detector 4724 is configured to receive a portion of the return beam and the first LO beam from the coupler 4710 and produce a heterodyne frequency associated with the chirp of the laser 4702. PIN diode detector 4726 is configured to receive a portion of the return beam and the second LO beam from the coupler 4712 and produce a heterodyne frequency associated with the chirp of the laser 4704. In this example, the LO beams are coupled in part to measurement beam scanning and focusing optics to compensate LO/measurement beam optical path differences.

Figure 48A:
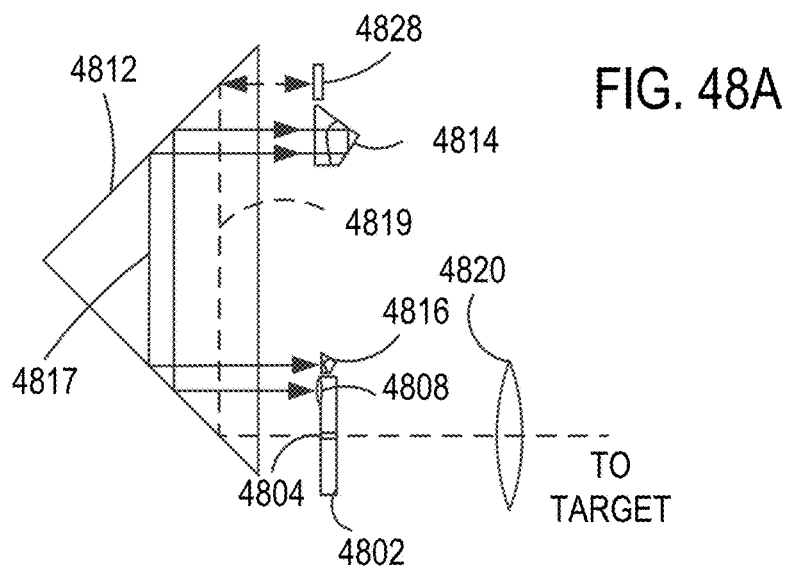
FIG. 48A is an elevational view of an optical system configured to receive a dual laser measurement beam and two LO beams and scan the measurement beam with respect to the target.
Figure 48B:
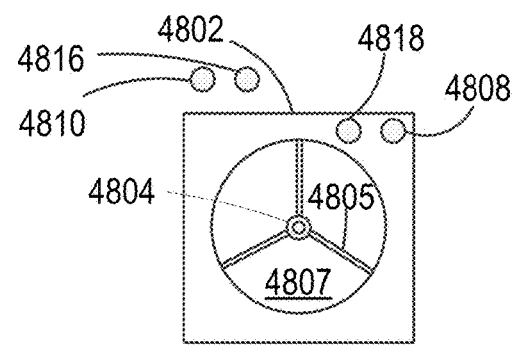
FIG. 48B is a view of a portion of the optical system of FIG. 48A.

The fiber combiner/splitter of FIG. 47 can be coupled to laser radar focusing and scanning optics with the arrangement shown in FIGS. 48A-48B. An input beam support 4802 is configured to receive and retain an optical fiber that communicates a dual laser measurement beam in an aperture 4804. The beam aperture 4804 can be defined by support arms 4805 that extend into a larger aperture 4807 configured to transmit a measurement beam. Collimators 4808, 4810 are configured to receive LO beams associated with respective lasers. LO beams are directed by the collimators 4808, 4810 to a focus adjustment corner cube 4812 and an LO corner cube 4814. The LO corner cube 4814 returns the LO beams to the focus adjustment corner cube 4812 and to respective retroreflectors 4816, 4818. Other optical elements that shift one or more of the LO beams and returns the shifted LO beam or beams to the focus adjustment corner cube 4812 can be used. From the retroreflectors 4816, 4818 the LO beams follow a reverse path back to respective collimators for coupling to corresponding detectors. A representative LO path 4817 is illustrated. The measurement beam is directed to the focus adjustment corner cube 4812 and a return reflector 4828 and then to a lens 4820 that focuses the measurement beam at a target. A representative measurement beam path 4819 is shown in FIG. 48A.

Beam Steering Error Detection and Correction

Figure 33:
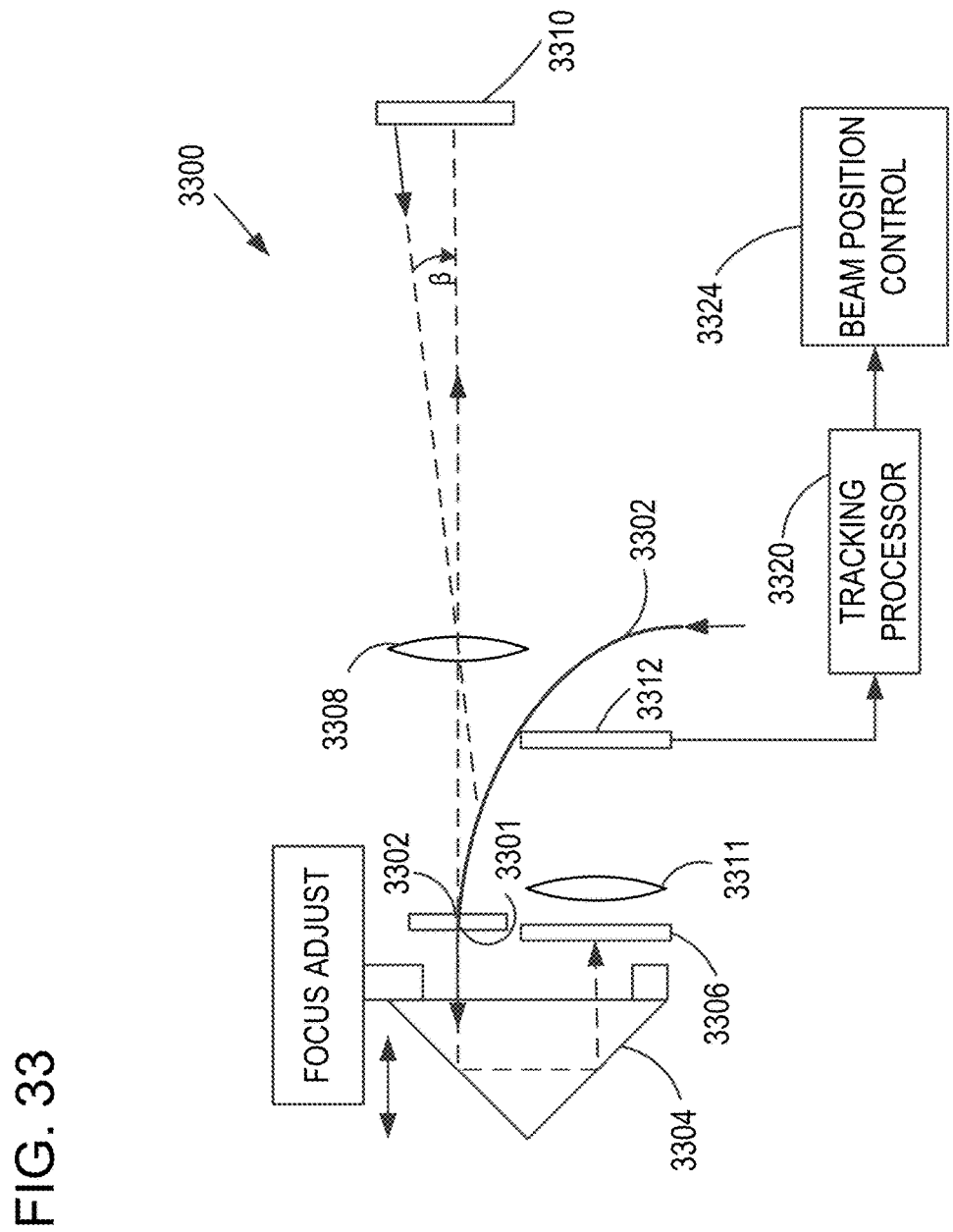
FIG. 33 illustrates a representative laser tracking system that includes a partially transmissive mirror situated to couple an optical beam to a detector for estimation of a beam pointing direction or direction error.

FIG. 33 illustrates a fiber coupled laser tracker or laser radar system 3300 in which an optical flux from a fiber 3302 is directed to a corner cube 3304. A partially transmissive return reflector 3306 returns a portion of the optical flux through the corner cube 3304 to a lens 3308 that forms a focused interrogation beam that is directed to a target 3310. The other portion of the optical flux is coupled to a position detection lens 3311 that directs the transmitted flux to a position detector 3312 such as a quadrant detector, a detector array, or other detectors so that beam location can be estimated. In this way, a location of an output surface 3301 of the fiber 3302 can be estimated. For convenience, the corner cube 3304 is illustrated as a right angle prism. Portions of the interrogation beam that are returned to the lens 3308 from the target are directed to the return reflector 3306. The return reflector 3306 is partially transmissive so that some of the returned interrogation beam is also coupled to a position detection lens 3311 that directs the transmitted flux to a position detector 3312 but the magnitude of this flux is typically too low to generate a useful signal.

The detector 3312 is coupled to a tracking processor 3320 that determines fiber position based on electrical signals from the detector 3312. Based on the estimated fiber position, an estimated beam position can be determined and a beam position controller 3324 can direct beam adjustment. Alternatively, an estimated beam position can be used in correcting position information in processing returned optical flux to establish object surface profiles, distances, or other object properties.

The reflector 3306 is typically configured to transmit less than about 10%, 5%, 1%, or 0.5% of an incident flux. In the configuration of FIG. 33, the return reflector is part of a focusing system, so that coupling flux to a detector for beam tracking does not otherwise disturb an optical system, except for a change in transmittance. However, in other examples, beam portions transmitted by fold mirrors can also be used for tracking. In addition, in some cases, some beam portions escape the corner cube upon each reflection at rear surfaces, and these beam portions can also be directed to a detector for beam tracking. If a tracking error or displacement or tilt of an optical module or component is detected, a compensation or calibration procedure can be executed.

Figure 34:
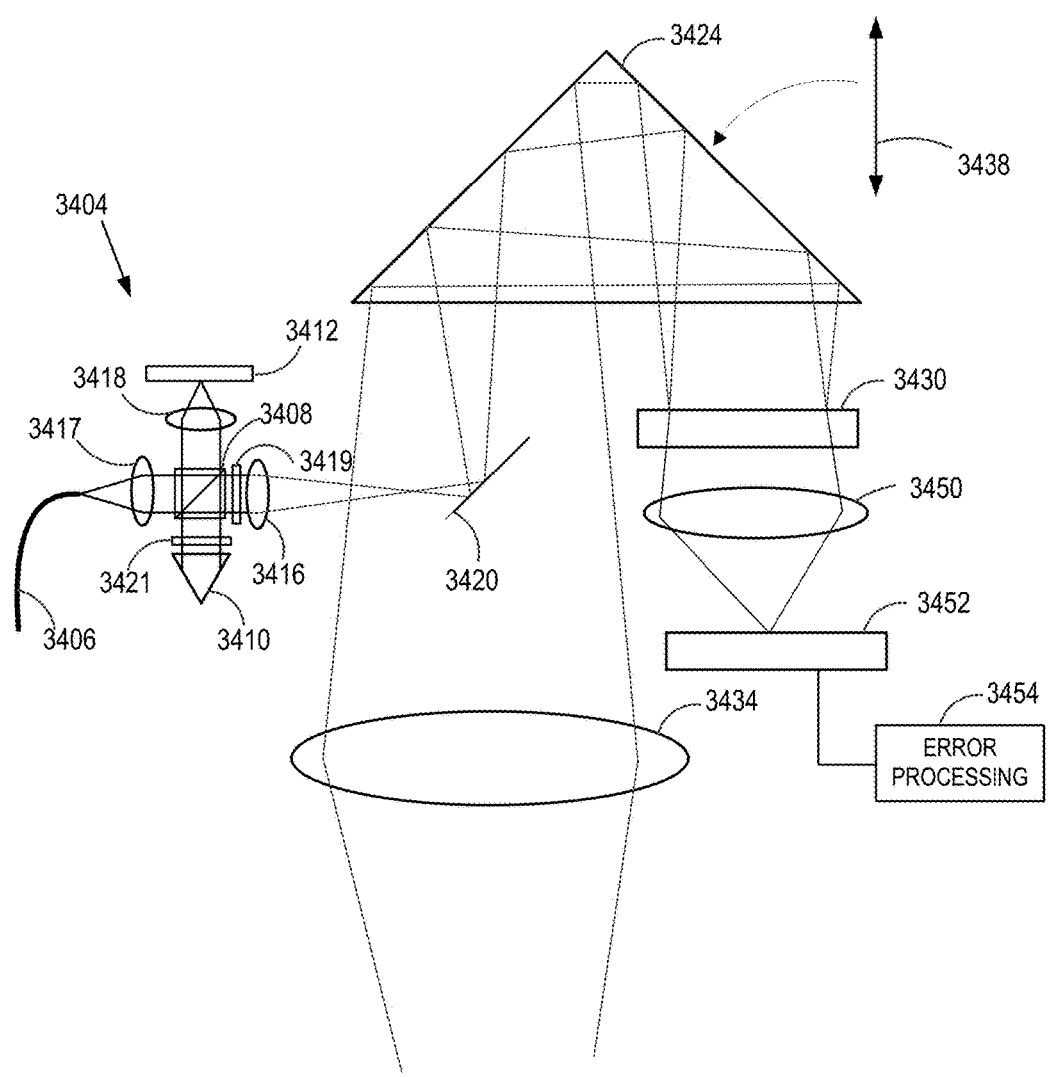
FIG. 34 illustrates a representative laser tracking system that includes a partially transmissive mirror situated to couple an optical beam to a detector for estimation of a beam pointing direction or direction error and a bulk optical system situated to deliver and receive optical beams.

FIG. 34 illustrates a laser radar system that includes an optical module 3404 coupled to receive an input optical beam (such as a chirped laser beam) from an optical fiber 3406. The optical module 3404 includes a beam splitter 3408, a retroflector 3410, and a detector 3412. Lenses 3416-3418 are provided to shape and focus optical beams as needed. A reflector 3420 is situated to direct an optical beam from the optical module 3404 to a focus adjustment corner cube 3424. A partially reflective return mirror 3430 is situated to receive an optical beam from the focus adjustment corner cube 3424 and reflect a measurement beam to the focus adjustment corner cube 3424 and an objective lens 3434. The focus adjustment corner cube 3424 is translatable along an axis 3438 so as to focus the measurement beam at a target surface. Scattering, reflected, or other portions of the measurement beam from the target are directed back to the optical module 3404 and coupled to the detector 3412. A portion of the input optical beam from the optical fiber 3406 is reflected to the detector 3412 by the beam splitter 3408 as an LO beam.

The optical module 3404 can be arranged so that an input beam in a linear SOP (for example, horizontal or "H") is slightly reflected by the beam splitter 3408 to the detector 3412 to provide an LO beam, while the remainder of the input beam is transmitted. A quarter wave plate 3419 produces a first circular SOP from the H SOP. The return beam from the target is preferentially a second circular SOP in a handedness opposite that of the first SOP. The quarter wave plate 3419 produces a vertical (V) polarization that is reflected by the beam splitter 3408 to a quarter wave plate 3421 and the retroreflector 3410. The quarter wave plate 3421 then produces a first circular SOP that is reflected by the retroreflector 3410 as a second circular polarization which is converted into an H polarization by retransmission by the quarter wave plate 3421. The return beam from the target is thus converted into an H SOP which can be efficiently transmitted by the beam splitter 3408 to the detector 3412. Thus, the optical module serves to provide separate measurement and LO beams from a common input beam, and recombine the return beam and the LO beam at a detector.

As shown in FIG. 34, a reflector 3420 is situated to direct the input beam to the target, but the optical module 3404 can generally be sufficiently compact that such a reflector is not required, and the beam from the lens directed into the corner cube 3424 without reflection.

The partially reflective return mirror 3430 also transmits a portion of the measurement beam to a lens 3450 and a position detector 3452. Measurement beam shape, pointing direction, and other characteristics can be evaluated based on the beam as imaged at the position detector 3452. For example, beam pointing errors can be evaluated, or variations in optical component locations can be detected. Any errors or artifacts determined in this manner can be used to adjust beam pointing or optical element position and orientation, or to provide compensation data so that scan errors can be corrected in the presence of beam position errors. An error processor 3454 can be provided to determine compensation or correction values, or to report the presence of errors.

Partial Remote Local Oscillators

Figure 35:
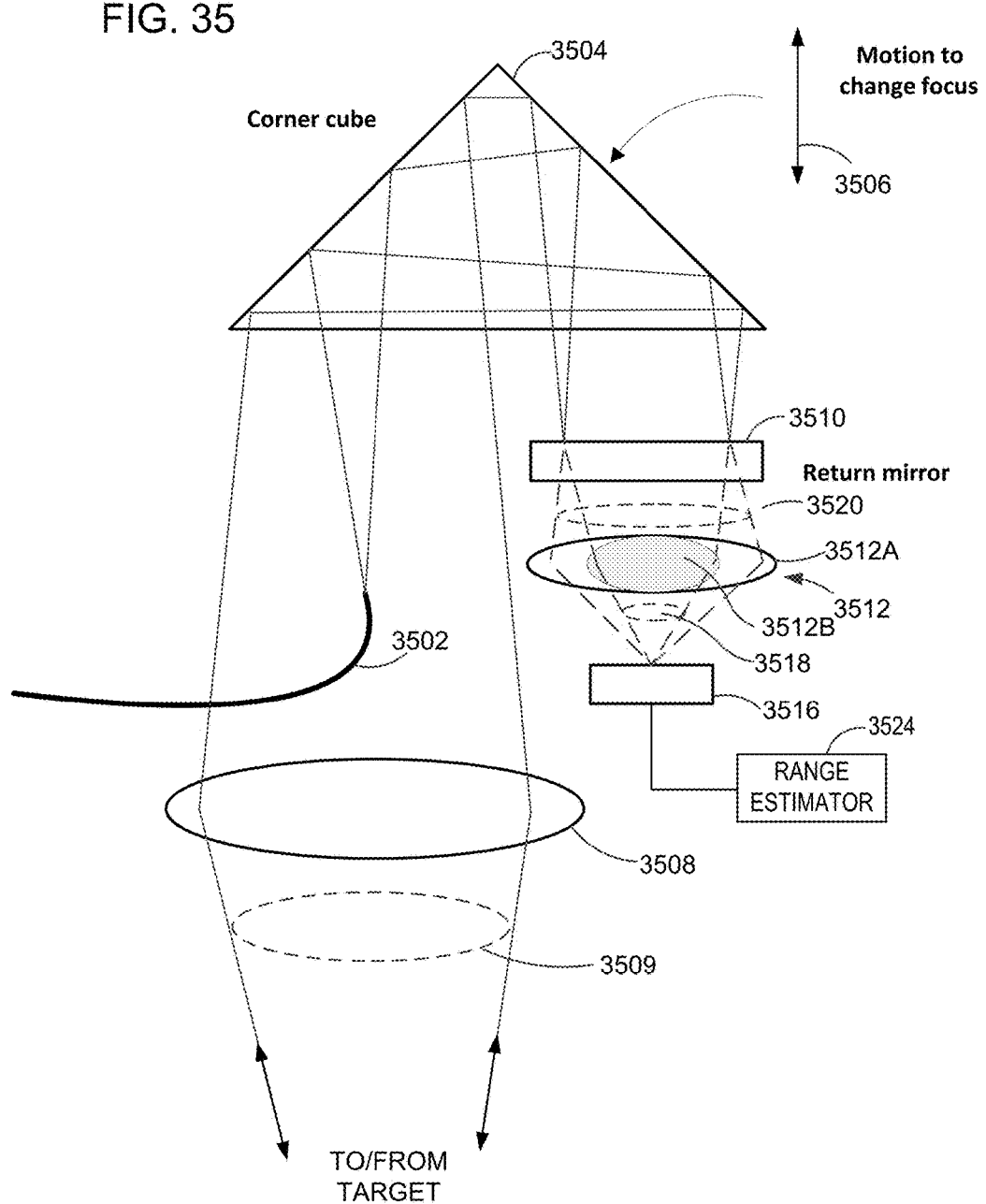
FIG. 35 illustrates a representative laser radar that includes a partially transmissive reflector configured to direct a measurement beam to a target and produce a local oscillator beam.

With reference to FIG. 35, an optical fiber 3502 is situated to direct an input beam to a corner cube 3504 that is translatable along an axis 3506 so that a measurement beam 3509 can be focused at a target with a lens 3508. The input beam is incident on a return mirror 3510 that reflects a measurement beam portion of the input beam to the lens 3508. An LO beam portion is transmitted to form an LO beam 3520 that is focused at a detector 3516 with an outer portion 3512A of a lens 3512. A portion of the return beam from the target is transmitted by the return mirror 3510 and focused by an inner portion 3512B of the lens 3512 as a beam 3518. The outer portion 3512A and the inner portion 3512B of the lens have different curvatures so that the LO beam and the return beam are suitably focused at the detector 3516. A signal processor 3524 is configured to estimate target range using a heterodyne frequency produced by the combined beams. The lens 3512 can be formed as a single lens element with differing curvatures, or be assembled from one or more separate lenses. In order to keep beams focused on the detector 3516, the lens 3512 may be secured to a translation stage so as to be translated in conjunction with the motion of the corner cube 3504. In the configuration of FIG. 35, an LO beam is provided by transmission through the return reflector and the LO beam traverses the focus adjustment corner cube 3504 once, and has a common optical path with the measurement beam to the return reflector 3510. The measurement beam and the associated return beam make a total of four passes through the focus adjustment corner cube 3504. As a result, path differences between the measurement/return beam and the LO beam introduced by focusing optics tend to be less well compensated than in systems in which the LO beam and the measurement/return make the same number of transits.

Fiber Beam Delivery with Compact Bulk Optics

Figure 36:
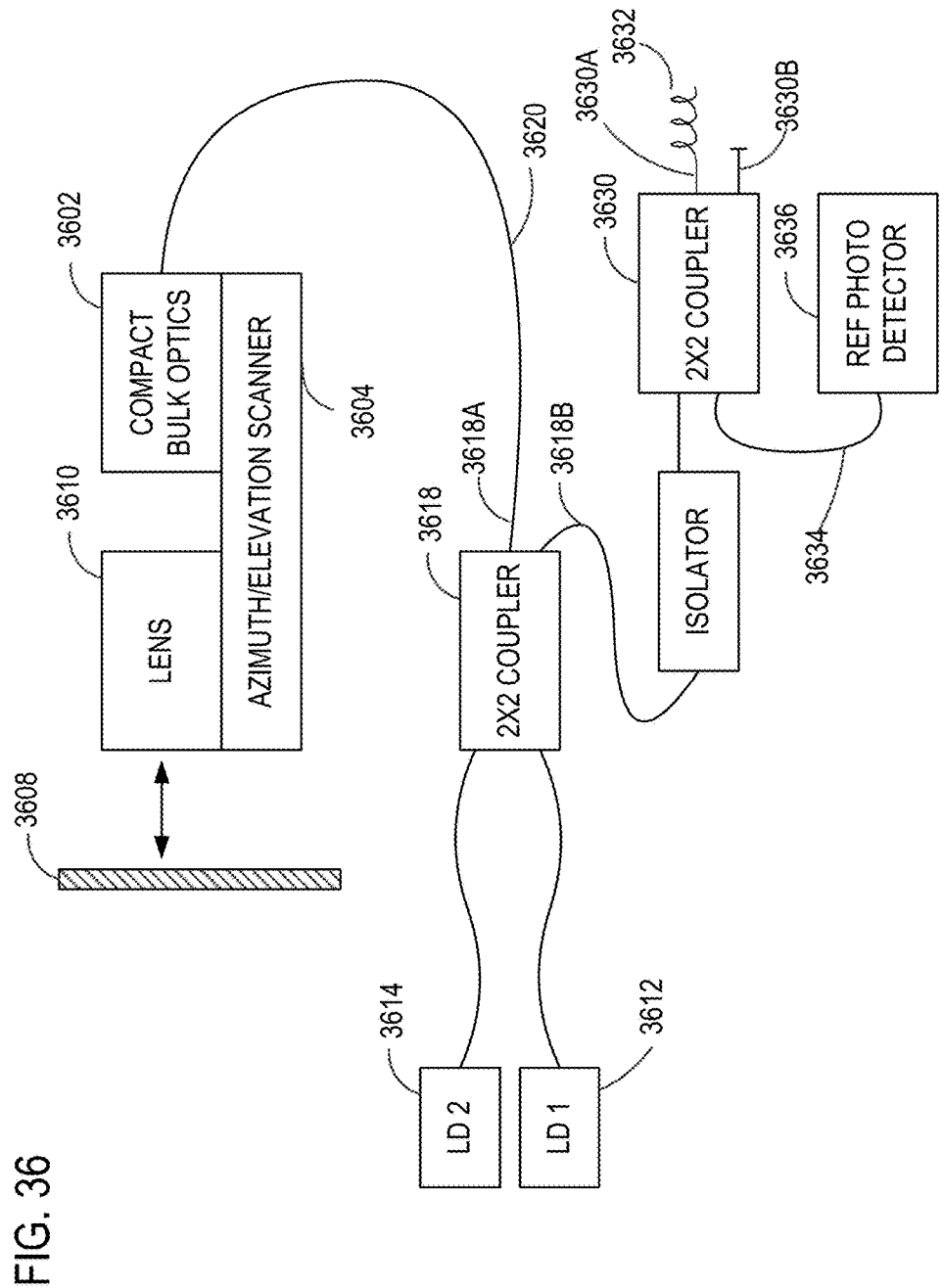
FIG. 36 illustrates a laser radar system in which combined counterchirped laser beams are coupled to a focusing and scanning system with a single mode fiber.

The optical module 3404 shown in FIG. 34 can be used in various embodiments to separate and recombine measurement and LO beams. As shown in FIG. 36, an optical module 3602 is secured to an azimuth/elevational angle scanner 3604 that is controlled to scan a measurement beam with respect to a target 3608. A lens 3610 is situated to receive the measurement beam and direct the measurement beam to the target 3608. Fiber coupled laser diode sources 3612, 3614 are connected to input ports of a 2 by 2 fiber coupler 3618. An output port 3618A of the fiber coupler 3618 receives portion of input beams from each of the sources 3612, 3614 and an optical fiber 3620 couples the combined beams to the optical module 3602. The module 3602 can produce an LO beam and a measurement beam, and combine the return beam and an LO beam at a detector or couple the combined return/LO beams to a fiber for coupling to a detector that may or may not be fixed with respect to the stage 3604. Details are not shown in FIG. 36 but can be similar to those of FIG. 34.

The coupler 3618 also includes an output port 3618B that is connected to a reference length coupler 3630 configured to direct a portion of the combined beam to a reference length 3632 via an output port 3630A. The reference length 3632 is configured to reflect the combined beam back to the output port 3630A but delayed by a reference distance. An output port 3630B of the fiber coupler 3630 is terminated to reflect a portion of the combined beam to provide an LO beam. The beam from the reference length 3632 and the LO beam are coupled to an optical fiber 3634 and a reference detector 3636.

Figure 37:
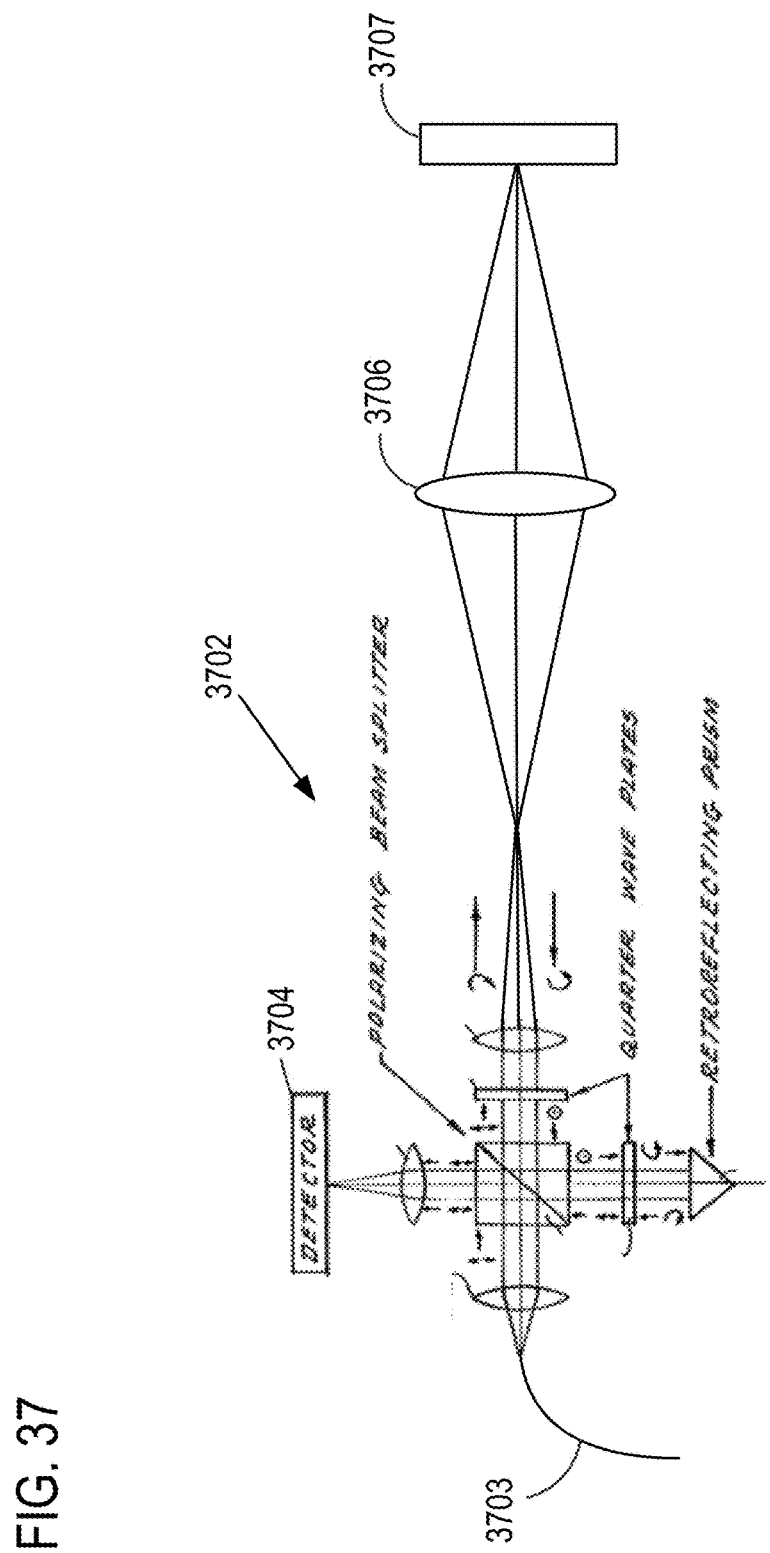
FIG. 37 illustrates a laser radar system in which a single mode optical fiber couples a chirped laser to a polarization based beam splitting system that produces a measurement beam and an LO beam.

With reference to FIG. 37, an optical module 3702 is situated to receive one or more input laser beams such as one or more chirped laser beams from an optical fiber 3703. A portion of the received beams is coupled to a detector 3704 as an LO beam and another portion is directed to a lens 3706 as a measurement beam. The lens 3706 focuses the measurement beam at a target 3707 and couples a return beam to the optical module 3702 for delivery to the detector 3704. In the example of FIG. 37, measurement beam focusing can be provided by translation of the optical module 3702 and/or the lens 3706.

Figure 38:
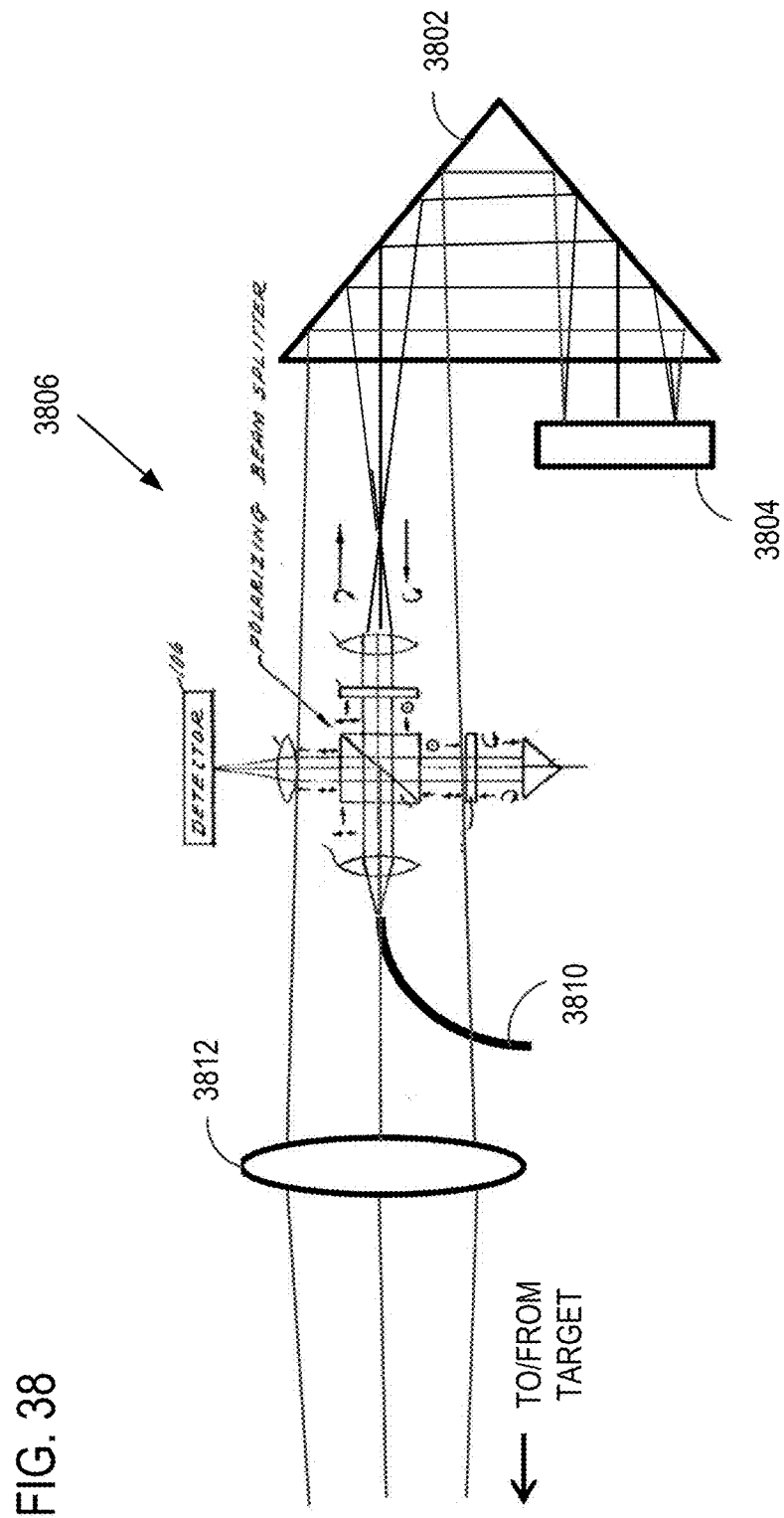
FIG. 38 illustrates a laser radar system in which a single mode optical fiber couples a chirped laser to a polarization based beam splitting system that produces a measurement beam and an LO beam. Beam focus is adjustable with translation of a corner cube.

In another example, shown in FIG. 38, a focus adjustment corner cube 3802 and a return reflector 3804 are situated so that translation of the focus adjustment corner cube 3802 focuses a measurement beam at a target. An optical fiber 3810 couples one or more input laser beams to an optical module 3806 that couples a combined measurement beam to the focus adjustment corner cube 3802. A lens 3812 is situated to receive the combined measurement beam and direct the combined measurement beam to a target as well as couple a returned beam to the optical module 3802.

Figure 39:
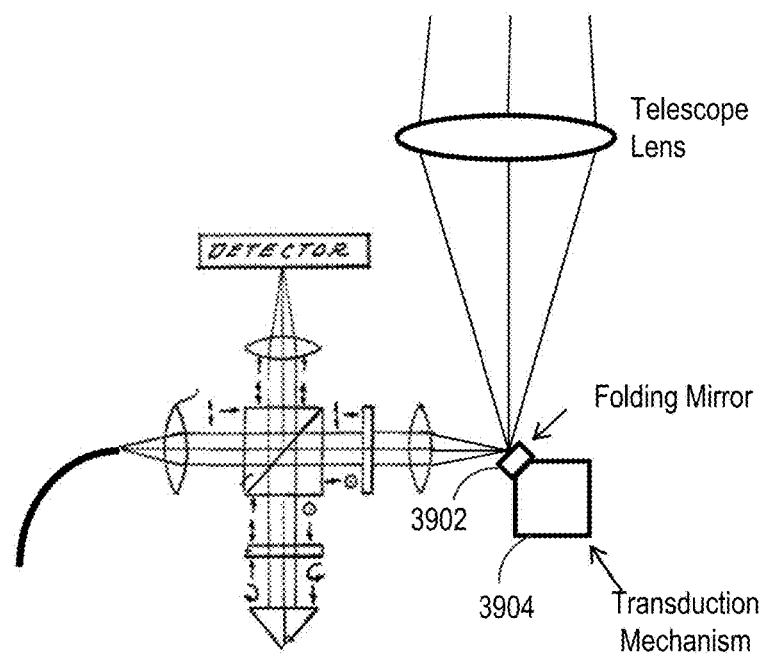
FIGS. 39-40 illustrate laser radar system that includes a rotatable folding mirror so as to scan a measurement beam over a target.
Figure 40:
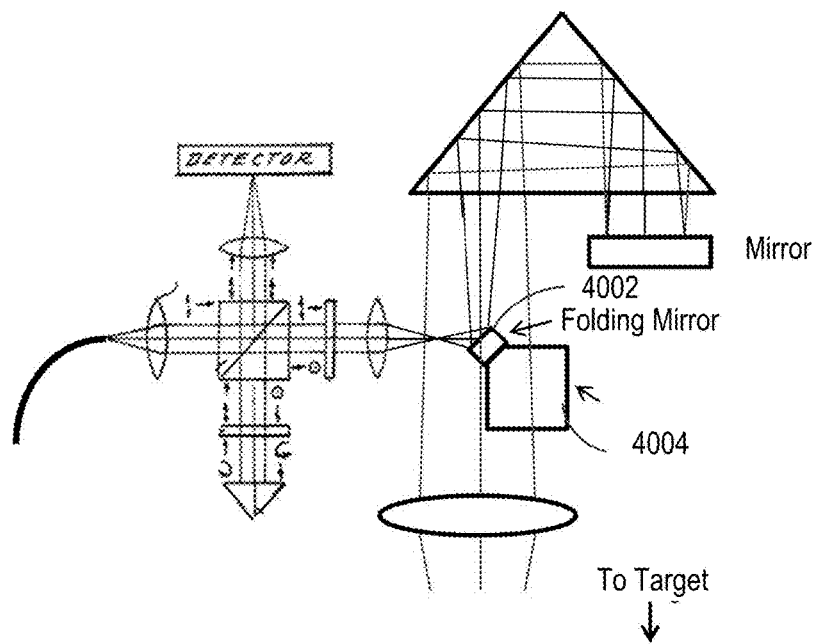

FIGS. 39-40 illustrate addition embodiments similar to those of FIGS. 37-38, but in these examples folding mirrors 3902, 4002 are secured to transducer/scanners 3904, 4004, respectively. The scanners 3902, 4002 can be configured to scan a measurement beam based on rotations about one or more axes.

Figure 50:
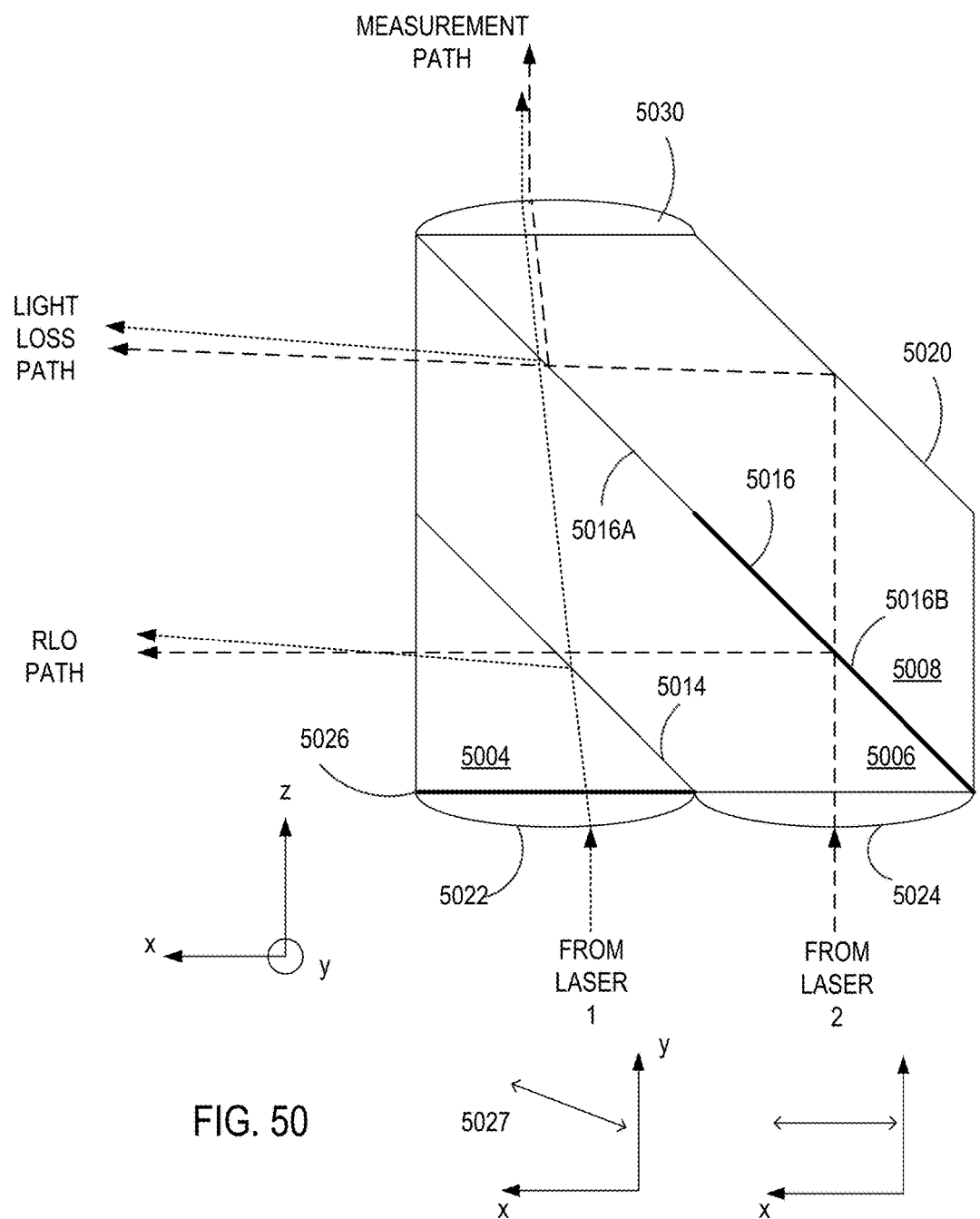
FIG. 50 is a schematic diagram illustrating a compact optical system that produces parallel measurement beams at first and second wavelengths and non-parallel LO beams in orthogonal polarizations.

With reference to FIG. 50, an LO beam separating and measurement beam combining optical system includes prisms 5004, 5006, 5008 that define reflective surfaces 5014, 5016, 5020. The reflective surface 5016 can be provided with different reflective coatings as surface portions 5016A, 5016B. A first laser is coupled to a first collimating lens 5022 and a polarizer 5026 along an axis that is offset from an axis of the first lens 5022. The first lens 5022 and the polarizer 5026 can be secured to the prism 5004. The polarizer is configured to transmit an x-directed linear SOP but is tilted so that a smaller portion (typically 1-10%) of a y-polarization is transmitted as well. Such a polarizer axis 5027 is shown as viewed along the axis of the first lens 5022. The reflective surface 5014 is selected so as to reflect a y-polarization and transmit an x-polarization. Thus, a portion of the first laser beam is directed along a remote local oscillator (RLO) path in linear SOP that is perpendicular to the plane of FIG. 50. The reflective surface portion 5016A is polarization independent and is selected to transmit and reflect equally (though unequal values can be used). As a result, 50% of the first laser beam is directed along a light loss path and 50% directed along the measurement path, polarized in the plane of FIG. 50.

A second laser is coupled to a second collimating lens 5024 along an axis of the lens 5022. The second laser beam is input as an x-polarization. The reflective surface portion 5016B is configured as polarization independent reflective surface that reflects a portion (typically about 20%) of the second laser beam towards the RLO path and transmits another portion (typically about 80%) to the reflective surface 5020. Because the reflected portion is linearly polarized in the plane of FIG. 50, the reflective surface 5014 transmits substantially all of this portion to the RLO path. First and second LO beams are thus generated, one in an SOP perpendicular to the plane of the drawing (the first laser beam) and the other in an SOP in the plane of the drawing. In addition, the first and second LO beams are not parallel to each other due the offset of the first laser beam with respect to the first lens 5022.

The transmitted portion of the second laser beam is reflected to the reflective surface portion 5016B that reflects portions (typically equal portions) to the measurement path and the light loss path. An angle of the reflective surface 5020 is selected so that the first and second measurement beams propagate along parallel axes upon exiting a lens 5030. Parallel propagation can be obtained by selection of surface orientation for the reflective surface 5020 or other surfaces, by translations of one or more collimating lenses or translations of one or more fibers that deliver the first and second laser beams.

The LO beams and return beam can be recombined for heterodyne frequency detection. Because the LO beams propagate along different axes and different SOPs, these beams can be selectively coupled to corresponding detectors, and each LO beam can be coupled to only one detector with little leakage to the other. In some examples, 60 dB or more LO isolation can be provided.

Multiple Beam Scanning and Vision Systems

Figure 41:
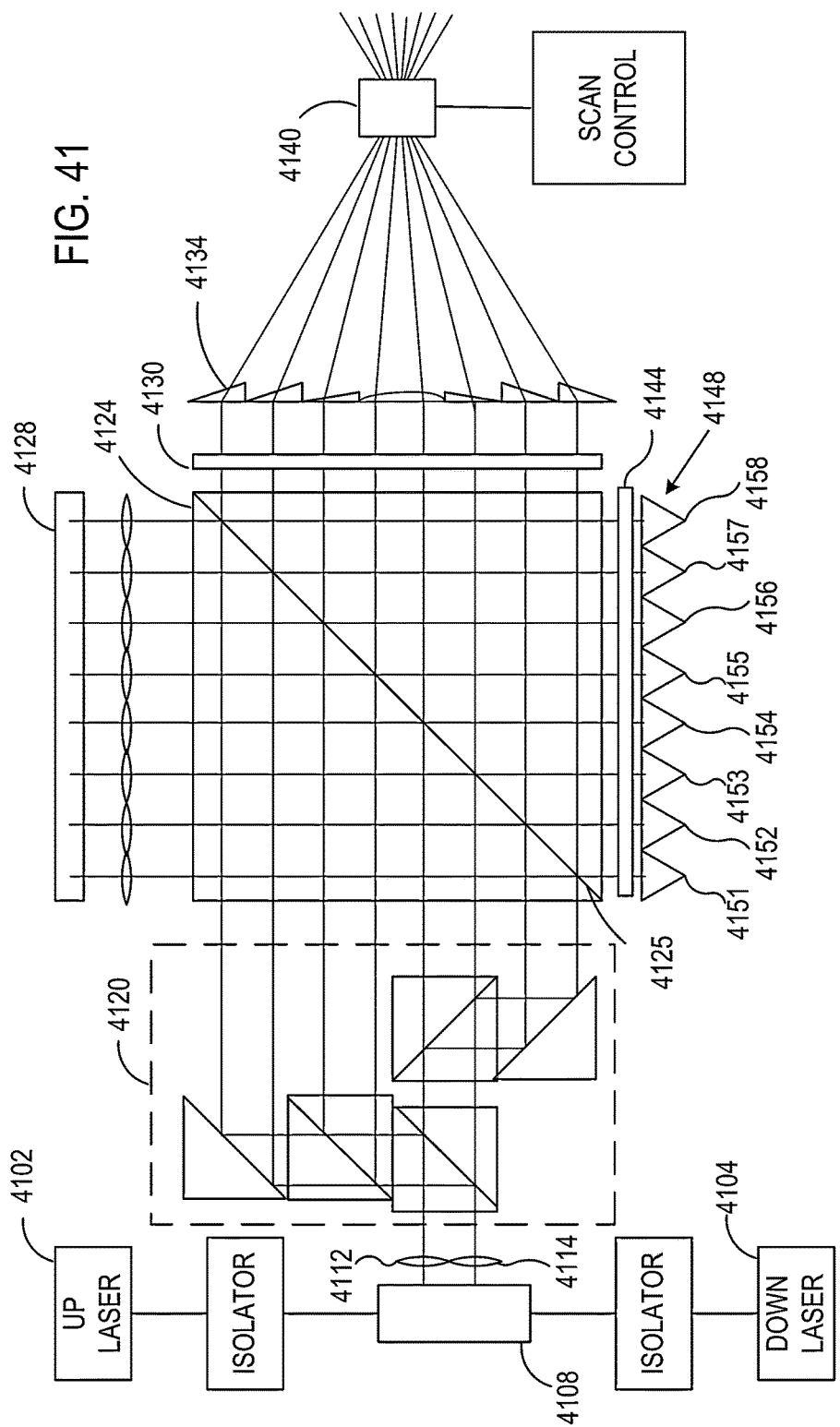
FIG. 41 is a schematic diagram of a multi-beam laser radar system.

Referring to FIG. 41, a laser radar that scans a plurality of measurement beams includes first and second chirped lasers 4102, 4104 that are connected to optical isolators and a 2 by 2 fiber coupler 4108 with polarization maintaining fibers. The beams from the first and second lasers are configured to be aligned with either a fiber fast axis or a fiber slow axis. The outputs of the fiber coupler are situated so that lenses 4112, 4114 produce collimated beams that are directed to a beam dividing optical system 4120 that includes a plurality of beam splitters and reflectors (shown as prisms in FIG. 41). Each of the lenses 4112, 4114 produces a beam that includes up and down chirped portions and the beam dividing optical system 4120 is configured to produce eight beams that are directed to a polarizing beam splitter (PBS) 4124. The beams and the PBS 4124 are arranged so that a portion (typically about 5%) of each beam is reflected by the PBS 4124 at a reflective surface 4125 to a corresponding detector of an array 4128 of detectors to serve as LO beams (with LO portions for both up and downchirped lasers).

Eight beam portions are transmitted by the PBS 4124 to a quarter wave plate 4130 and a prism or lens array 4134 that directs eight beams to a scanner 4140. The eight beams are then scanned over a target area, and return beam portions from the target are directed to respective detectors of the detector array 4128. The lens array 4134 and the quarter wave plate 4130 direct the return beams to the reflective surface 4125 which is situated to reflect the return beams to a quarter wave plate 4144 and to respective retroreflectors 4151-4158 of a retroreflector array 4148. A single scanner such as a scanning mirror can be used, but in other examples, one or more or all beams can be directed to associated scanners.

The quarter wave plate 4130 is arranged so that the measurements beams are circularly polarized in a first circular SOP. The return beams are circularly polarized in second circular SOP (orthogonal to the first circular SOP). Transmission of the return beams by the quarter wave plate 4130 produces linearly polarized beams that are reflected by the PBS 4114 to the quarter wave plate 4144 and the retroreflector array 4148. As a result the beams arrive at the quarter wave plate 4130 in a first linear SOP but are returned to the PBS 4114 in an SOP that is transmitted by the reflective surface 4125 to the detector array 4128.

In the example of FIG. 41, two lasers (one upchirped and the other downchirped) are provided so that Doppler effects can be corrected without multiple scans by each beam. If a lower overall scan rate is acceptable, a single chirped laser can be used and measurements obtained during its upchirp and downchirp combined. Simultaneous scans (with upchirped and downchirped lasers) are generally preferable to sequential scans (with a single up and downchirped laser) for moving or vibrating targets.

In an illustrative example, eight beams (with up and down chirped laser beam components) are scanned simultaneously, so that a scan rate of 192 lines/sec requires a scanning mirror to oscillate at 12 Hz. Each group of eight lines will be scanned in the forward direction in ¹⁄₂₄th of a second (0.04167 seconds) and then scanned in the reverse or retrace direction in the same time. If 4000 measurements/second can be made, then 167 measurement points per line can be acquired in ¹⁄₂₄ s and a 32,000 pixel frame can be acquired in one second.

A rotating scan mirror introduces Doppler effects into the scanned beam. If a beam center strikes a scan mirror along an axis of rotation, beam edges will experience equal and opposite Doppler frequency shifts that produce an edge to edge frequency difference $F_{dd}=4\omega d/\lambda$, wherein $\omega$ is scan mirror angular speed (rad/sec), d is beam diameter, and $\lambda$ is beam wavelength. For a 15 degree scan in ¹⁄₂₄ sec, the maximum Doppler frequency difference is about 32.4 kHz. Range errors associated with the frequency difference tend to be about ⅓ as large as those predicted based on the maximum Doppler frequency difference. For dual laser (i.e., counterchirped) laser systems, range errors can be even less.

The scanner 4140 is generally configured to provide a fast scan of the measurement beams. A scanning lens expands and focuses the scanned beams. The scan angle of each of the beams is reduced in proportion to the beam expansion as provided by the optical invariant. The expanded, focused beams are then directed to a secondary scanner that is configured to scan the beams in a direction that is not parallel to the scan direction of the scanner 4140. The secondary scanner can be continuous and periodic so as to produce zig-zag scan patterns, or can scan in stepped increments to produce a series of parallel multiple beam scans. Other scan patterns can be used as may be convenient.

The system of FIG. 41 generally includes a reference path as well. Each of the lasers is connected to a fiber coupler such as a 2 by 2 coupler that directs portions of each laser to the system shown in FIG. 41. Other portions are directed to a reference path. For example, a 2 by 2 coupler can be configured to provide 95% of each beam to the multiple beam scanner and 5% of each beam to a reference length. A reference signal for each laser is produced at a corresponding reference detector.

Figure 42:
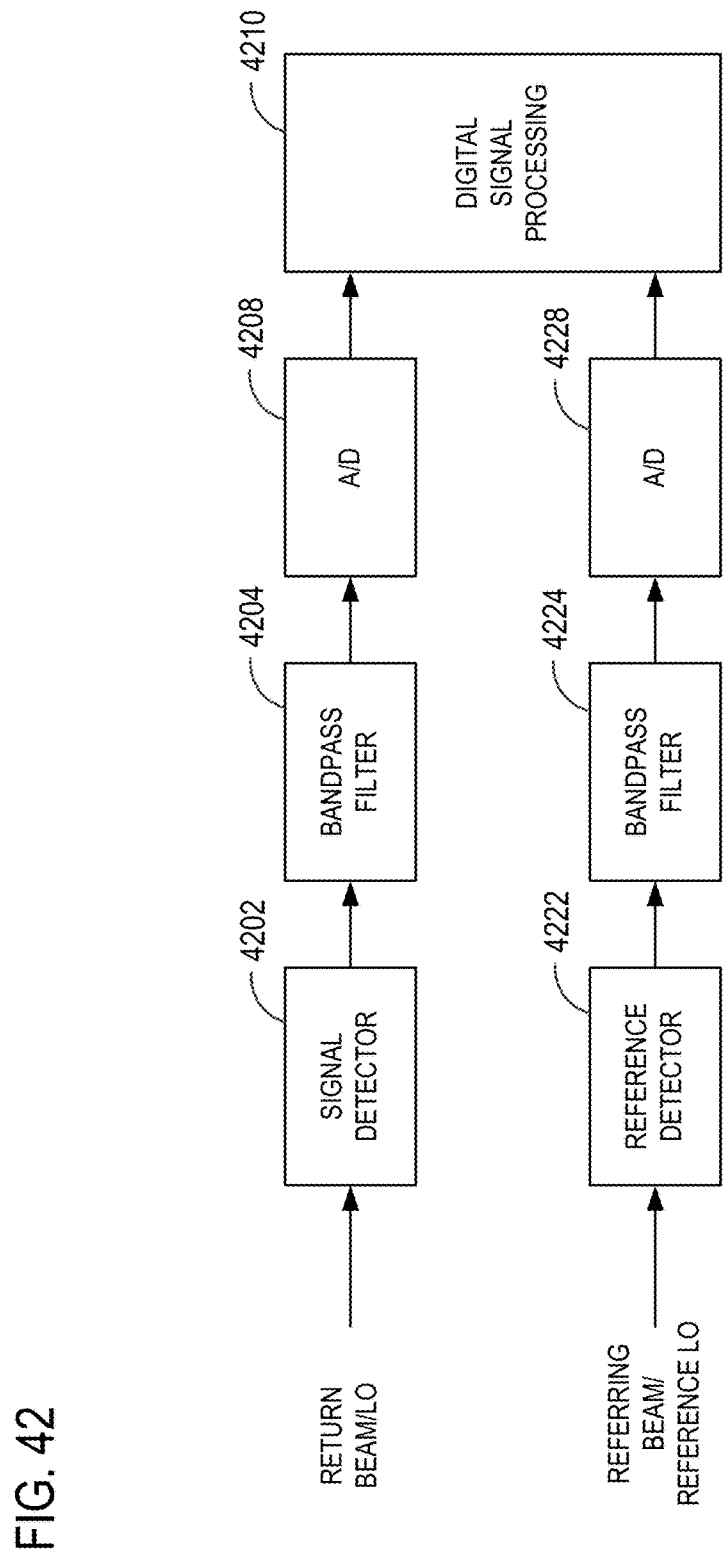
FIG. 42 illustrates a representative range signal processing receiver.

A representative range processing receiver is illustrated in FIG. 42. A signal detector 4202 is coupled to receive a return beam and an LO beam. A bandpass filter 4204 is configured to filter the detector signal and remove signal contributions outside a frequency range of interest. An analog-to-digital convertor (A/D) 4208 is configured to produce a digital representative of the filtered detector signal, and a digital signal processor 4210 identifies a heterodyne frequency associated with target range based on, for example, an FFT of the filtered detector signal. A reference arm signal based on a reference beam and a reference LO beam is produced at a reference detector 4222. A bandpass filter 4224 is configured to filter the reference detector signal and remove signal contributions outside a frequency range of interest. An analog-to-digital convertor (A/D) 4228 is configured to produce a digital representative of the filtered reference detector signal, and the digital signal processor 4210 identifies a heterodyne frequency. Each of the beams of FIG. 41 is similarly processed, and reference beams for each laser are also processed. Eight identified ranges and two reference heterodyne frequencies are further processed to provide range estimates and calibration.

Laser Radar with Apertured Folding Mirror

Figure 43:
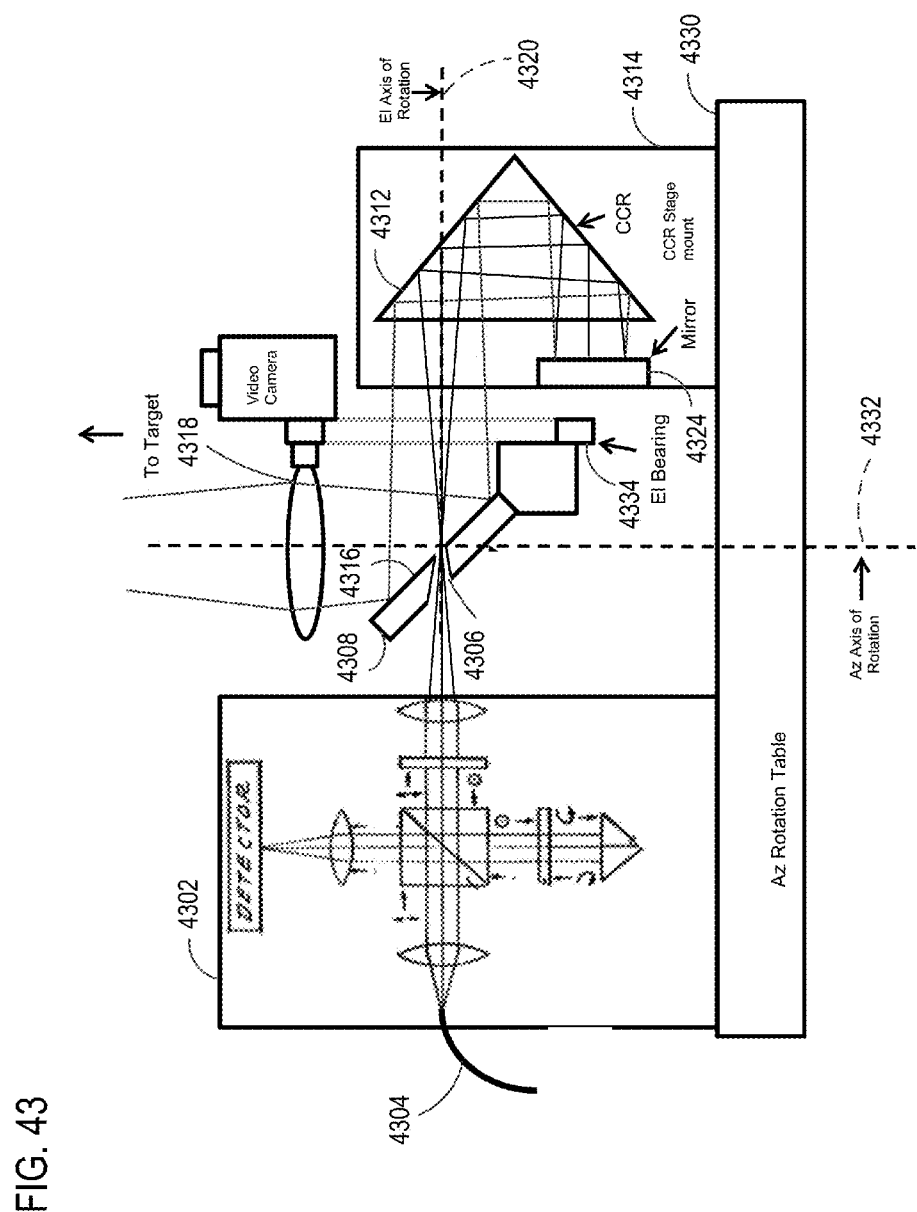
FIG. 43 illustrates a laser radar that includes a folding mirror with an aperture.

Referring to FIG. 43, an optical module 4302 is coupled to receive an input beam from an optical fiber 4304. A measurement beam is directed to an aperture 4306 in a fold mirror 4308. A focusing system 4314 that includes a focus adjustment corner cube 4312 and a return reflector 4324 is situated to receive the measurement beam and return the measurement beam to a reflective surface of the mirror 4308. The mirror 4308 then directs the measurement beam to a lens 4318 that focuses the measurement beam at a target. Beam focusing is provided by translation of the focus adjustment corner cube 4312 in a direction parallel to an axis 4320.

The optical module 4302 and the focusing system 4314 are secured to an azimuthal rotational table 4330 that is configured to rotate about an axis 4332. The folding mirror 4308, the focusing lens 4318, and the video camera are coupled to an elevational rotational bearing that is configured to rotate about the axis 4320.

Remote Local Oscillators with Compact Bulk Optics

Figure 44B:
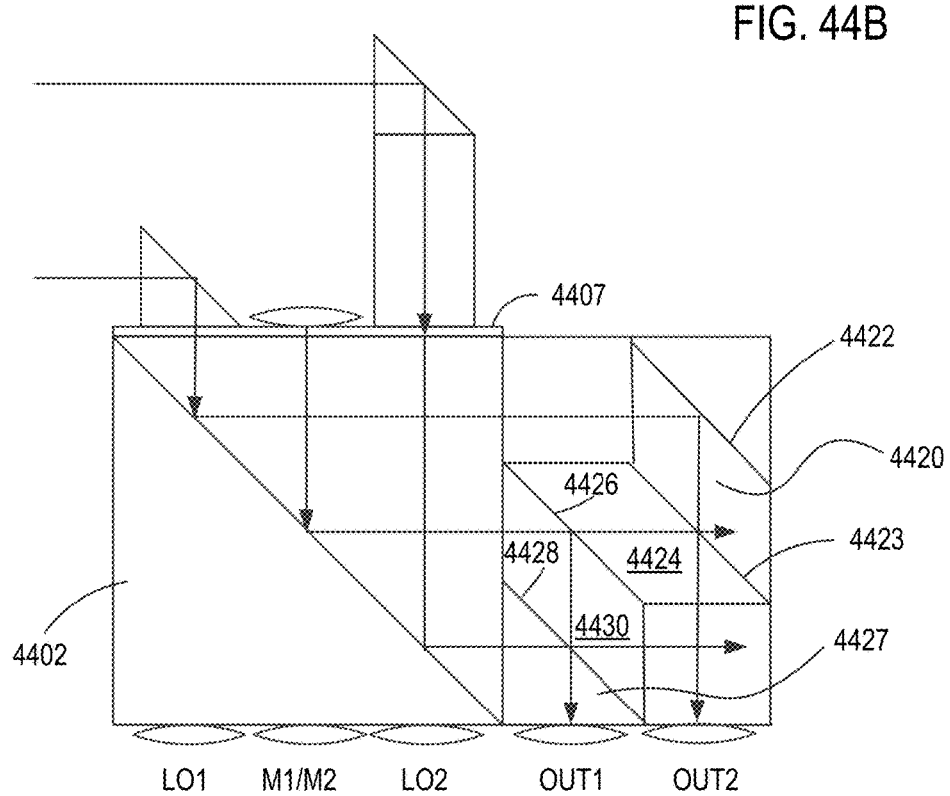

FIGS. 44A-44B illustrate an optical system that couples LO beams and a combined dual laser measurement beam to a focus adjustment corner cube. FIG. 44A illustrates input LO beams and measurement beam, and FIG. 44B illustrates mixing of a return beam with the LO beams. Single mode optical fibers can be used to deliver the LO beams and the combined measurement beams, and single mode or multi-mode optical fibers can be used to couple mixed LO and return beams to detectors, but such fibers are not shown in FIGS. 44A-44B.

A PBS cube 4402 is configured to receive first and second LO beams LO1, LO2 and a combined dual wavelength measurement beam (M1/M2) that preferably are in a first linear SOP that is transmitted by the PBS cube 4402. A prism 4404 directs the first LO beam to a focus adjustment corner cube and a first LO return reflector so as to produce a first remote LO beam. A right angle prism 4406 and a rectangular prism 4408 are configured to direct the second LO beam to the focus adjustment corner cube and a second LO return reflector so as to produce a second remote LO beam. The combined measurement beam is focused by a lens 4410 and propagates to a mirror that reflects the beam to a focus adjustment corner cube assembly and then to a target. A quarter wave plate 4407 is orientated to produce a common circular SOP in the LO beams and the measurement beam.

FIG. 44B illustrates first and second LO beams as returned to the PBS cube 4402. The quarter wave plate 4407 produces a second linear SOP that is reflected by the PBS cube 4402. The first LO beam is reflected to a reflective surface 4422 defined as an interface surface between parallelogram prisms 4420, 4424 to a second output (OUT2). The return measurement beam is reflected so as to be partially reflected at a surface 4426 and a surface 4423 so as to be coupled to both the first and second outputs (OUT1, OUT2). The surface 4426 can be defined at an interface between the parallelogram prism 4424 and a parallelogram prism 4430. The second LO beam is reflected by the PBS cube 4402 so as to be reflected by a surface 4428 to the first output (OUT1). Typical surface reflectances for the surfaces 4422, 4426, 4428 are 80%, 50%, and 20%, respectively, but other reflectances can be used. Additional prisms can be provided so that the assembly of FIGS. 44A-44B can be formed as a cemented optical assembly.

Figure 45:
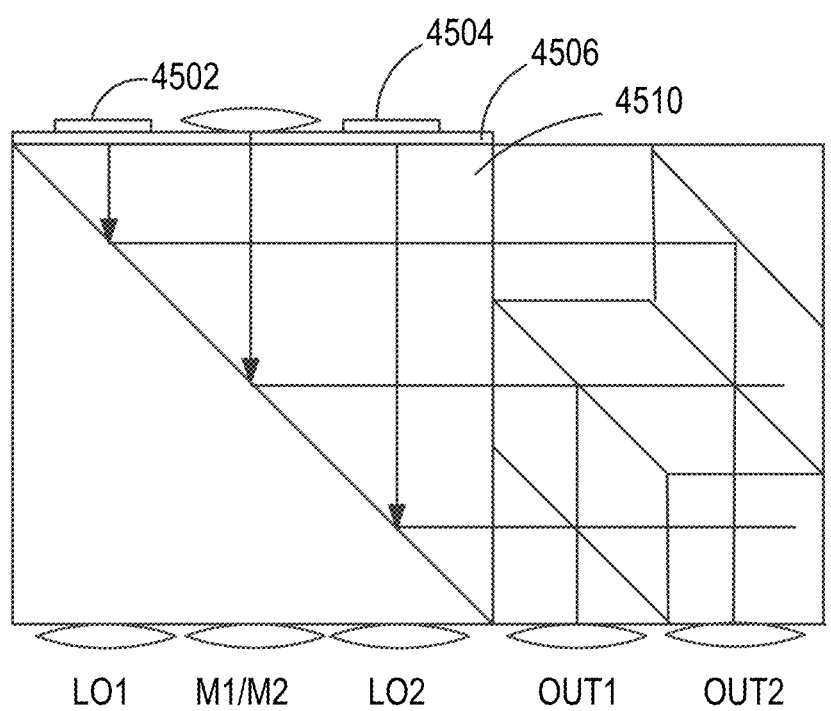
FIG. 45 is a schematic diagram of an optical assembly configured to produce a dual laser measurement beam and two LO beams.

FIG. 45 illustrates an alternative to that of FIGS. 44A-44B. Instead of directing first and second LO beams to a focus adjustment corner cube, reflectors 4502, 4504 are situated at a surface of a quarter wave plate 4506 so as to direct the LO beams back into a PBS cube 4510 and to respective output ports. In this example, effects such as path length changes due to corner cube displacement or thermal changes do not modulate the LO beams. As a result, such modulations are more likely to contribute to range errors than systems in which an LO path more closely approximates a measurement beam/return beam path within the laser radar optical system.

Representative Measurement System Implementations

Figure 52:
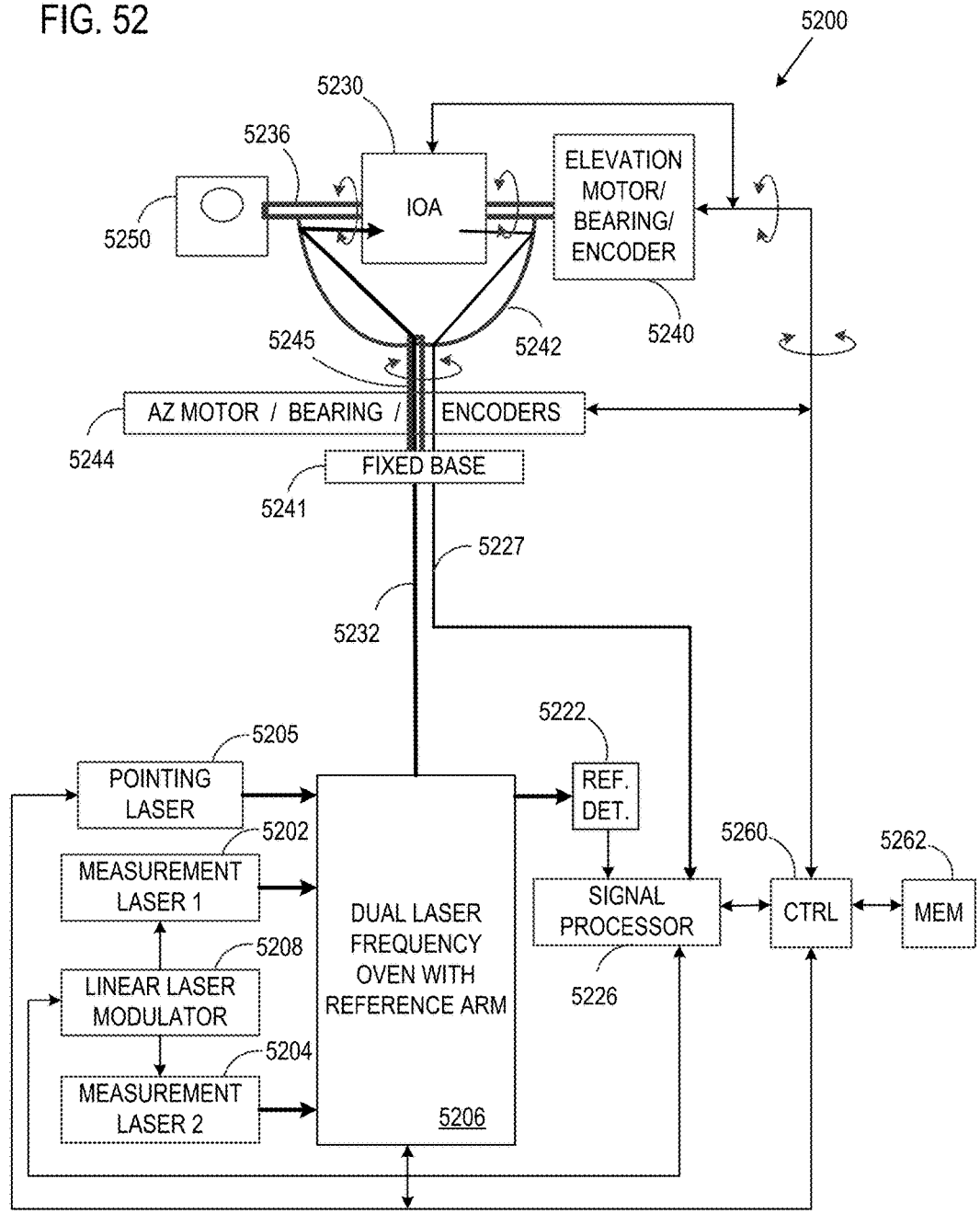
FIGS. 52-54 illustrate representative laser radars/laser trackers that include systems such as those disclosed above.
Figure 53:
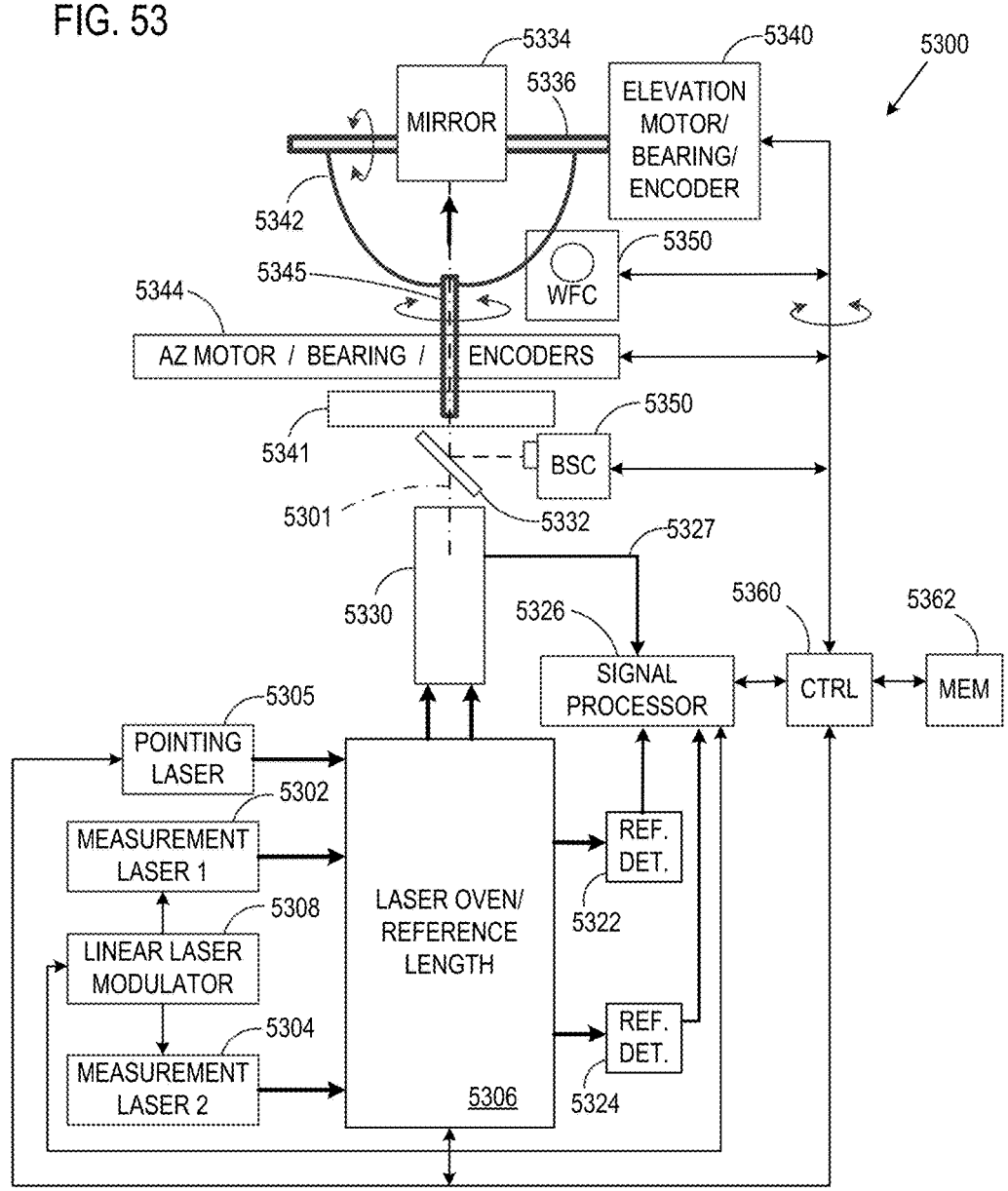
Figure 54:
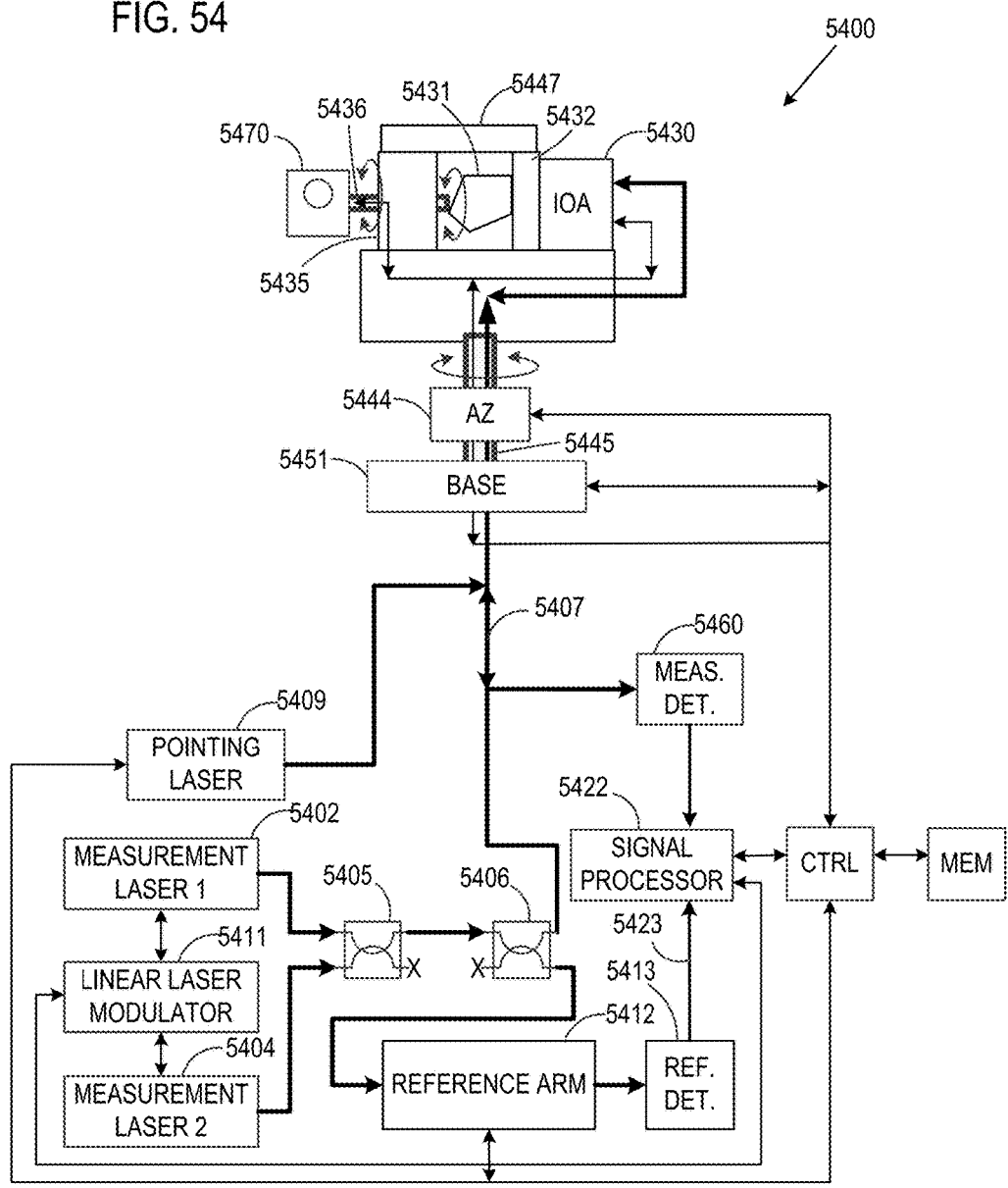

The examples above can be included or implemented in a variety of complete systems. FIGS. 52-54 illustrate a few representative systems. With reference to FIG. 52, a laser radar system 5200 includes a measurement lasers 5202, 5204 coupled to a fiber-based optical module 5206. A pointing laser 5205 is also coupled to the fiber-based optical module 5206 to permit user viewing of a target location that is under interrogation. A modulator 5208 is coupled to the measurement lasers 5202, 5204 and is typically configured to provide a linear optical frequency modulation of associated measurement beams. In other examples, an amplitude modulation or phase modulation can be applied, and non-linear modulations can be used. The optical module 5206 includes a reference length such as disclosed above, and a reference optical signal from the reference length is directed to a reference detector 5222 that is coupled to a signal processor 5226 for calibration of the modulations of the first measurement laser 5202 and the second measurement laser 5204, respectively. In an alternate configuration two reference detectors can be used, one for each laser.

An integrated optical assembly (IOA) 5230 is configured to receive the measurement beams from the measurement lasers 5202, 5204 via an optical fiber 5232. The IOA 5230 is rotatable on elevation shaft 5236 with an elevation motor/bearing/encoder assembly 5240. The elevation shaft 5236 is secured to a mount 5242 that is in turn secured to a shaft that 5245 is rotatable with an azimuth motor/bearing/encoder assembly 5244 about a fixed base 5241. The IOA 5230 is also configured to receive probe beam portions from a target, and combine the received probe beam portions with LO beams corresponding to each of the measurement beams.

The combined beams are directed to one or more photodetectors, and an interference (heterodyne) electrical signal is coupled to the signal processor 5226 with an RF cable 5227. The IOA 5230 also includes focusing optics, and provides a common probe beam/LO beam optical system as disclosed in detail in the examples above.

A camera 5250 is coupled to view a target and rotate with the IOA 5230. A controller 5260 is coupled to the signal processor 5226, the azimuth motor/bearing/encoder assembly 5244, and the elevation motor/bearing/encoder assembly 5240. Calibration values, measurement results, images, computer-executable instructions for rotational control and signal processing, and other data and operating programs can be stored in a memory 5262.

With reference to FIG. 53, a laser radar system 5300 includes first and second measurement lasers 5302, 5304 coupled to a fiber-based optical module 5306. A pointing laser 5305 is also coupled to the fiber-based optical module 5306 to permit user viewing of a target location that is under interrogation. A modulator 5308 is coupled to the measurement lasers 5302, 5304 and is typically configured to provide a linear optical frequency modulation of associated measurement beams. In other examples, an amplitude modulation or phase modulation can be applied, and nonlinear modulations can be used. The optical module 5306 includes a reference length such as disclosed above, and a reference optical signal from the reference length is directed to reference detectors 5322, 5324 that are coupled to a signal processor 5326 for calibration of the modulations of the first measurement laser 5302 and the second measurement laser 5304, respectively. In an alternate configuration, a single reference detector can be used for both lasers.

An integrated optical assembly (IOA) 5330 is configured to receive the measurement beams from the measurement lasers 5302, 5304 to provide a focused probe beam through a cold mirror 5332 to a scan mirror 5334 that is rotatable on elevation shaft 5336 with an elevation motor/bearing/encoder assembly 5340. The elevation shaft 5336 is secured to a mount 5342 that is in turn secured to a shaft that 5345 is rotatable with an azimuth motor/bearing/encoder assembly 5344 about a fixed base 5341. The IOA 5330 is also configured to receive probe beam portions from a target, and combine the received probe beam portions with LO beams corresponding to each of the measurement beams. The combined beams are directed to one or more photodetectors, and an interference (heterodyne) electrical signal is coupled to the signal processor 5326 via an RF cable 5327. Alternatively, the combined beams can be directed via an optical fiber back to the laser oven 5306 and then to one or more photodetectors. The IOA 5330 also includes focusing optics, and provides a common probe beam/LO beam optical system as disclosed in detail in the examples above.

A bore sight camera (BSC) 5350 is coupled to view a target along a probe beam axis 5301 with the cold mirror 5332, and a wide field camera (WFC) 5350 is secured to the mount 5342 so as to rotate about an azimuthal axis corresponding to an axis of the shaft 5345. A controller 5360 is coupled to the signal processor 5326, the azimuth motor/bearing/encoder assembly 5344, and the elevation motor/bearing/encoder assembly 5340. Calibration values, measurement results, images, computer-executable instructions for rotational control and signal processing, and other data and operating programs can be stored in a memory 5362.

With reference to FIG. 54, a laser radar system 5400 includes first and second measurement lasers 5402, 5404 coupled to a fiber couplers or circulators 5405, 5406 to provide a combined beam in a fiber 5407. A beam from a pointing laser 5409 is combined with the measurement beam to permit user viewing of a target location that is under interrogation. A modulator 5411 is coupled to the measurement lasers 5402, 5404 and is typically configured to provide a linear optical frequency modulation of associated measurement beams. In other examples, an amplitude modulation or phase modulation can be applied, and nonlinear modulations can be used. The circulator 5406 couples the combined measurement beams to a reference length 5412. A reference detector 5413 receives the beams from the reference length 5412 and couples a corresponding electrical signal to a signal processor 5422 via an RF cable 5423.

An integrated optical assembly (IOA) 5430 is configured to receive the measurement beams from the fiber 5407 to provide a focused probe beam that is directable to a target with a pentamirror 5431 that is rotatable on elevation shaft 5436 using an elevation bearing 5432 and an elevation motor/bearing/encoder assembly 5435. The IOA 5430 and the elevation motor/bearing/encoder assembly 5435 are fixed to each other via a bridge support 5447. The IOA 5430, the elevation shaft 5436, the bearing 5432, and the elevation motor/bearing/encoder assembly 5435 are secured to a shaft 5445 is rotatable with an azimuth motor/bearing/encoder assembly 5444 about a fixed base 5451. The IOA 5430 is also configured to receive probe beam portions from a target, and combine the received probe beam portions with LO beams corresponding to each of the measurement beams. The combined beams are directed to a measurement photodetector 5460 via the fiber 5407, and an interference (heterodyne) electrical signal is coupled to the signal processor 5422. The IOA 5430 also includes focusing optics, and provides a common probe beam/LO beam optical system as disclosed in detail in the examples above. A camera 5470 is coupled to view a target and rotate with the elevation shaft 5436.

Fiber-based systems such as those above in which multiple probe beams and/or local oscillator beams are combined in a single fiber permit arbitrary component placement. All beams propagate in a common fiber so that motion, temperature, or other environmental effects on the fiber are common to all beams, and are either removed or removable in a detection system.

Measurement Systems Based on Amplitude Modulated Optical Beams

Figure 55:
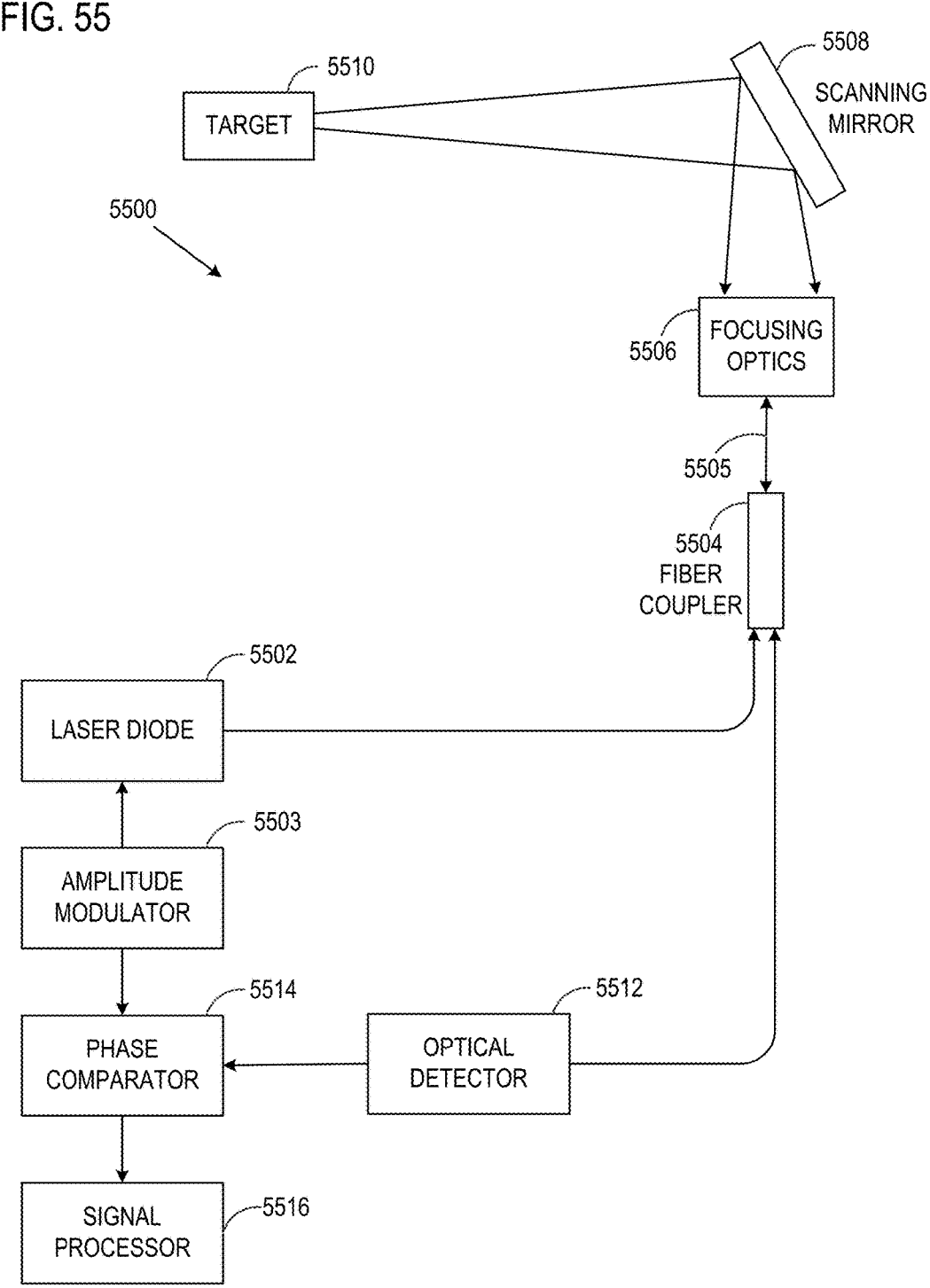
FIG. 55 is a block diagram of a measurement system based on an amplitude modulated optical beam.

While swept frequency systems offer numerous advantages, amplitude or phase modulated laser radar and laser tracking systems can be used and incorporate the features and systems disclosed above. Referring to FIG. 55, a laser radar or tracking system 5500 includes a laser diode 5502 that is coupled to an amplitude modulator 5503 to provide an amplitude modulated (AM) optical beam to a fiber coupler 5504. The fiber coupler 5504 delivers the AM optical beam via an optical fiber 5505 to a focusing optical system 5506 and a scanning mirror 5508 so as to direct the AM optical beam to a target 5510. The scanning mirror 5508 can be a pentamirror or other suitable optical element. The optical beam returned from the target 5502 is directed back via the fiber coupler 5504 to an optical detector 5512. A phase comparator 5514 is coupled to the amplitude modulator 5503 and the optical detector 5512 so as to determine phase shifts between the amplitude modulation applied to the optical beam and the AM modulation of the return beam from the target 5510. Phase information from the phase detector 5514 is coupled to a signal processor 5516 that estimates a target distance based on the phase information.

One or more AM optical beams can be used, and plurality of phase modulations can be applied and detected. In other examples, frequency modulations (FM) at electrical frequencies can be applied instead of or in addition to AM modulation.

Laser Radar Methods and Applications

Figure 56:
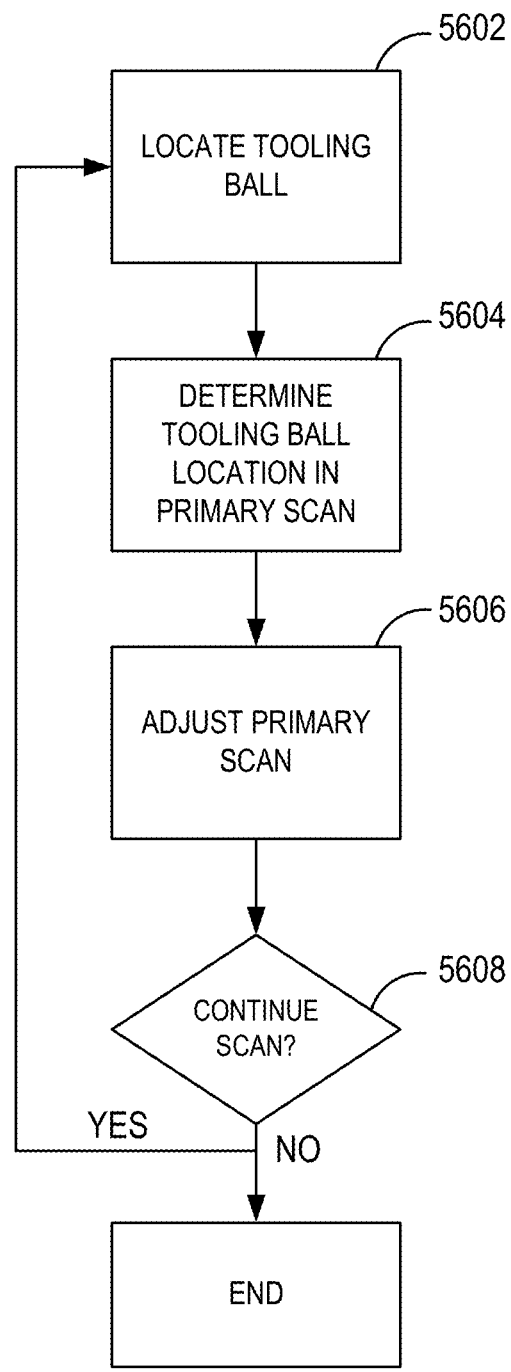
FIG. 56 is a block diagram of a representative method of tracking a tooling ball that is secured to a substrate or target.

The examples disclosed above can be used to implement the following methods and apparatus. FIG. 56 illustrates a representative method of tracking a tooling ball that is secured to a substrate or target. One or more tooling balls can be secured to a target to provide reference points for coordinate determinations. Tooling balls generally include a reflective ball-shaped surface in order to provide ample reflection of an interrogation beam in a laser-based measurement apparatus such as a laser radar.

As shown in FIG. 56, at 5602 a tooling ball location is identified and recorded based on returned portions of a scanned interrogation optical beam. The optical beam can be scanned in a variety of patterns such as circles, spirals, w's, or zig-zags so as to track a tooling ball. At 5604, the identified location is evaluated to determine a position with respect to a primary scan. The primary scan is adjusted at 5606 so that the tooling ball location is at a preferred location with respect to the primary scan. Typically, the primary scan is adjusted so that the tooling ball location is approximately centered within a primary scan range. At 5608, a determination is made regarding additional scanning.

Figure 57:
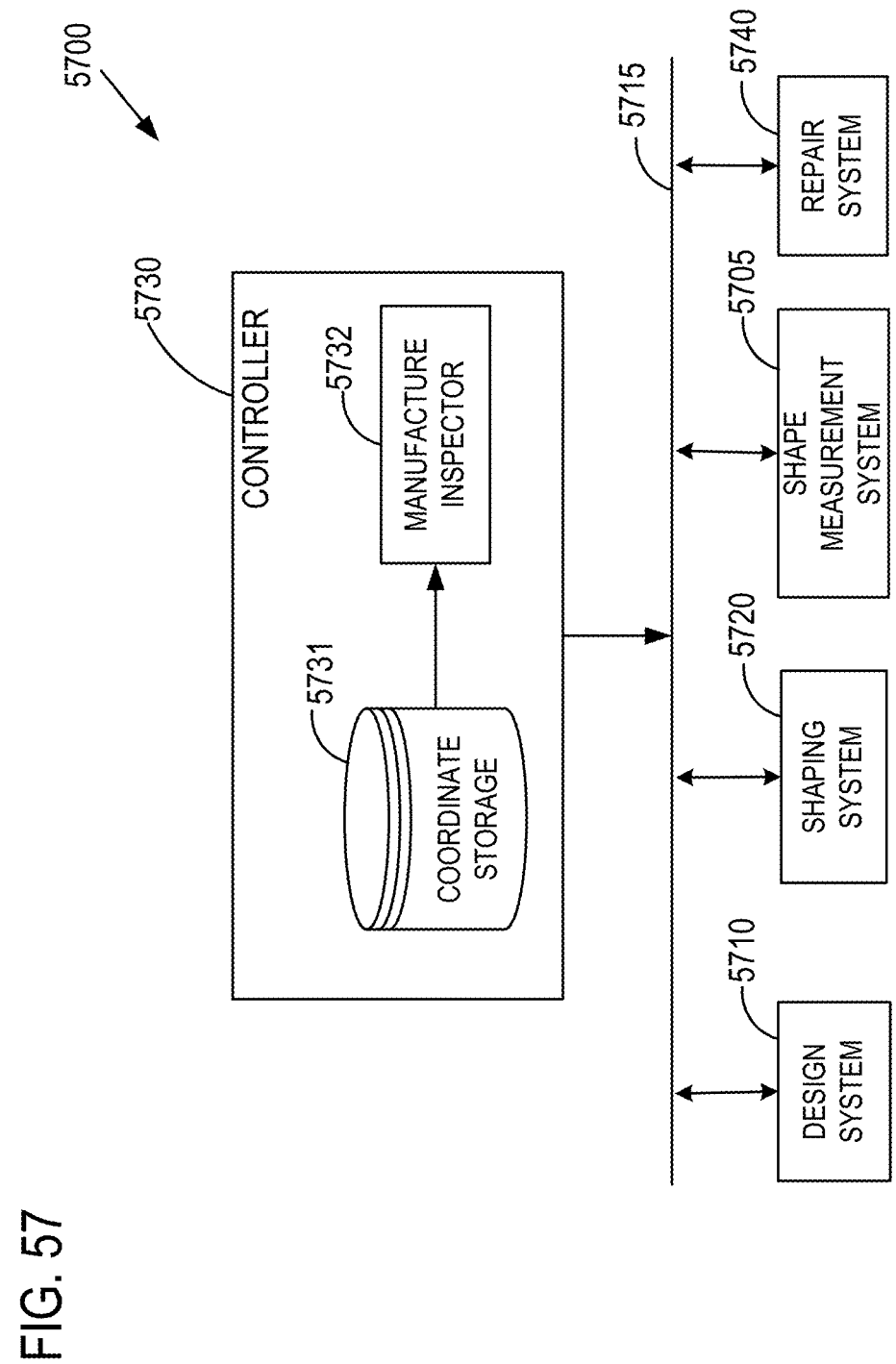
FIG. 57 is a block diagram of a representative manufacturing system that includes a laser radar or other profile measurement system to manufacture components, and assess whether manufactured parts are defective or acceptable.

FIG. 57 illustrates a representative manufacturing system 5700 suitable for producing one or more components of a ship, airplane, or part of other systems or apparatus, and for evaluating and reprocessing such manufactured components. The system 5700 typically includes a shape or profile measurement system 5705 such as the laser radar 100 discussed above. The manufacturing system 5700 also includes a design system 5710, a shaping system 5720, a controller 5730, and a repair system 5740. The controller 5730 includes coordinate storage 5731 configured to store measured and design coordinates or other characteristics of one or more manufactured structures as designed and/or measured. The coordinate storage 5731 is generally a computer readable medium such as hard disk, random access memory, or other memory device. Typically, the design system 5710, the shaping system 5720, the shape measurement system 5705, and a repair system 5740 communicate via a communication bus 5715 using a network protocol.

The design system 5710 is configured to create design information corresponding to shape, coordinates, dimensions, or other features of a structure to be manufactured, and to communicate the created design information to the shaping system 5720. In addition, the design system 5710 can communicate design information to the coordinate storage 5731 of the controller 5730 for storage. Design information typically includes information indicating the coordinates of some or all features of a structure to be produced.

The shaping system 5720 is configured to produce a structure based on the design information provided by the design system 5710. The shaping processes provided by the shaping system 5720 can include casting, forging, cutting, or other process. The shape measurement system 5705 is configured to measure the coordinates of one or more features of the manufactured structure and communicate the information indicating measured coordinates or other information related to structure shape to the controller 5730.

A manufacture inspector 5732 of the controller 5730 is configured to obtain design information from the coordinate storage 5731, and compare information such as coordinates or other shape information received from the profile measuring apparatus 100 with design information read out from the coordinate storage 5731. The manufacture inspector 5732 is generally provided as a processor and a series of computer-executable instructions that are stored in a tangible computer readable medium such as random access memory, a flash drive, a hard disk, or other physical devices. Based on the comparison of design and actual structure data, the manufacture inspector 5732 can determine whether or not the manufacture structure is shaped in accordance with the design information, generally based on one or more design tolerances that can also be stored in the coordinate storage 5731. In other words, the manufacture inspector 5732 can determine whether or not the manufactured structure is defective or nondefective. When the structure is not shaped in accordance with the design information (and is defective), then the manufacture inspector 5732 determines whether or not the structure is repairable. If repairable, then the manufacture inspector 5732 can identify defective portions of the manufactured structure, and provide suitable coordinates or other repair data. The manufacture inspector 5732 is configured to produce one or more repair instructions or repair data and forward repair instructions and repair data to the repair system 5740. Such repair data can include locations requiring repair, the extent of re-shaping required, or other repair data. The repair system 5740 is configured to process defective portions of the manufactured structure based on the repair data.

Figure 58:
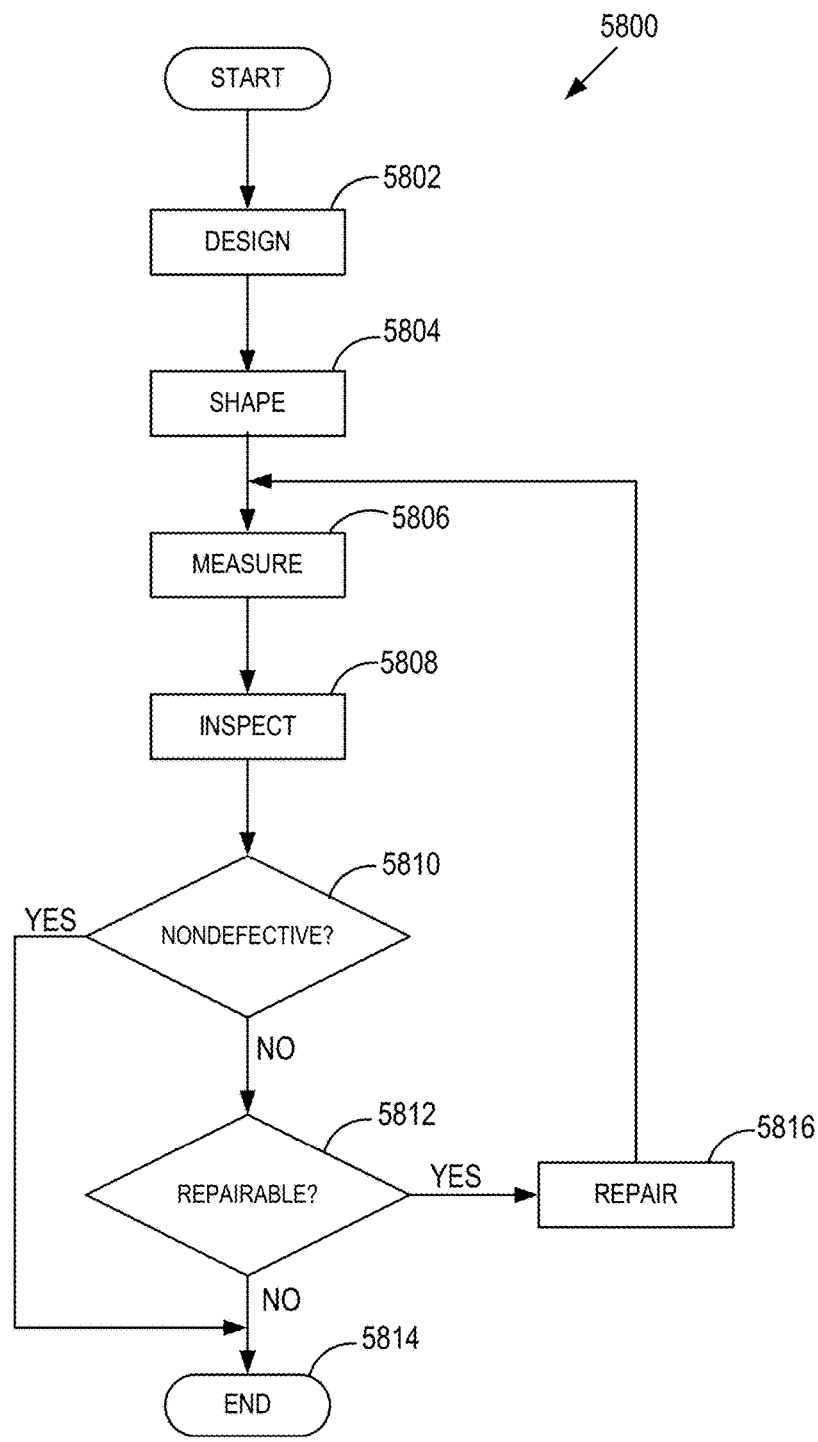
FIG. 58 is a block diagram illustrating a representative manufacturing method that includes profile measurement to determine whether manufactured structures or components are acceptable, and if one or more such manufactured structures can be repaired.

FIG. 58 is a flowchart showing a representative manufacture method 5800 that can incorporate manufacturing systems such as illustrated in FIG. 57. At 5802, design information is obtained or created corresponding to a shape of a structure to be manufactured. At 5804, the structure is manufactured or "shaped" based on the design information. At 5806, coordinates, dimensions, or other features of the manufactured structure are measured with a profile measurement system such as the laser radar systems described above to obtain shape information corresponding to the structure as manufactured. At 5808, the manufactured structure is inspected based on a comparison of actual and design dimensions, coordinates, manufacturing tolerance, or other structure parameters. At 5810, if the manufactured structure is determined to be nondefective, the manufactured part is accepted and processing ends at 5814. If the manufacture part is determined to be defective at 5810 by, for example, the manufacture inspector 5732 of the controller 5730 as shown in FIG. 57, then at 5812 it can be determined whether the manufacture part is repairable. If repairable, the manufactured part is reprocess or repaired at 5816, and then measured, inspected, and reevaluated at 5806, 5808, 5810, respectively. If the manufactured part is determined to be unrepairable at 5812, the process ends at 5814.

According to the method of FIG. 58, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 57-58 are exemplary only, and other arrangements can be used.

In the above embodiment, the structure manufacturing system 5800 can include a profile measuring system such as the laser radars shown above, the design system 5710, the shaping system 5720, the controller 5730 that is configured to determine whether or not a part is acceptable (inspection apparatus), and the repair system 5740. However, other systems and methods can be used and examples of FIGS. 57 and 58 are provided for convenient illustration.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An optical measurement apparatus, comprising:
a beam pointing system, comprising an elevational stage and an azimuthal stage;
an optical system secured so as to be rotatable with the azimuthal stage, wherein the optical system is configured to:
receive, focus, and shape a measurement beam for delivery to a target area as a probe beam, wherein the target area is based on an elevational angle and an azimuthal angle established by the beam pointing system,
combine a portion of the probe beam returned from the target with a portion of the measurement beam in an optical fiber, and
a rotatable reflective surface situated so as to establish an elevational angle for the probe beam; and
a signal processing system configured to provide an estimate of a target distance based on the combined beam.

2. The optical measurement apparatus of claim 1, wherein the optical system includes at least one translatable optical element configured to focus the probe beam, wherein the portion of the measurement beam combined with the returned portion of the probe beam is coupled through the at least one translatable optical element.

3. The optical measurement system of claim 2, further comprising a measurement detector coupled to the combined probe beam and measurement beam portions, wherein the signal processing system is electrically coupled to the measurement detector and configured to provide the estimate of the target distance based on an electrical signal from the measurement detector.

4. The optical measurement system of claim 2, further comprising a beam delivery system configured to couple the measurement beam to the optical system with an optical fiber.

5. The optical measurement system of claim 3, wherein the beam delivery system is fixed.

6. The optical measurement system of claim 3, wherein the beam delivery system comprises at least a first laser and a second laser coupled to provide a combined measurement beam in an optical fiber, and a housing situated to temperature stabilize at least the first laser and the second laser.

7. The optical measurement system of claim 3, wherein the measurement detector is secured so as to be rotatable with the azimuthal stage.

8. The optical measurement system of claim 3, wherein the measurement detector is secured so as to be fixed with respect to elevational and azimuthal rotations provided by the beam pointing system.

9. The optical measurement system of claim 3, wherein the rotatable reflective surface is a surface of a plane mirror.

10. The optical measurement system of claim 3, wherein the rotatable reflective surface is a surface of a prism.

11. The optical measurement system of claim 10, wherein the prism is a pentaprism.

12. The optical measurement system of claim 3, wherein the rotatable reflective surface is a surface of a pentamirror.

13. The optical measurement system of claim 3, wherein the rotatable reflective surface is defined by a multilayer dielectric coating.

14. The optical measurement apparatus of claim 3, further comprising at least first and second measurement lasers coupled to provide a dual wavelength measurement beam to the optical fiber of the rotatable optical system.

15. The optical measurement apparatus of claim 14, wherein the portion of the measurement beam and the returned portion of the probe beam are combined so as to have corresponding optical paths in the at least one translatable optical element.

16. The optical measurement apparatus of claim 15, wherein the portion of the measurement beam and the returned portion of the probe beam that are combined so as to have a common number of transits of the at least one translatable optical element.

17. The optical measurement apparatus of claim 16, wherein the at least one translatable optical element is a corner cube.

18. The measurement apparatus of claim 17, further comprising an enclosure configured to retain the reference length, and a temperature controller thermally coupled to the enclosure and configured to establish a temperature of the enclosure.

19. The measurement apparatus of claim 18, further comprising a pointing laser that produces a visible optical beam and configured so that the visible optical beam is coupled with the dual wavelength measurement beam to the optical fiber of the rotatable optical system.

20. The measurement apparatus of claim 19, wherein the optical fiber of the rotatable optical system is a polarization maintaining single mode optical fiber.

21. The optical measurement apparatus of claim 1, further comprising:
a reference length that includes a Fabry-Perot resonator coupled to receive a portion of the dual wavelength measurement beam; and
a reference detector optically coupled to the Fabry-Perot resonator and electrically coupled to the signal processing system so as to provide a reference electrical signal, wherein the signal processing system is configured to provide the estimate of target distance based the reference electrical signal.

22. The optical measurement apparatus of claim 21, wherein the reference electrical signal includes signal portions corresponding to a plurality of transits of a cavity defined by the Fabry-Perot resonator.

23. The measurement apparatus of claim 1, further comprising a camera secured so as to be rotatable with the azimuthal stage and situated to image along a propagation axis of the probe beam.

* * * * *